(12) United States Patent
Dantus et al.

(10) Patent No.: US 8,208,505 B2
(45) Date of Patent: Jun. 26, 2012

(54) LASER SYSTEM EMPLOYING HARMONIC GENERATION

(75) Inventors: Marcos Dantus, Okemos, MI (US); Don Ahmasi Harris, Lansing, MI (US); Vadim V. Lozovoy, Holt, MI (US)

(73) Assignee: Board of Trustees of Michigan State University, East Lansing, MI (US)

(*) Notice: Subject to any disclaimer, the term of this patent is extended or adjusted under 35 U.S.C. 154(b) by 357 days.

(21) Appl. No.: 12/465,849

(22) Filed: May 14, 2009

(65) Prior Publication Data

US 2009/0238222 A1 Sep. 24, 2009

Related U.S. Application Data

(63) Continuation of application No. PCT/US2007/024171, filed on Nov. 16, 2007, and a continuation-in-part of application No. 10/791,377, filed on Mar. 2, 2004, now Pat. No. 7,609,731, which is a continuation-in-part of application No. 10/265,211, filed on Oct. 4, 2002, now Pat. No. 7,450,618, which is a continuation-in-part of application No. PCT/US02/02548, filed on Jan. 28, 2002.

(60) Provisional application No. 60/859,421, filed on Nov. 16, 2006, provisional application No. 60/265,133, filed on Jan. 30, 2001.

(51) Int. Cl.
*H01S 3/10* (2006.01)
(52) U.S. Cl. ............... 372/25; 372/21; 372/26; 372/30; 250/288; 250/281; 250/282; 356/300; 356/301; 356/318; 356/319; 356/320

(58) Field of Classification Search ............... 372/25, 372/30, 26, 21; 250/288, 281, 282; 356/300, 356/301, 318, 319, 320
See application file for complete search history.

(56) References Cited

U.S. PATENT DOCUMENTS

| 3,214,563 | A | 10/1965 | Ford |
| 3,611,182 | A | 10/1971 | Treacy |
| 3,919,881 | A | 11/1975 | Metherell |
| 3,988,704 | A | 10/1976 | Rice et al. |
| 4,167,662 | A | 9/1979 | Steen |

(Continued)

FOREIGN PATENT DOCUMENTS

EP 0605110 A2 7/1994
(Continued)

OTHER PUBLICATIONS

R. Eramo et al, "Third-harmonic generation in positively dispersive gases with a novel cell", vol. 33, No. 9, Applued Optics, Mar. 20, 1994, pp. 1691-1696.*

(Continued)

*Primary Examiner* — Jessica Stultz
*Assistant Examiner* — Delma R Forde
(74) *Attorney, Agent, or Firm* — Harness, Dickey & Pierce, P.L.C.

(57) ABSTRACT

A laser system provides harmonic generation in a laser beam pulse. In another aspect of the present invention, a laser operably remits a laser pulse, a gaseous optical medium operably creates third or greater harmonic generation in the pulse, and a controller characterizes and compensates for distortions in the pulse. A further aspect of the present invention employs multiple optical media arranged to cause cascading harmonic generations in a laser pulse.

36 Claims, 8 Drawing Sheets

U.S. PATENT DOCUMENTS

| | | |
|---|---|---|
| 4,288,691 A | 9/1981 | Horton |
| 4,394,780 A | 7/1983 | Mooradian |
| 4,477,905 A | 10/1984 | Sweeney |
| 4,512,660 A | 4/1985 | Goldberg |
| 4,621,006 A | 11/1986 | Terry et al. |
| 4,655,547 A | 4/1987 | Heritage et al. |
| 4,746,193 A | 5/1988 | Heritage et al. |
| 4,772,854 A | 9/1988 | Silberberg |
| 4,812,776 A | 3/1989 | Sasaki |
| 4,819,239 A | 4/1989 | Sharp et al. |
| 4,834,474 A | 5/1989 | George et al. |
| 4,853,065 A | 8/1989 | Terry et al. |
| 4,856,860 A | 8/1989 | Silberberg et al. |
| 4,866,699 A | 9/1989 | Brackett et al. |
| 4,913,934 A | 4/1990 | Sharp et al. |
| 4,928,316 A | 5/1990 | Heritage et al. |
| 4,999,840 A | 3/1991 | Negus |
| 5,021,282 A | 6/1991 | Terry et al. |
| 5,034,613 A | 7/1991 | Denk et al. |
| 5,048,029 A | 9/1991 | Skupsky et al. |
| 5,054,027 A | 10/1991 | Goodberlet et al. |
| 5,077,619 A | 12/1991 | Toms |
| 5,095,487 A | 3/1992 | Meyerhofer et al. |
| 5,130,994 A | 7/1992 | Madey et al. |
| 5,132,512 A | 7/1992 | Sanders et al. |
| 5,132,824 A | 7/1992 | Patel et al. |
| 5,154,963 A | 10/1992 | Terry |
| 5,166,818 A | 11/1992 | Chase et al. |
| 5,239,607 A | 8/1993 | da Silva et al. |
| 5,341,236 A | 8/1994 | Stappaerts |
| 5,359,410 A | 10/1994 | Diels et al. |
| 5,406,408 A | 4/1995 | Ellingson et al. |
| 5,414,540 A | 5/1995 | Patel et al. |
| 5,414,541 A | 5/1995 | Patel et al. |
| 5,463,200 A | 10/1995 | James et al. |
| 5,526,155 A | 6/1996 | Knox et al. |
| 5,526,171 A | 6/1996 | Warren |
| 5,530,544 A | 6/1996 | Trebino et al. |
| 5,541,947 A | 7/1996 | Mourou et al. |
| 5,585,913 A | 12/1996 | Hariharan et al. |
| 5,589,955 A | 12/1996 | Amako et al. |
| 5,615,673 A | 4/1997 | Berger et al. |
| 5,631,758 A | 5/1997 | Knox et al. |
| 5,636,050 A | 6/1997 | Alfano et al. |
| 5,637,966 A | 6/1997 | Umstadter et al. |
| 5,682,262 A | 10/1997 | Wefers et al. |
| 5,684,595 A | 11/1997 | Kato et al. |
| 5,689,361 A | 11/1997 | Damen et al. |
| 5,704,700 A | 1/1998 | Kappel et al. |
| 5,719,650 A | 2/1998 | Wefers et al. |
| 5,734,503 A | 3/1998 | Szipocs et al. |
| 5,754,292 A | 5/1998 | Kane et al. |
| 5,759,767 A | 6/1998 | Lakowicz et al. |
| 5,774,213 A | 6/1998 | Trebino et al. |
| 5,793,091 A | 8/1998 | Devoe |
| 5,798,867 A | 8/1998 | Uchida et al. |
| 5,822,097 A | 10/1998 | Tournois |
| 5,828,459 A | 10/1998 | Silberberg |
| 5,832,013 A | 11/1998 | Yessik et al. |
| 5,883,309 A | 3/1999 | Vossiek et al. |
| 5,936,732 A | 8/1999 | Smirl et al. |
| 5,956,173 A | 9/1999 | Svelto et al. |
| 5,956,354 A | 9/1999 | Yan |
| 5,994,687 A | 11/1999 | Chanteloup et al. |
| 6,002,480 A | 12/1999 | Izatt et al. |
| 6,008,899 A | 12/1999 | Trebino et al. |
| 6,042,603 A | 3/2000 | Fisher et al. |
| 6,057,919 A | 5/2000 | Machida et al. |
| 6,058,132 A | 5/2000 | Iso et al. |
| 6,072,813 A | 6/2000 | Tournois |
| 6,080,148 A | 6/2000 | Damasco et al. |
| 6,081,543 A | 6/2000 | Liu et al. |
| 6,111,251 A | 8/2000 | Hillenkamp |
| 6,122,419 A | 9/2000 | Kurokawa et al. |
| 6,130,426 A | 10/2000 | Laukien et al. |
| 6,166,385 A | 12/2000 | Webb et al. |
| 6,178,041 B1 | 1/2001 | Simon |
| 6,184,490 B1 | 2/2001 | Schweizer |
| 6,191,386 B1 | 2/2001 | Albright et al. |
| 6,219,142 B1 | 4/2001 | Kane |
| 6,259,104 B1 | 7/2001 | Baer |
| 6,272,156 B1 | 8/2001 | Reed et al. |
| 6,288,782 B1 | 9/2001 | Worster et al. |
| 6,296,810 B1 | 10/2001 | Ulmer |
| 6,316,153 B1 | 11/2001 | Goodman et al. |
| 6,327,068 B1 * | 12/2001 | Silberberg et al. ............ 359/239 |
| 6,337,606 B1 | 1/2002 | Brombaugh et al. |
| 6,344,653 B1 | 2/2002 | Webb et al. |
| 6,391,220 B1 | 5/2002 | Zhang et al. |
| 6,396,856 B1 | 5/2002 | Sucha et al. |
| 6,402,898 B1 | 6/2002 | Brumer et al. |
| 6,421,154 B1 | 7/2002 | Diels et al. |
| 6,479,822 B1 | 11/2002 | Nelson et al. |
| 6,480,656 B1 | 11/2002 | Islam et al. |
| 6,498,801 B1 | 12/2002 | Dudelzak et al. |
| 6,504,612 B2 | 1/2003 | Trebino |
| 6,515,257 B1 | 2/2003 | Jain et al. |
| 6,566,667 B1 | 5/2003 | Partlo et al. |
| 6,577,782 B1 | 6/2003 | Leaird et al. |
| 6,610,351 B2 | 8/2003 | Shchegolikhin et al. |
| 6,610,977 B2 | 8/2003 | Megerle |
| 6,621,613 B2 | 9/2003 | Silberberg et al. |
| 6,625,181 B1 | 9/2003 | Oshemkov et al. |
| 6,631,333 B1 | 10/2003 | Lewis et al. |
| 6,678,450 B1 | 1/2004 | Franson |
| 6,697,196 B2 | 2/2004 | Suzuki |
| 6,753,957 B1 | 6/2004 | Graft et al. |
| 6,757,463 B2 | 6/2004 | Hutchinson et al. |
| 6,795,456 B2 | 9/2004 | Scaggs |
| 6,801,318 B2 | 10/2004 | Fu et al. |
| 6,801,551 B1 | 10/2004 | Delfyett et al. |
| 6,804,000 B2 | 10/2004 | Roorda et al. |
| 6,857,744 B2 | 2/2005 | Nakada et al. |
| 6,879,426 B1 | 4/2005 | Weiner |
| 6,885,325 B2 | 4/2005 | Omelyanchouk et al. |
| 6,914,668 B2 | 7/2005 | Brestel et al. |
| 6,915,040 B2 | 7/2005 | Willner et al. |
| 6,930,779 B2 | 8/2005 | McGrew |
| 6,963,591 B2 | 11/2005 | Tulloch et al. |
| 7,033,519 B2 | 4/2006 | Taylor et al. |
| 7,049,543 B2 | 5/2006 | Roos et al. |
| 7,057,788 B2 | 6/2006 | Ohbayashi et al. |
| 7,088,435 B2 | 8/2006 | Brestel et al. |
| 7,096,125 B2 | 8/2006 | Padmanabhan et al. |
| 7,105,811 B2 | 9/2006 | Dantus et al. |
| 7,132,223 B2 | 11/2006 | Schroeder et al. |
| 7,169,709 B2 | 1/2007 | Koide |
| 7,170,030 B2 | 1/2007 | Haight et al. |
| 7,170,598 B2 | 1/2007 | Walla et al. |
| 7,256,885 B2 | 8/2007 | Silberberg et al. |
| 7,276,103 B2 | 10/2007 | Woste et al. |
| 7,289,203 B2 | 10/2007 | Frankel |
| 7,342,223 B2 | 3/2008 | Ohkubo et al. |
| 7,348,569 B2 | 3/2008 | Feurer et al. |
| 7,369,773 B2 | 5/2008 | Weiner |
| 7,403,281 B2 | 7/2008 | Carron et al. |
| 7,403,282 B2 | 7/2008 | Silberberg et al. |
| 7,411,166 B2 | 8/2008 | Wolleschensky et al. |
| 7,439,497 B2 | 10/2008 | Dantus et al. |
| 7,450,618 B2 | 11/2008 | Dantus et al. |
| 7,474,467 B2 | 1/2009 | Trebino |
| 7,567,596 B2 | 7/2009 | Dantus et al. |
| 7,576,907 B1 | 8/2009 | Bartels et al. |
| 7,583,710 B2 | 9/2009 | Dantus et al. |
| 7,609,731 B2 | 10/2009 | Dantus et al. |
| 7,826,051 B2 | 11/2010 | Silberberg et al. |
| 7,973,936 B2 * | 7/2011 | Dantus ........................ 356/451 |
| 7,989,731 B2 | 8/2011 | Bischoff et al. |
| 2001/0015411 A1 | 8/2001 | Ohdaira et al. |
| 2001/0015990 A1 | 8/2001 | Miyai |
| 2001/0017727 A1 | 8/2001 | Sucha et al. |
| 2002/0025490 A1 | 2/2002 | Shchegolikhin et al. |
| 2002/0086245 A1 | 7/2002 | Zait et al. |
| 2002/0097761 A1 | 7/2002 | Sucha et al. |
| 2003/0063884 A1 | 4/2003 | Smith et al. |
| 2003/0099264 A1 | 5/2003 | Dantus et al. |
| 2003/0123051 A1 | 7/2003 | McGrew |

| | | | |
|---|---|---|---|
| 2003/0194165 A1 | 10/2003 | Silberberg et al. | |
| 2003/0210400 A1 | 11/2003 | Joffre et al. | |
| 2004/0012837 A1 | 1/2004 | Kaplan et al. | |
| 2004/0021243 A1 | 2/2004 | Shih et al. | |
| 2004/0031906 A1 | 2/2004 | Glecker | |
| 2004/0058058 A1 | 3/2004 | Shchegolikhin et al. | |
| 2004/0089804 A1 | 5/2004 | Dantus et al. | |
| 2004/0128081 A1 | 7/2004 | Rabitz et al. | |
| 2004/0145735 A1 | 7/2004 | Silberberg et al. | |
| 2004/0155184 A1 | 8/2004 | Stockman et al. | |
| 2004/0233944 A1 | 11/2004 | Dantus et al. | |
| 2004/0240037 A1 | 12/2004 | Harter | |
| 2004/0263950 A1 | 12/2004 | Fermann et al. | |
| 2005/0017160 A1 | 1/2005 | Wolleschensky et al. | |
| 2005/0021243 A1 | 1/2005 | Dantus et al. | |
| 2005/0036202 A1 | 2/2005 | Cohen et al. | |
| 2005/0103759 A1 | 5/2005 | Li et al. | |
| 2005/0155958 A1 | 7/2005 | Arai et al. | |
| 2005/0161669 A1 | 7/2005 | Jovanovich et al. | |
| 2005/0185188 A1 | 8/2005 | McGrew | |
| 2005/0226287 A1 | 10/2005 | Shah et al. | |
| 2005/0230365 A1 | 10/2005 | Lei et al. | |
| 2005/0232313 A1 | 10/2005 | Fermann et al. | |
| 2005/0248758 A1 | 11/2005 | Carron et al. | |
| 2006/0000988 A1 | 1/2006 | Stuart et al. | |
| 2006/0006964 A1 | 1/2006 | Huang et al. | |
| 2006/0019171 A1 | 1/2006 | Hosono et al. | |
| 2006/0028655 A1 | 2/2006 | Cordingley et al. | |
| 2006/0032841 A1 | 2/2006 | Tan et al. | |
| 2006/0039419 A1 | 2/2006 | Deshi | |
| 2006/0051025 A1 | 3/2006 | Mizuuchi et al. | |
| 2006/0056468 A1 | 3/2006 | Dantus et al. | |
| 2006/0058683 A1 | 3/2006 | Chance | |
| 2006/0066848 A1 | 3/2006 | Frankel | |
| 2006/0071803 A1 | 4/2006 | Hamburger et al. | |
| 2006/0096426 A1 | 5/2006 | Park | |
| 2006/0096962 A1 | 5/2006 | Park | |
| 2006/0119743 A1 | 6/2006 | Lin | |
| 2006/0120412 A1 | 6/2006 | Liu | |
| 2006/0134004 A1 | 6/2006 | Gellermann et al. | |
| 2006/0169677 A1 | 8/2006 | Deshi | |
| 2006/0187974 A1 | 8/2006 | Dantus | |
| 2006/0207975 A1 | 9/2006 | Ehrmann et al. | |
| 2006/0207976 A1 | 9/2006 | Bovatsek et al. | |
| 2006/0243712 A1 | 11/2006 | Haight et al. | |
| 2006/0274403 A1 | 12/2006 | Kaplan et al. | |
| 2006/0285071 A1 | 12/2006 | Erickson et al. | |
| 2007/0034615 A1 | 2/2007 | Kleine | |
| 2007/0093970 A1 | 4/2007 | Padmanabhan et al. | |
| 2007/0103778 A1 | 5/2007 | Kaplan et al. | |
| 2007/0258088 A1* | 11/2007 | Silberberg et al. | 356/301 |
| 2007/0291264 A1* | 12/2007 | Silberberg et al. | 356/301 |
| 2008/0170218 A1 | 7/2008 | Dantus et al. | |
| 2008/0309931 A1* | 12/2008 | Silberberg et al. | 356/301 |
| 2009/0122819 A1 | 5/2009 | Dantus et al. | |
| 2009/0188901 A1 | 7/2009 | Dantus | |
| 2009/0207869 A1 | 8/2009 | Dantus et al. | |
| 2009/0256071 A1 | 10/2009 | Dantus et al. | |
| 2009/0257464 A1 | 10/2009 | Dantus et al. | |
| 2009/0296744 A1 | 12/2009 | Dantus et al. | |
| 2011/0005090 A1 | 1/2011 | Lee et al. | |

FOREIGN PATENT DOCUMENTS

| | | |
|---|---|---|
| EP | 0842729 A1 | 5/1998 |
| EP | 1625939 A2 | 2/2006 |
| EP | 1742311 A1 | 1/2007 |
| JP | 01113189 A | 5/1989 |
| JP | 11095051 A | 4/1999 |
| JP | 2000055781 A | 2/2000 |
| JP | 2001337301 A | 12/2001 |
| JP | 2002139716 A | 5/2002 |
| JP | 2003155256 A | 5/2003 |
| WO | WO-9957318 A2 | 11/1999 |
| WO | WO-0070647 A1 | 11/2000 |
| WO | WO-0154323 A2 | 7/2001 |
| WO | WO-0231799 A1 | 4/2002 |
| WO | WO-02061799 A2 | 8/2002 |
| WO | WO-2004023413 A2 | 3/2004 |
| WO | WO-2005088783 A1 | 9/2005 |
| WO | WO-2005111677 A2 | 11/2005 |
| WO | WO-2006079083 A2 | 7/2006 |
| WO | WO-2006111682 A1 | 10/2006 |
| WO | WO-2006138442 A2 | 12/2006 |
| WO | WO-2007001308 A2 | 1/2007 |
| WO | WO-2007002231 A1 | 1/2007 |
| WO | WO-2007145702 A2 | 12/2007 |
| WO | WO-2009086122 A2 | 7/2009 |

OTHER PUBLICATIONS

Y. Tamaki et. al. "Phase-matched third-harmonic generation by nonlinear phase shift in a hollow fiber" Appl. Phys. B 67, pp. 59-63 (1998).*

Zeek, E. et al., "Pulse Compression by Use of Deformable Mirrors," Optics Letters, OSA, Optical Society of America, vol. 24, No. 7, Apr. 1, 1999, pp. 493-495.

Sardesai, H et al. "A Femtosecond Code-Division Multiple-Access Communication System Test Bed," Journal of Lightwave Technology, IEEE Service Center, vol. 16, No. 11, Nov. 1, 1998, p. 1953-1964.

"BNS Liquid Crystal Solutions Spatial Light Modulators 1 x 12,288 Linear Series," brochure, Apr. 2006, Boulder Nonlinear Systems, Inc., pp. 1-4.

"Femtosource Scientific," brochure, Femtolasers Productions GmbH (believed to be published prior to Jan. 15, 2009) 2 pages.

"Shape Your Pulses. Control Your Experiment." advertisement, Laser Focus World, (Dec. 1997) p. 26, CRI, Inc.

"Shaping Light," brochure, Boston Micromachines Corporation, (believed to have been published prior to Jun. 18, 2010).

A. Apolonski et al.; "Controlling the Phase Evolution of Few-Cycle Light Pulses"; Physical Review Letters, vol. 85, No. 4; Jul. 24, 2000; pp. 740-743.

A. Assion et al.; "Coherent control by a single phase shaped femtosecond laser pulse"; Chemical Physics Letters 259; Sep. 13, 1996; pp. 488-494.

A. Baltuska et al.; "Attosecond control of electronic processes by intense light fields"; Nature magazine, vol. 421; Feb. 6, 2003; pp. 611-615.

A. Efimov et al.; "Minimization of dispersion in an ultrafast chirped pulse amplifier using adaptive learning"; Appl. Phys. B 70 (Suppl); 2000; pp. S133-S141.

A. Glass et al.; "Control of the photodissociation of CsCl"; Applied Physics B 71; 2000; pp. 267-276.

A. Pe're et al.; Optical Code-Division Multiple Access Using Broad-Band Parametrically Generated Light; J. of Lightwave Tech.; vol. 22, No. 6; Jun. 2004; pp. 1463-1471.

A. Poppe et al; "Few-cycle optical waveform synthesis"; Applied Physics B 72; 2001; pp. 373-376.

A. Powe et al.; "Molecular Fluorescence, Phosphorescence, and Chemiluminescence Spectrometry"; Anal. Chem., vol. 76, No. 15; Aug. 15, 2004; pp. 4614-4634.

A. Prakelt et al.; "Phase control of two-photon transition with shaped femtosecond laser-pulse sequences"; Physical Review A 70; 2004; pp. 063407-1-06407-10.

A.J. Wurzer et al.; "Highly localized vibronic wavepackets in large reactive molecules"; Applied Phys. B 71, 2000; pp. 405-409.

A.M. Weiner et al.; "Femtosecond Pulse Sequences Used for Optical Manipulation of Molecular Motion"; Reports; Mar. 16, 1990; pp. 1317-1319.

A.N. Naumov et al.; "Frequency-time and time-space mappings for single-shot coherent four-wave mixing with chirped pulses and broad beams"; Journal of Raman Spectroscopy, 2001; pp. 960-970.

A.V. Sokolov; "Subfemtosecond compression of periodic laser pulses"; Optics Letters, vol. 24, No. 17, Sep. 1, 1999; pp. 1248-1250.

Akozbek, N. et al.; "Continuum Generation of the Third-Harmonic Pulse Generated by an Intense Femtosecond IR Laser Pulse in Air;" Applied Physics B (Lasers and Optics), Springer-Verlag, Germany, vol. B77, No. 2-3, XP002476096; Sep. 2003, pp. 177-183.

Alexeev, I. et al., "Ultraviolet Light Generation by Intense Laser Filaments Propagating in Air," Conference on Lasers & Electro-Optics (CLEO), Baltimore, Maryland, USA, XP010876479; May 22-27, 2005, pp. 189-191.

Alfred Kwok et al.; "Frequency-Resolved Optical Gating Using Cascaded Second-Order Nonlinearities"; Journal of Selected Topics in Quantum Electronics, vol. 4, No. 2; Mar./Apr. 1998; pp. 271-277.

Allen J. Bard et al.; "Holy Grails in Chemistry"; American Chemical Society, vol. 28, No. 3; Mar. 1995.

Allison Albrecht Ferro et al.; "Complete femtosecond linear free induction decay, Fourier algorithm for dispersion relations and accuracy of the rotating wave approximation"; Journal of Chemical Physics, vol. 114, No. 10; Mar. 8, 2001; pp. 4649-4656.

Allison W. Albrecht et al.; "Experimental distinction between phase shifts and time delays: Implications for femtosecond spectroscopy and coherent control of chemical reactions"; Journal of Chemical Physics, vol. 111, No. 24; Dec. 22, 1999; pp. 10934-10955.

Alois Renn et al.; "Multidimensional Holography by Persistent Spectral Hole Burning"; The Journal of Physical Chemistry A, vol. 106, No. 13; Apr. 4, 2002; pp. 3045-3060.

Amichay Vardi et al.; "Laser catalysis with pulses"; Physical Review A, vol. 58, No. 2; Aug. 1998; pp. 1352-1360.

Anderson, M.E. et al.; "The effects of noise on ultrashort-optical-pulse measurement using SPIDER"; Appl. Phys. B 70 (Suppl); 2000; pp. S85-S93.

Andrius Baltuska et al.; "Second-Harmonic Generation Frequency-Resolved Optical Gating in the Single-Cycle Regime"; IEEE Journal of Quantum Electronics, vol. 35, No. 4, Apr. 1999; pp. 459-478.

Anthony P. Peirce et al.; "Optimal control of quantum-mechanical systems: Existence, numerical approximation and applications"; Physical Review A, vol. 37, No. 12; Jun. 15, 1988; pp. 4950-4964.

Arthur L. Smirl et al.; "Heavy-Hole and Light-Hole Quantum Beats in the Polarization State of Coherent Emission from Quantum Wells"; IEEE Journal of Quantum Electronics, vol. 35, No. 4; Apr. 1999; pp. 523-531.

Assion, A. et al; "Control of Chemical Reactions by Feedback-Optimized Phase-Shaped Femtosecond Laser Pulses"; Science Magazine, vol. 282; Oct. 30, 1998; pp. 919-922.

Atabek, O. et al., Intense Laser Control of the Chemical Bond, Theochem Elsevier Netherlands, vol. 493, Dec. 15, 1999, pp. 89-101.

Atsushi Yabushita et al.; "SHG FROG and XFROG methods for phase/intensity characterization of pulses propagated through an absorptive optical medium"; Optics Communications; Oct. 15, 2001; pp. 227-232.

Aviv Circular Dichroism Spectrometer, Model 400, Aviv Biomedical, Inc., http://www.avivbiomedical.com, Nov. 29, 2006; 2 pages.

B. Broers et al.; "Efficient Population Transfer in a Three-Level Ladder System by Frequency-Swept Ultrashort Laser Pulses"; Physical Review Letters, vol. 69, No. 14; Oct. 5, 1992; pp. 2062-2065.

B. Chatel et al.; "Role of quadratic and cubic spectral phases in ladder climbing with ultrashort pulses"; Physical Review A 70; 2004; pp. 053414-1-053414-10.

B. Dayan et al.; "Coherent control with broadband squeezed vacuum"; arXiv:quant-ph/0302038 v1; Feb. 5, 2003 (4 pages).

B. Dayan et al.; "Nonlinear Interactions with an Ultrahigh Flux of Broadband Entangled Photons"; Physical Review Letters, PRL 94; Feb. 4, 2005, 2004; pp. 043602-1-043602-4.

B. Dayan et al.; "Two Photon Absorption and Coherent Control with Broadband Down-Converted Light"; Physical Review Letters, vol. 93, No. 2; Jul. 9, 2004; pp. 023005-1023005-4.

B. Natarajan et al.; "Abstract-Innovative pulse shaping for high-performance wireless TDMA"; IEEE Communications Letters; 5 (9): 372-374; Sep. 2001 (1 page).

B. Xu, Y. Coello, V.Lozovoy, D. Harris; M. Dantus, Pulse Shaping of Octave Spanning Femtosecond Laser Pulses, Optics Express, vol. 14, No. 22, Oct. 30, 2006, six pages.

B.D. Fainberg; "Diagram Technique for Nonlinear Optical Spectroscopy in the Fast Electronic Dephasing Limit"; Journal of the Chinese Chemical Society, 47; 2000; pp. 579-582.

B.J. Pearson et al.; "Coherent control using adaptive learning algorithms"; Physical Review A, vol. 63; 2001; pp. 063412-1-063412-12.

Bado, Philippe et al., "Micromachining Handbook," Femtosecond Lasers Micromachining Handbook, Clark-MXR, Inc., http://www.cmxr.com/Industrial/Handbook/Index.htm, accessed Apr. 3, 2006 (38 pages).

Baltuska, Andrius et al.; "Amplitude and phase characterization of 4.5-fs pulses by frequency-resolved optical gating"; Optics Letters, vol. 23, No. 18; Sep. 15, 1998; pp. 1474-1476.

Baltuska, Andrius et al.; "Visible Pulse Compression to 4 fs by Optical Parametric Amplification and Programmable Dispersion Control;" Optics Letters, vol. 27, No. 5, Mar. 1, 2002, pp. 306-308.

Barry, Liam P., et al., "A High-Speed Optical Star Network Using TDMA and All-Optical Demultiplexing Techniques", IEEE Journal on Selected Areas in Communications, vol. 14, No. 5, (Jun. 1996), pp. 1030-1038.

Baumert, T. et al. "Femtosecond pulse shaping by an evolutionary algorithm with feedback"; Appl. Phys. B 65; 1997; pp. 779-782.

Ben R. Torralva et al; "Mechanisms for laser control of chemical reactions"; Journal of Modern Optics, vol. 49, No. 3/4; 2002; pp. 593-625.

Bender, Daniel A., et al., "Modified spectrum autointerferometric correlation (MOSAIC) for single-shot pulse characterization," Optics Letters, vol. 32, No. 19 (Oct. 1, 2007) Optical Society of America, pp. 2822-2824.

Bern Kohler et al.; "Controlling the Future of Matter"; Acc. Chem. Res., vol. 28, No. 3; 1995; pp. 133-140.

Bern Kohler et al.; "Mode-Locking Matter with Light"; J. Phys. Chem 1993, 97; pp. 12602-12608.

Bern Kohler et al.; "Quantum Control of Wave Packet Evolution with Tailored Femtosecond Pulses"; Physical Review Letters, vol. 74, No. 17; Apr. 24, 1995; pp. 3360-3363.

Bhattacharya, N. et al.; "Implementation of Quantum Search Algorithm using Classical Fourier Optics"; Phys. Rev. Lett.; vol. 88. No. 13; Apr. 1, 2002; p. 137901-1-137901-4.

Bjarne Amstrup et al.; "Control of HOD photodissociation dynamics via bond-selective infrared multiphoton excitation and a femtosecond ultraviolet laser pulse"; J. Chem. Phys., vol. 97, No. 11; Dec. 1, 1992; pp. 8285-8295.

Bonacina, Luigi, et al., "Multiobjective genetic approach for optimal control of photoinduced processes," Physical Review A. 76, The American Physical Society, (2007) pp. 023408-1 through 023408-5.

Bowlan, Pamela, et al., "Directly measuring the spatio-temporal electric field of focusing ultrashort pulses," Optics Express, vol. 15, No. 16 (2007) pp. 10219-10230.

Brattke, S. et al.; "Generation of Photon Number States on Demand via Cavity Quantum Electrodynamics"; Phys. Rev. Lett.; vol. 86; Apr. 16, 2001; pp. 3534-3537.

Brixner T., et al., Quantum Control by Ultrafast Polarization Shaping, Phys Rev Lett, vol. 92, No. 20, May 21, 2004, pp. 208301-1.

Brixner, T. et al.; "Feedback-controlled femtosecond pulse shaping"; Appl. Phys. B 70 (Suppl); 2000; pp. S119-S124.

Brixner, T., et al., "Adaptive Shaping of Femtosecond Polarization Profiles," J. Opt. Soc. Am. B. vol. 20, No. 5, May 2003; pp. 878-881.

Brixner, T., et al., "Femtosecond Polarlization Pulse Shaping," Optics Letters, vol. 26, No. 8, Apr. 15, 2001; pp. 557-559.

Broers, B. et al.; "Diffraction and focusing of spectral energy in multiphoton processes"; Phys Rev. A 46; 1992; p. 2749-2756.

Broers, B. et al.; "Large interference effects of small chirp observed in two-photon absorbtion"; Opt. Commun. 91; 1992; p. 57-61.

Brown, E. J. et al.; "Femtosecond Transient-Grating Techniques: Population and Coherence Dynamics Involving Ground and Excited States;" J. Chem. Phys., vol. 110, No. 12, Mar. 22, 1999; pp. 5772-5788.

Brown, E. J. et al.; "Population and Coherence Control by Three-Pulse Four-Wave Mixing;" J. Chem. Phys., vol. 111, No. 9, Sep. 1, 1999; pp. 3779-3782.

Brown, E. J. et. al. "Ultrafast Rotational Anisotropy Measurements: Unidirectional Detection;" J. Phys. Chem. A, vol. 103, No. 16, 1999 pp. 2912-2916.

Brown, E. J. et. al. "Ultrafast Rotational Anisotropy Measurements; Strong-Field Nonlinear Saturation Effects;" J. Phys. Chem. A, vol. 105, No. 34, 2001; pp. 8004-8010.

Bucksbaum, Philip; "An atomic dimmer switch"; Nature; Nov. 19, 1998; vol. 396; pp. 217-219.

Buist, A.H. et al.; "Probing microscopic chemical environments with high-intensity chirped pulses"; Optics Letters 24; 1999; pp. 244-246.

Butcher, Steve, et al., "Multiphoton approach shapes ultrafast pulses," Pulse Shaping, (2006) Institute of Physics and IOP Publishing Ltd., 3 pages.

Bychkov S. S. et al., Laser Synthesis of Chiral Molecules in Isotropic Racemic Media, Journal of Experimental and Theoretical Physics, Nauka/Interperiodica, MO, vol. 93, No. 1, Jul. 1, 2001, pp. 24-32.

Béjot, Pierre, et al., "Laser noise compression by filamentation at 400 nm in argon," Optics Express, vol. 15, No. 20 (Oct. 2007) pp. 13295-13309.

C. Dorrer et al.; "Characterization of chirped-pulse amplification systems with spectral phase interferometry for direct electric-field reconstruction"; Applied Physics B 70 (Suppl.), 2000; pp. S77-S84.

C. Dorrer et al.; "Single-shot real-time characterization of chirped-pulse amplification systems by spectral phase interferometry for direct electric-field reconstruction"; Optics Letters, vol. 24, No. 22; Nov. 15, 1999; pp. 1644-1646.

C. Dorrer et al.; "Spatio-temporal characterization of the electric field of ultrashort optical pulses using two-dimensional shearing interferometry"; Applied Physics B74 (Suppl.), 2002; pp. S209-S217.

C. Dorrer; "Implementation of spectral phase interferometry for direct electric-field reconstruction with a simultaneously recorded reference interferogram"; Optics Letters, vol. 24, No. 21; Nov. 1, 1999; pp. 1532-1534.

C. Iaconis et al.; "Direct measurement of the two-point field correlation function"; Optics Letters, vol. 21, No. 21; Nov. 1, 1996; pp. 1783-1785.

C. Radzewicz et al.; "A poor man's FROG"; Optics Communications, Dec. 15, 2000; pp. 329-333.

C. Rangan et al.; "Optimally shaped terahertz pulses for phase retrieval in a Rydberg-atom data register"; Physical Review A, vol. 64; 2001; pp. 033417-1-033417-5.

C.P.J. Barty et al.; "Generation of 18-fs, multiterawatt pulses by regenerative pulse shaping and chirped-pulse amplification"; Optics Letters, vol. 21, No. 9; May 1, 1996; pp. 668-670.

C.Y. Chien et al.; "Single-shot chirped-pulse spectral interferometry used to measure the femtosecond ionization dynamics of air"; Optics Letters, vol. 25, No. 8; Apr. 15, 2000; pp. 578-580.

Celine Nicole et al.; "Saturation of wave-packet interferences: Direct observation of spin precession in potassium atoms"; Physical Review A, vol. 60, No. 3; Sep. 1999; pp. R1755-R1758.

Ch. Warmuth et al.; "Molecular quantum dynamics in a thermal system: fractional wave packet revivals probed by random-phase fluorescence interferometry"; Journal of Chemical Physics, vol. 114, No. 22; Jun. 8, 2001; pp. 9901-9910.

Ch. Warmuth et al.; "Studying vibrational wavepacket dynamics by measuring fluorescence interference fluctuations"; Journal of Chemical Physics, vol. 112, No. 11; Mar. 15, 2000; pp. 5060-5069.

Chantal Daniel et al.; "Analysis and control of laser induced fragmentation processes in CpMn(CO)3"; Chemical Physics 267; 2001; pp. 247-260.

Chantal Daniel et al.; "Deciphering the Reaction Dynamics Underlying Optimal Control Laser Fields"; Science Magazine, vol. 299; Jan. 24, 2003; pp. 536-539.

Chen J. et al., Femtosecond Laser-Induced Dissociative Ionization and Coulomb Explosion of Ethanol, International Journal of Mass Spectrometry, Elsevier, Amsterdam, NL, vol. 241, No. 1, Feb. 15, 2005, pp. 25-29.

Chen, Bi-Chang, et al., "Characterization of a broadband pulse for phase controlled multiphoton microscopy by single beam SPIDER," Optics Letters, vol. 32, No. 16, Optical Society of America (Aug. 15, 2007) pp. 2411-2413.

Chilla, Juan L.A. et al.; "Direct determination of the amplitude and the phase of femtosecond light pulses"; Optics Letters; vol. 16, No. 1; Jan. 1, 1991; pp. 39-41.

Choi, K-S et al.; "Charge Density Wave Caused by Reducing $ThSe_3$ by One Electron. Superstructure and Short-Range Order in $ATh_2Se_6$ (A = K, Rb) Studied by X-Ray Diffraction, Electron Diffraction, and Diffuse Scattering;" J. Am. Chem. Soc., vol. 120, No. 41, 1998; pp. 10706-10714.

Chris Iaconis et al; "Self-Referencing Spectral Interferometry for Measuring Ultrashort Optical Pulses"; IEEE Journal of Quantum Electronics, vol. 35, No. 4; Apr. 1999; pp. 501-509.

Christophe Dorrer et al.; "Accuracy criterion for ultrashort pulse characterization techniques: application to spectral phase interferometry for direct electric field reconstruction"; Appl. Phys. B 74, vol. 19, No. 5, May 2002 ; pp. 1019-1029.

Christophe Dorrer et al.; "Phase Amplitude Coupling in Spectral Phase Modulation"; IEEE Journal of Selected Topics in Quantum Electronics, vol. 4, No. 2; Mar./Apr. 1998; pp. 342-345.

Christophe Dorrer et al.; "Spectral resolution and sampling issues in Fourier-transform spectral interferometry"; J. Opt. Soc. Am. B, vol. 17, No. 10; Oct. 2000; pp. 1795-1802.

Christophe Dorrer; "Influence of the calibration of the detector on spectral interferometry"; J. Opt. Soc. Am. B; vol. 16, No. 7; Jul. 1999; pp. 1160-1168.

Christopher J. Bardeen et al.; "Effect of Pulse Shape on the Efficiency of Multiphoton Processes: Implications for Biological Microscopy"; Journal of Biomedical Optics, vol. 4, No. 3; Jul. 1999; pp. 362-367.

Christopher J. Bardeen et al.; "Feedback quantum control of molecular electronic population transfer"; Chemical Physics Letters 280; 1997; pp. 151-158.

Christopher J. Bardeen et al.; "Quantum control of I2 in the gas phase and in condensed phase solid Kr matrix"; J. Chem. Phys., vol. 106, No. 20; May 22, 1997; pp. 8486-8503.

Christopher J. Bardeen et al.; "Quantum Control of NaI Photodissociation Reaction Product States by Ultrafast Tailored Light Pulses"; J. Phys. Chem. A, vol. 101, No. 20; 1997; pp. 3815-3822.

Christopher J. Bardeen et al.; "Quantum Control of Population Transfer in Green Fluorescent Protein by Using Chirped Femtosecond Pulses"; J. Am. Chem. Soc., vol. 120, No. 50; 1998; 13023-13027.

Christopher J. Bardeen et al.; "Using time-dependent rate equations to describe chirped pulse excitation in condensed phases"; Chemical Physics Letters 302; 1999; pp. 405-410.

Chu, K.C. et al.; "Direct measurement of the spectral phase of femtosecond pulses"; Optics Letters, vol. 20, No. 8; Apr. 15, 1995; pp. 904-906.

Chung, Jung-Ho, "Ambiguity of Ultrashort Pulse Shapes Retrieved From the Intensity Autocorrelation and the Power Spectrum," IEEE Journal on Selected topics in Quantum Electronics, vol. 7, No. 4 (Jul./Aug. 2001) pp. 656-666.

Clara et al.; "Femtoscond laser mass spectroscopy of ferrocenes: Photochemical stabilization by bridged cyclopentadienyl rings?"; International Journal of Mass Spectrometry, Elsevier Science Publishers, vol. 203, No. 1-3; Dec. 26, 2000; pp. 71-81.

Clement, Tracy Sharp et al.; "Single-Shot measurement of the amplitude and phase of ultrashort laser pulses in the violet"; Optics Letters, vol. 20, No. 1; Jan. 1, 1995; pp. 70-72.

Coello, Yves, "Interference without an interferometer: a different approach to measuring, compressing, and shaping ultrashort laser pulses," J. Opt. Soc. Am. B/vol. 25, No. 6 (Jun. 2008) pp. A140-A150.

Comstock et al.; "Multiphoton intrapulse interference 6; binary phase shaping"; Optics Express Opt. Soc.. America USA, vol. 12, No. 6, Mar. 22, 2004; pp. 1061-1066.

Comstock, M. et al.; "Femtosecond Photon Echo Measurements of Electronic Coherence Relaxation Between the $X(^1E_g+)$ and $B(^3II_{0u}+)$ states of $I_2$ in the Presence of He, Ar, $N_2$, $O_2$, $C_3H_8$;" J. Chem. Phys., vol. 119, No. 13, Oct. 1, 2003; pp. 6546-6553.

Comstock, M. et al.; "Rotational Wavepacket Revivals for Phase Modulation of Ultrafast Pulses;" Chemical Physics Letters, 372, 2003; pp. 739-744.

Comstock, M. et al.; "Ultrafast Laser Induced Molecular Alignment and Deformation: Experimental Evidence From Neutral Molecules and From Fragment Ions;" J. Phys. Chem. A, vol. 107, No. 40, 2003; pp. 8271-8281.

Comstock, M. et al.; "Ultrafast Transient-Grating Study of Molecules After High Intensity Excitation;" in Ultrafast Phenomena XII, 2000; 2 pages.

Cormack, I.G. et al.; "Practical measurement of femtosecond optical pulses using time-resolved optical gating"; Optics Communications 194; Jul. 15, 2001; pp. 415-424.

Craig W. Siders et al.; "Multipulse Interferometric Frequency-Resolved Optical Gating"; IEEE Journal of Quantum Electronics, vol. 35, No. 4, Apr. 1999; pp. 432-440.

Cumpston, B.H. et al.; "New Photopolymers based on Two-Photon Absorbing Chromophores and Application to Three-Dimensional Microfabricaton and Optical Storage"; Mat. Res. Soc. Symp. Proc; vol. 488; 1998; pp. 217-225.

Cumpston,B.H. et al.; "Two-photon polymerization initiators for three-dimensional optical data storage and microfabrication"; Letters to Nature; vol. 398; Mar. 4, 1999; pp. 51-54.

CVI Laser Corporation; "TNM-2 Negative Group Velocity Dispersion Mirrors"; www.cvilaser.com/ultra-fast; Jan. 13, 2002 (2 pages).

D. Abramavicius et al.; "Disentangling multidimensional femtosecond spectra of excitons by pulse shaping with coherent control"; J. of Chem. Phys., vol. 120, No. 18; May 8, 2004; pp. 8373-8378.

D. Lalovic et al.; "Quantum mechanics in terms of non-negative smoothed Wigner functions"; Physical Review A, vol. 46, No. 3; Aug. 1, 1992; pp. 1206-1212.

D. Oron et al.,; "All-optical processing in coherent nonlinear spectroscopy"; Physical Review A 70; 2004; pp. 023415-1-023415-4.

D. Oron et al.,; "Femtosecond Phase-and-Polaration Control for Background-Free Coherent Anti-Stokes Raman Spectroscopy"; Physical Review Letters, vol. 90, No. 91; May 30, 2003; pp. 213902-1-213902-4.

D. Yelin et al.; "Adaptive femtosecond pulse compression"; Optics Letters, vol. 22, No. 23, Dec. 1, 1997; pp. 1793-1795.

D. Zeidler et al.; "Amplification of tailored white-light continuum"; Applied Physics, B74 (Suppl), 2002; pp. S51-S56.

D. Zeidler et al.; "Evolutionary algorithms and their application to optimal control studies"; Physical Review A, vol. 64; 2001; pp. 023420-1-023420-13.

D.H. Schirrmeister et al; "Femtosecond pulse dependence of dissipation in molecular systems"; Chemical Physics Letters Dec. 4, 1998; pp. 383-390.

D.J. Maas et al.; "Population transfer via adiabatic passage in the rubidium quantum ladder system"; Physical Review A, vol. 59, No. 2; Feb. 1999; pp. 1374-1381.

D.J. Maas et al.; "Rotational interference in vibrational ladder climbing in NO by chirped infrared laser pulses"; Physical Review A, vol. 60, No. 2; Aug. 1999; pp. 1351-1362.

D.J. Maas et al.; Vibrational ladder climbing in NO by (sub)picosecond frequency-chirped infrared laser pulses; Chemical Physics Letters 290; 1998; pp. 75-80.

D.J. Maas et al.; "Vibrational ladder climbing in NO by ultrashort infrared laser pulses"; Chemical Physics Letters 270; May 16, 1997; pp. 45-49.

D.M. Villeneuve et al.; "Using frequency-domain manipulation of stretched femtosecond laser pulses to create fast rise and fall times on picosecond pulses"; Applied Physics B74 (Suppl), 2002; pp. S157-S161.

D.S. Chemla et al; "Ultrafast phase dynamics of coherent emission from excitons in GaAs quantum wells"; Physical Review B, vol. 50, No. 12, Sep. 15, 1995; pp. 8439-8453.

D.W. Schumacher et al.; "Phase Dependence of Intense Field Ionization"; Physical Review A, vol. 54, No. 5; Nov. 1996; pp. 4271-4278.

D.W. Schumacher et al.; "Phase Dependence of Intense Field Ionization: A Study Using Two Colors"; Physical Review Letters, vol. 73, No. 10; Sep. 5, 1994; pp. 1344-1347.

D.W. Schumacher et al.; "Programmable cesium Rydberg wave packets"; Physical Review A, vol. 52, No. 6; Dec. 1995; pp. 4719-4726.

Dai-Sik Kim et al.; "Femtosecond-pulse distortion in quantum wells"; Appl. Phys B 74, vol. 48. No. 24; Dec. 15, 1993; pp. 17902-17905.

Dan Oron et al.; "Narrow-Band Coherent Anti-Stokes Raman Signals from Broad-Band Pulses"; Physical Review Letters, vol. 88, No. 6; Feb. 11, 2002; pp. 063004-1-063004-4.

Daniel J. Kane et al.; "Convergence test for inversion of frequency-resolved optical gating spectrograms"; Optics Letters, vol. 25, No. 16, Aug. 15, 2000; pp. 1216-1218.

Daniel J. Kane et al.; "Simultaneous measurement of two ultrashort laser pulses from a single spectrogram in a single shot"; Optical Society of America; vol. 14, No. 4, Apr. 1997; pp. 935-943.

Daniel J. Kane; "Real-Time Measurement of Ultrashort Laser Pulse Using Principal Component Generalized Projection"; IEEE Journal of Selected Topics in Quantum Electronics; vol. 4, No. 2; Mar./Apr. 1998; pp. 278-284.

Dantus, Marcos et al., "Stereoisomer Recognition by MS with Shaped Laser Pulses," American Chemical Society. Abstracts of paper. At the national meeting, American Chemical Society, Washington, D.C., U.S. vol. 231 (Mar. 26, 2006) pp. 1-ANYL, XP009082814, ISSN: 0065-7727, the whole document.

Dantus, Marcos et al.; "Femtosecond Laser Observations of Molecular Vibration and Rotation;" Nature, vol. 343, Feb. 22, 1990; pp. 737-739.

Dantus, Marcos et al.; "Femtosecond Real-Time Probing of Reactions. II. The Dissociation Reaction of ICN;" J. Chem. Phys., vol. 89, No. 10, Nov. 15, 1988; pp. 6128-6140.

Dantus, Marcos et al.; "Femtosecond Real-Time Probing of Reactions. V. The reaction of IHgI;" J. Chem. Phys., vol. 91, No. 12, Dec. 15, 1989; pp. 7437-7450.

Dantus, Marcos et al.; "Real-Time Femtosecond Probing of "Transition States" In Chemical Reactions;" J. Chem. Phys., vol. 87, No. 4, Aug. 15, 1987; pp. 2395-2397.

Dantus, Marcos et al.; "Ultrafast Spectroscopy;" Encyclopedia of Applied Physics, vol. 22, 1998; pp. 431-456.

Dantus, Marcos, et al., "MIIPS characterizes and corrects femtosecond pulses," Ultrafast Optical Systems, Laser Focus World, (May 2007) XP001539450, 4 pages.

Dantus, Marcos. "Laser Control of Chemical Reactions." Chemical & Engineering News, vol. 79, 2001; p. 191.

Dantus, Marcos; "Ahmed Zewail, Nobel Laureate in Chemistry;" European Photochemistry Association (EPA) Newsletter, No. 69, Jul. 2000; 5 pages.

Dantus, Marcos; "Femtosecond Laser Pulses: Principles and Experiments;" (Book Review) J. Am. Chem. Soc., vol. 121, No. 37, 1999; pp. 8677-8678.

Dantus, Marcus; "Ultrafast Probing and Control of Molecular Dynamics: Beyond the Pump-Probe Method"; pp. 169-188. Kuhn & Weyh SRZ Sep. 4, 2001.

David C. Clary; "Quantum Theory of Chemical Reaction Dynamics"; Science, vol. 279, Mar. 20, 1998; p. 1879.

David J. Jones et al.; "Carrier-Envelope Phase Control of Femtosecond Mode-Locked Lasers and Direct Optical Frequency Synthesis"; Science magazine, vol. 288; Apr. 28, 2000; pp. 635-639.

David J. Tannor et al.; "Control of selectivity of chemical reaction via control of wave packet evolution"; J. Chem. Phys., vol. 83, No. 10; Nov. 15, 1985; pp. 5013-5018.

David M. Jonas et al.; "Femtosecond Wavepacket Spectroscopy: Influence of Temperature, Wavelength and Pulse Duration"; J. Phys. Chem.; 1995; pp. 2594-2608.

David N. Fittinghoff et al.; "Frequency-Resolved Optical Gating Measurement of Ultrashort Pulses Passing Through a High Numerical Aperture Objective"; IEEE Journal of Quantum Electronics, vol. 35, No. 4, Apr. 1999; pp. 479-486.

David N. Fittinghoff et al.; "Measurement of the intensity and phase of ultraweak, ultrashort laser pulses"; Optics Letters, vol. 21, No. 12; Jun. 15, 1996; pp. 884-886.

David N. Fittinghoff et al.; "Noise sensitivity in frequency-resolved optical-gating measurements of ultrashort pulses"; J. Opt. Soc. Am. B, vol. 12, No. 10, Oct. 1995; pp. 1955-1967.

Dela Cruz, J. et al., "Use of coherent control methods through scattering biological tissue to achieve functional imaging," PNAS, vol. 101, No. 49, Dec. 7, 2004, pp. 16996-17001.

Dela Cruz, J. M. et al.; "Coherent Control Improves Biomedical Imaging With Ultrashort Shaped Pulses;" Journal of Photochemistry and Photobiology A: Chemistry 180, Mar. 2006; pp. 307-313.

Dela Cruz, J.M. et al.; "Multiphoton Intrapulse Interference 3: Probing Microscopic Chemical Environments"; J. Phys. Chem. A 2004, 108; pp. 53-58.

Dela Cruz, Johanna M., et al., "Multidimensional analysis with shaped femtosecond pulses: identification of conformational and geometric isomers and mixtures using mass spectrometry," American Chemical Society. Abstracts of paper. At the national meeting, American Chemical Society, Washington, D.C., U.S., vol. 230, (Aug. 28, 2005) p. U418, XP009082815, ISSN: 0065-7727, the whole document.

Dela Cruz, Johanna M., et al., "Quantitative mass spectrometric identification of isomers applying coherent laser control," Journal of Physical Chemistry A ACS USA, vol. 109, No. 38 (Sep. 29, 2005) pp. 8447-8450, XP002431289, ISSN: 1089-5639, figure 1.

Delfyett, Peter J., et al., "High-Power Ultrafast Laser Diodes", IEEE Journal of Quantum Electronics, vol. 28, No. 10, (Oct. 1992), pp. 2203-2219.

Delong, K.W., et al., "Frequency Resolved Optical Gating with the Use of 2nd-Harmonic Generation." Journal of Optical Society of America B-Optical Physics, 1994. 11 (11): pp. 2206-2215.

Derryck T. Reid; "Algorithm for Complete and Rapid Retrieval of Ultrashort Pulse Amplitude and Phase from a Sonogram"; IEEE Journal of Quantum Electronics; vol. 35, No. 11, Nov. 1999; pp. 1584-1589.

Dietrich, P. et al.; "Determining the absolute carrier phase of a few-cycle laser pulse"; Optics Letters, vol. 25, No. 1, Jan. 1, 2000; pp. 16-18.

Ding. Y.; "Femtosecond pulse shaping by dynamic holograms in photorefractive multiple quantum wells"; Optics Letters; vol. 22, No. 10; May 15, 1997; pp. 718-720.

Dong Gun Lee et al.; "Coherent Control of High-Order Harmonics with Chirped Femtosecond Laser Pulses"; Physical Review Letters, vol. 87, No. 24, Dec. 10, 2001; pp. 243902-1-243902-4.

Donna Strickland et al.; "Compression of Amplified Chirped Optical Pulses"; Optics Communications; vol. 55, No. 6; Oct. 15, 1985; pp. 447-449.

Doron Meshulach et al.; "Coherent quantum control of two-photon transitions by a femtosecond laser pulse"; Nature magazine, vol. 396; Nov. 19, 1998; pp. 239-242.

Dorrer, C. et al.; "Direct space-time characterization of the electric fields of ultrashort optical pulses"; Optics Letters, vol. 27, No. 7; Apr. 1, 2002; pp. 548-550.

Dorrer, Christophe et al.; "Precision and consistency criteria in spectral phase interferometry for direct electric-field reconstruction"; J. Opt. Soc. Am. B, vol. 19, No. 5; May 2002; pp. 1030-1038.

Dreischuh, A., Experimental Demonstraction of Pulse Shaping and Shortening by Spatial Filtering of an Induced-Phase-Modulated Probe Wave, IEEE Journal of Quantum Electronics, vol. 33, No. 3, (Mar. 1997), pp. 329-335.

Drexler W. et al.; "In vivo ultrahigh-resolution optical coherence tomography"; Optics Letters; vol. 24, No. 17; Sep. 1, 1999; pp. 1221-1223.

Dudley, John M. et al.; "Complete Characterization of Ultrashort Pulse Sources at 1550 nm"; IEEE Journal of Quantum Electronics, vol. 35, No. 4; Apr. 1999; pp. 441-450.

Dudovich, N. et al; "Transform-limited pulses are not optimal for resonant multiphoton transitions"; Phys. Rev. Lett. 86; 2001; pp. 47-50.

Dugan, M.A., et al., "High-resolution acousto-optic shaping of unamplified and amplified femtosecond laser pulses", J. Opt. Soc. Am. B, vol. 14, No. 9, (Sep. 1997), pp. 2348-2358, Optical Society of America.

E. Tokunaga et al.; "Frequency-domain interferometer for femtosecond time-resolved phase spectroscopy"; Optics Letters, vol. 17, No. 16; Aug. 15, 1992, pp. 1131-1133.

E. Zeek et al.; "Adaptive pulse compression for transform-limited 15-fs high-energy pulse generation"; Optics Letters, vol. 25, No. 8; Apr. 15, 2000; pp. 587-589.

E.T.J. Nibbering et al.; "Spectral determination of the amplitude and the phase of intense ultrashort optical pulses"; J. Opt. Soc. Am. B, vol. 13, No. 2; Feb. 1996; pp. 317-329.

Efimov, A., et al., "Programmable shaping of ultrabroad-bandwidth pulses from a Ti:sapphire laser", Journal B/vol. 12, No. 10 (Oct. 1995) pp. 1968-1980, Optical Society of America.

Elizabeth Mirowski et al.; "Effect of nonresonant frequencies on the enhancement of quantum beat amplitudes in rovibrational states of Li2: The role of state spacing"; Journal of Chemical Physics, vol. 117, No. 24; Dec. 22, 2002; pp. 11228-11238.

F. Gelmukhanov et al.; "Dynamics of two-photon absorption by molecules and solutions"; J. Opt. Soc. Am. B, vol. 19, No. 5, May 2002; pp. 937-945.

F. Legare et al.; "Laser pulse control of Raman processes by chirped non-adiabatic passage"; Journal of Raman Spectroscopy; 2000; pp. 15-23.

F. Romstad et al.; "Measurement of Pulse Amplitude and Phase Distortion in a Semiconductor Optical Amplifier: from Pulse Compression to Breakup"; IEEE Photonics Technology Letters, vol. 12, No. 12; Dec. 2000; pp. 1674-1676.

F.M. Reinert, M. Ninck, W. Lüthy, T. Feurer, Shaping a Femtosecond Pulse with a Programmable Thermo-Optically Driven Phase Modulator, Optics Express, vol. 15, No. 7, Apr. 2, 2007, six pages.

Fermann, M.E., et al., "Additive-pulse-compression mode locking of a neodymium fiber laser", Optics Letters, vol. 16, No. 4, (Feb. 15, 1991), Optical Society of America.

Fetterman, et al., "Ultrafast pulse shaping: amplification and characterization", Optics Express, vol. 3, No. 10, (Nov. 9, 1998), pp. 366-375.

Feurer, T., et al., "Coherent Control Over Collective Polariton Excitations: The Dawn of Polaritonics", 2002 Thirteenth International Conference on Ultrafast Phenomena, Technical Digest (Tops vol. 72); Opt. Soc. America; XP008086358 (pp. 541-545).

Fork, R.L., et al., "Compression of optical pulses to six femtoseconds by using cubic phase compensation", Optics Letters, (Jul. 1987), vol. 12, No. 7, Optical Society of America.

Fujimoto, Masatoshi, et al., "Programmable shaping of a subterawatt, femtosecond laser pulse by modulating the spectral phase of the preamplified pulse," Optics Communications, 280 (2007) ScienceDirect, pp. 404-407.

G. Roberts; "Abstract-Interference effects in femtosecond spectroscopy"; Philosophical Transactions of the Royal Society of London Series A—Mathematical Physical and Engineering Sciences; 360 (1794): 987-1021; May 15, 2002 (1 page).

G.G. Paulus et al.; "Absolute-phase phenomena in photoionization with few-cycle laser pulses"; Nature, vol. 414; Nov. 8, 2001; pp. 182-184.

Gabriel Turinici et al.; "Quantum wavefunction controllability"; Chemical Physics 267; 2001; pp. 1-9.

Geller, A., et al., "Pulse shaper assisted short laser pulse characterization," Applied Physics B90, Lasers and Optics (Jan. 2008) pp. 427-430.

Gallmann, L. et al.; "Spatially resolved amplitude and phase characterization of femtosecond optical pulses"; Optics Letters, vol. 26, No. 2; Jan. 15, 2001; pp. 96-98.

Gallmann, L. et al.; "Techniques for the characterization of sub-10-fs optical pulses: a comparision"; Appl. Phys. B 70 (Suppl): 2000; pp. S67-S75.

Gallmann, L., et al., "Characterization of sub-6-fs optical pulses with spectral phase interferometry for direct electric-field reconstruction," Optics Letters, vol. 24, No. 18 (Sep. 15, 1999) p. 13140-1316.

Gee, S., et al., "Ultrashort Pulse Generation by Intracavity Modelocked Semiconductor Lasers", IEEE Journal of Quantum Electronics, vol. 36, No. 9, Sep. 2000, XP-002462407, pp. 1035-1040.

Geindre, J.P. et al.; "Single-shot spectral interferometry with chirped pulses"; Optics Letters, vol. 26, No. 20; Oct. 15, 2001; pp. 1612-1614.

Gomes, A.S.L., et al., "Optical fibre-grating pulse compressors", Tutorial Review, Optical and Quantum Electronics 20, (1988), pp. 95-112.

Goswami, D.; "Optical pulse shaping approaches to coherent control"; Physics Reports 374; 2004; pp. 385-481.

Goswami, D.; "Ultrafast Pulse Shaping Approaches to Quantum Computing"; Indian Institute of Technology; Dec. 24, 2003 (8 pages).

Greg Taft et al.; "Measurement of 10-fs Laser Pulses"; IEEE Journal of Selected Topics in Quantum Electronics, vol. 2, No. 3, Sep. 1996; pp. 575-585.

Gregory D. Goodno et al.; "Ultrafast heterodyne-detected transient-grating spectroscopy using diffractive optics"; Optical Society of America, vol. 15, No. 6, Jun. 1998; pp. 1791-1794.

Grimberg, B. I. et al.; "Ultrafast Nonlinear Spectroscopic Techniques in the Gas Phase and Their Density Matrix Representation;" J. Phys. Chem. A, vol. 106, No. 5, Feb. 7, 2002; pp. 697-718.

Gross, P. et al.; "Femtosecond Photoassociation: Coherence and Implications for Control in Bimolecular Reactions;" J. Chem. Phys., vol. 106, No. 19, May 15, 1997; pp. 8013-8021.

Gunaratne, T. et al.; "Influence of Bandwidth and Phase Shaping on Laser Induced Breakdown Spectroscopy With Ultrashort Laser Pulses;" Chemical Physics Letters 423, Apr. 3, 2006; pp. 197-201.

Gunn, J M et al: "Polarization and phase control of remote surface-plasmon-mediated twophoto-induced emission and waveguiding" Nano Letters American Chem. Soc. USA, vol. 6, No. 12, Aug. 2006.

H. Miao, A. Weiner, C. Langrock, R. Roussev, M. Fejer, Sensing and Compensation of Femtosecond Waveform Distortion Induced by All-Order Polarization Mode Dispersion at Selected Polarization States, Optics Letters, vol. 32, No. 4, Feb. 15, 2007, pp. 424-426.

H. Takada et al.; "Large-ratio stretch and recompression of sub-10-fs pulses utilizing dispersion managed devices and a spatial light modulator"; Appl. Phys. B 74 [Suppl.]; 2002; pp. S253-S257.

H. Wang et al.; "Abstract-20-fs pulse shaping with a 512-element phase-only liquid crystal modulator"; IEEE Journal of Selected Topics in Quantum Electronics; 7 (4): 718-727; Jul./Aug. 2001 (1 page).

H. Zou, C. Zhou, Femtosecond Pulse Shaping with Space-to-Time Conversion Based on Planar Optics, Optik Optics, ScienceDirect, 2006/2007, pp. 5-8.

H.A. Kim et al.; "Expanded concept of the adiabatic population transfer using dressed states"; Physical Review A, vol. 59, No. 2; Feb. 1999; pp. 1404-1407.

H.S. Eisenberg et al.; "Phase Defects in Self-Focusing of Ultrashort Pulses"; Physical Review Letters, vol. 83, No. 3, Jul. 19, 1999; pp. 540-543.

H.S. Moon et al.; "Coherence control using the ratio of Rabi frequencies for complete coherent inversion in a four-level system"; J. Phys. B At. Mol. Phys. vol. 32; 1999; pp. 987-999.

Hacker, M. et al.; "Frequency doubling of phase-modulated, ultrashort laser pulses"; Appl. Phys. B 73; 2001; pp. 273-277.

Haner, M., et al., "Generation of programmable, picosecond-resolution shaped laser pulses by fiber-grating pulse compression", Optics Letters, vol. 12, No. 6, (Jun. 1987), pp. 398-400, Optical Society of America.

Hanna, Sherif F. et al.; "Electronic-resonance-enhanced coherent anti-Stokes Raman spectroscopy of nitric oxide"; Applied Physics Letters; vol. 83, No. 9, Sep. 1, 2003; pp. 1887-1889.

Hans U. Stauffer et al.; "Simultaneous phase control of Li2 wave packets in two electronic states"; Journal of Chemical Physics, vol. 116, No. 3; Jan. 15, 2002; pp. 946-954.

Hasan, T. et al.; "Photodynamic Therapy of Cancer"; Chapter 40 in Holland Frei Cancer Medicine; BC Dekker Inc.; 2003.

Heritage, J.P., "Picosecond pulse shaping by spectral phase and amplitude manipulation", Optics Letters, vol. 10, No. 12, (Dec. 1985), pp. 609-611, Optical Society of America.

Herschel Rabitz et al.; "Optimal Control of Molecular Motion: Design, Implementation and Inversion"; Acc. Chem. Res., vol. 33, No. 8; 2000; pp. 572-578.

Herschel Rabitz et al.; "Whither the Future of Controlling Quantum Phenomena?"; Science magazine, vol. 288; May 5, 2000; pp. 824-828.

Hilary K. Eaton et al.; "Investigating Nonlinear Femtosecond Pulse Propagation with Frequency-Resolved Optical Gating"; IEEE Journal of Quantum Electronics, vol. 35, No. 4, Apr. 1999; pp. 451-458.

Hillegas, C.W. et al.; "Femtosecond laser pulse shaping by use of microsecond radiofrequency pulses"; Optics Letters; vol. 19, No. 10; May 15, 1994; pp. 737-739.

Hoki, K. et al., Locally Designed Pulse Shaping for Selective Preparation of Enantiomers from their Racemate, Journal of Chemical Physics, New York, NY, US, vol. 114, No. 4, Jan. 22, 2001, pp. 1575-1581.

Hoki, K. et al., Selective Preparation of Enantiomers from a Racemate by Laser Pulses: Model Simulation for Oriented Atropisomers with Coupled Rotations and Torsions, Chemical Physics Elsevier Netherlands, vol. 267, No. 1-3, Jun. 1, 2001, pp. 59-79.

Hornung, Thomas et al.; "Adapting optimum control theory and using learning loops to provide experimentally feasible shaping mask patterns"; Journal of Chemical Physics; vol. 115, No. 7; Aug. 15, 2001; pp. 3105-3111.

Hosseini, S. Abbas et al.; "Coherent control of multiphoton transitions with femtosecond pulse shaping"; Physical Review A; pp. 033410-1-033410-7.

Hu et al.; "A New Nonlinear Optical Crystal-$BaAlBO_3F_2$(BABF)"; Japanese Journal of Applied Physics, vol. 41, No. 10B, Part 2, Oct. 15, 2002; pp. L1131-L1133.

I. Amat-Roldan et al.; "Measurement of electric field by interferometric spectral trace observation"; Optics Letters, vol. 30, No. 9; May 1, 2005; pp. 1063-1065.

I. Amat-Roldan et al.; "Starch-based second-harmonic-generated colinear frequency-resolved optical gating pulse characterization at the focal plane of a high-numerical-aperture lens"; Optics Letters, vol. 29, No. 19; Oct. 1, 2004; pp. 2282-2284.

I. Bar et al.; "Direct observation of preferential bond fission by excitation of a vibrational fundamental: Photodissociation of HOD (0,0,1)"; J. Chem. Phys., vol. 93, No. 3; Aug. 1, 1990; pp. 2146-2148.

I. Bar et al.; "Mode-selective bond fission: Comparison between the photodissociation of HOD (0,0,1) and HOD (1,0,0)"; J. Chem. Phys. vol. 95, No. 5; Sep. 1, 1991; pp. 3341-3346.

I.G. Cormack et al.; "Rapid measurement of ultrashort-pulse amplitude and phase from a two-photon absorption sonogram trace"; J. Opt. Soc. Am. B; vol. 18, No. 9, Sep. 2001; pp. 1377-1382.

Iaconis, C. et al.; "Direct Interferometric Techniques for Characterizing Ultrashort Optical Pulses"; IEEE Journal of Selected Topics in Quantum Electronics, vol. 4, No. 2; Mar./Apr. 1998; pp. 285-294.

Iaconis, C. et al.; "Spectral phase interferometry for direct electric-field reconstruction of ultrashort optical pulses"; Optics Letters, vol. 23, No. 10, May 15, 1998; pp. 792-794.

Imeshev, G. et al. "Engineerable femtosecond pulse shaping by second-harmonic generation with Fourier synthetic quasi-phase-matching gratings"; Optics Letters; vol. 23, No. 11; Jun. 1, 1998; pp. 864-866.

J. Ahn et al.; "Information Storage and Retrieval Through Quantum Phase"; Science Magazine, vol. 287; Jan. 21, 2000; pp. 463-465.

J. Ahn et al.; "Quantum Phase Retrieval of a Rydberg Wave Packet Using a Half-Cycle Pulse"; Physical Review Letters, vol. 86, No. 7; Feb. 12, 2001; pp. 1179-1182.

J. M. Dudley, et al.; "Direct measurement of puslse distortion near the zero-disperson wavelength in an optical fiber by frequency-resolved optical gating"; Optics Letters, vol. 22, No. 7; Apr. 1, 1997; 457-459.

J. Peatross et al.; "Temporal decorrelation of short laser pulses"; J. Opt. Soc. Am. B, vol. 15, No. 1; Jan. 1998; pp. 216-222.

J. W. Nicholson et al.; "Full-field characterization of femtosecond pulses by spectrum and cross-correlation measurements"; Optics Letters, vol. 24, No. 23; Dec. 1, 1999; pp. 1774-1776.

J.F. Christian et al.; "Rubidium electronic wavepackets probed by a phase-sensitive pumpprobe technique"; Optics Communications, vol. 103, No. 1/2; Nov. 1, 1993; pp. 79-84.

J.G. Underwood et al.,; "Switched Wave Packets: A Route to Nonperturbative Quantum Control"; Physical Review Letters, vol. 90, No. 22; Jun. 6, 2003; pp. 223001-1-223001-4.

J.J. Garcia-Ripoll et al.; "Speed Optimized Two-Qubit Gates with Laser Coherent Control Techniques for Ion Trap Quantum Computing"; Physical Review Letters, vol. 91, No. 15; Oct. 10, 2003; pp. 157901-1-157901-4.

J.J. Gerdy et al.; "Femtosecond selective control of wave packet population"; Chemical Physics Letters, vol. 171, No. 1/2; Jul. 27, 1990; pp. 1-4.

J.M. Geremia et al.; "Incorporating physical implementation concerns into closed loop quantum control experiments"; Journal of Chemical Physics, vol. 113, No. 24; Dec. 22, 2000; pp. 10841-10848.

J.P. Likforman et al.; "Measurement of photon echoes by use of femtosecond Fourier-transform Spectral Interferometry"; Optics Letters, vol. 22, No. 14; Jul. 15, 1997; pp. 1104-1106.

J.P. Ogilvie et al.; "Fourier transform measurement of two-photon excitation spectra: applications to microscopy and optimal control"; Optics Letters, vol. 30, No. 8; Apr. 15, 2005; pp. 911-913.

J.S. Keller et al.; "Selective bond fission in methyl mercaptan at 193 nm via radial derivative coupling between the 21A" and 11A" adiabatic electronic states"; J. Chem. Phys. vol. 96, No. 6; Mar. 15, 1992; pp. 4324-4329.

J.S. Melinger et al.; "Adiabatic population inversion in I2 vapor with picosecond laser pulses"; J. Chem Phys. vol. 95, No. 3; Aug. 1, 1991; pp. 2210-2213.

J.S. Melinger et al.; "Adiabatic population transfer with frequency-swept laser pulses"; J. Chem. Phys. vol. 101, No. 8; Oct. 15, 1994; pp. 6439-6454.

J.S. Melinger et al.; "Generation of Narrowband Inversion with Broadband Laser Pulses"; vol. 68, No. 13; Mar. 30, 1992; pp. 2000-2003.

J.W. Nicholson et al.; "Unbalanced third-order correlations for full characterization of femtosecond pulses"; Optics Letters, vol. 25, No. 24; Dec. 15, 2000; pp. 1801-1803.

Jasco Comparison Proven Spectroscopy & Chromatography Technology, J-815 Circular Dichroism Spectropolarimeter, Jasco UK, http://www.jasco.co.uk/j800.asp, Nov. 29, 2006; 2 pages.

Jeffrey A. Cina; "Nonlinear wavepacket interferometry for polyatomic molecules"; Journal of Chemical Physics, vol. 113, No. 21; Dec. 1, 2000; pp. 9488-9496.

Jeffrey L. Krause et al.; "Creating and Detecting Shaped Rydberg Wave Packets"; Physical Review Letters, vol. 79, No. 25; Dec. 22, 1997; pp. 4978-4981.

Jeffrey L. Krause et al.; "Optical control of molecular dynamics: Molecular cannons, reflectrons and wave-packet focusers"; J. Chem. Phys. 99(9); Nov. 1, 1993; pp. 6562-6578.

Jeffrey L. Krause et al.; "Quantum Control of Molecular Dynamics: The Strong Response Regime"; J. Phys. Chem; 1995, 99; pp. 13736-13747.

Jennifer L. Herek et al.; "Quantum control of energy flow in light harvesting"; Nature magazine, vol. 417; May 30, 2002; pp. 533-535.

Jerome Degert et al.; "Realization of a Time-Domain Fresnel Lens with Coherent Control"; Physical Review Letters, vol. 89, No. 20; Nov. 11, 2002; pp. 203003-1-203003-4.

Jerome Tignon et al.; "Spectral Interferometry of Semiconductor Nanostructures"; IEEE Journal of Quantum Electronics, vol. 35, No. 4; Apr. 1999; pp. 510-522.

Jiang, et al. "Spectral line-by-line pulse shaping," Optics Letters, vol. 30, No. 12 (Jun. 15, 2005) Optical Society of America, pp. 1557-1559.

Jiang, et al., "Line-by-line pulse shaping control of optical arbitrary waveform generation," Optics Express, vol. 13, No. 25, (Dec. 12, 2005) Optical Society of America, pp. 10431-10439.

Jianshu Cao et al.; "A simple physical picture for quantum control of wave packet localization"; J. Chem Phys., 107; Aug. 1, 1997; pp. 1441-1450.

Jianshu Cao et al.; "Intrapulse Dynamical Effects in Multiphoton Processes: Theoretical Analysis"; J. Phys. Chem. A; vol. 102, 1998; pp. 4284-4290.

Jianshu Cao et al.; "Molecular Pi Pulse for Total Inversion of Electronic State Population"; Physical Review Letters, vol. 80, No. 7; Feb. 16, 1998; pp. 1406-1409.

Jianshu Cao et al.; "Molecular pie pulses: Population inversion with positively chirped short pulses"; Journal of Chemical Physics, vol. 113, No. 5; Aug. 1, 2000; pp. 1898-1909.

Jianwei Che et al.; "Detection and Control of Molecular Quantum Dynamics"; J. Phys. Chem.; 1995; pp. 14949-14958.

Jianwei Che et al.; "Semiclassical Dynamics and Quantum Control in Condensed Phases: Application to 12 in a Solid Argon Matrix"; J. Phys. Chem. 1996, 100; pp. 7873-7883.

John D. Hybl et al; "Two-dimensional Fourier transform electronic spectroscopy"; Journal of Chemical Physics, vol. 115, No. 14; Oct. 8, 2001; pp. 6606-6622.

John M. Jean et al.; "Application of a multilevel Redfield theory to electron transfer in condensed phases"; J. Chem. Phys. 96; Apr. 15, 1992; pp. 5827-5842.

John M. Papanikolas et al.; "Erratum: Manipulation of rovibrational wave packet composition in the Li2 E(Eg) shelf state using intermediate state selection and shaped femtosecond laser pulses"; J. Chem Phys. 107, 4172; 1997; p. 10830.

John M. Papanikolas et al.; "Manipulation of rovibrational wave packet composition in the Li2 E(1Eg) shelf state using intermediate state selection and shaped femtosecond laser pulses"; J. Chem. Phys., vol. 107, No. 11; Sep. 15, 1997; pp. 4172-4178.

Joshua B. Ballard et al.; "Optimization of wave packet coefficients in Li 2 using an evolutionary algorithm: The role of resonant and nonresonant wavelengths"; Journal of Chemical Physics, vol. 116, No. 4; Jan. 22, 2002; pp. 1350-1360.

Joshua B. Ballard et al.; "Simultaneous control of time-dependent population transfer dynamics and wave-packet quantum interferences in Li2 by shaped ultrafast pulses"; Physical Review A 66; 2002; pp. 043402-1-043402-7.

Juan L.A. Chilla et al.; "Analysis of a Method of Phase Measurement of Ultrashort Pulses in the Frequency Domain"; IEEE Journal of Quantum Electronics, vol. 27, No. 5, May 1991; pp. 1228-1235.

Julie A. Gruetzmacher et al.; "Few-cycle mid-infrared pulse generation, characterization and coherent propagation in optically dense media"; Review of Scientific Instruments, vol. 73, No. 6; Jun. 2002; pp. 2227-2236.

Julie A. Gruetzmacher et al.; "Time and Frequency-Gated FID: a New Approach to Study the Vibrational Dephasing of Water"; Ultrafast Phenomena XII, 66; pp. 530-532.

Julie A. Mueller et al.; "Competing isomeric product channels in the 193 nm photodissociation of 2-chloropropene and in the unimolecular dissociation of the 2-propenyl radical"; Journal of Chemical Physics, vol. 114, No. 10; Mar. 8, 2001; pp. 4505-4521.

June-Koo Rhee et al.; "Real-time dispersion analyzer of femtosecond laser pulses with use of a spectrally and temporally resolved upconversion technique"; J. Opt. Soc. Am. B, vol. 13, No. 8; Aug. 1996; pp. 1780-1785.

Jung-Ho Chung et al.; "Ambiguity of Ultrashort Pulse Shapes Retrieved From the Intensity Autocorrelation and the Power Spectrum"; IEEE Journal on Selected Topics of Quantum Electronics, vol. 7, No. 4; Jul./Aug. 2001; pp. 656-666.

K.C. Chu et al.; "Temporal interferometric measurement of femtosecond spectral phase"; Optics Letters, vol. 21, No. 22; Nov. 15, 1996; pp. 1842-1844.

K.D. Belfield et al.; "Multiphoton-absorbing organic materials for microfabrication, emerging optical applications and non-destructive three-dimensional imaging"; J. of Phys. Organic Chem., 13; 2000; pp. 837-849.

K.H. Hong et al.; "Time-frequency analysis of chirped femtosecond pulses using Wigner distribution function"; Applied Physics B74 (Suppl), 2002; pp. S231-S236.

Kaindl, Robert A. et al.; "Generation, shaping, and characterization of intense femtosecond pulses tunable from 3 to 20 µm"; J. Opt. Soc. Am. B; vol. 17, No. 12; Dec. 2000; pp. 2085-2094.

Kakehata, Masayuki et al.; "Single-shot measurement of carrier-envelope phase changes by spectral interferometry"; Optics Letters, vol. 26, No. 18; Sep. 15, 2001; pp. 1436-1438.

Kane, Daniel J. et al.; "Single-shot measurement of the intensity and phase of a femtosecond UV laser pulse with frequency-resolved optical gating"; Optics Letters, vol. 19, No. 14; Jul. 15, 1994; pp. 1061-1063.

Kane, Daniel J. et al.; "Single-shot measurement of the intensity and phase of an arbitrary ultrashort pulse by using frequency-resolved optical gating"; Optics Letters, vol. 18, No. 10; May 15, 1993; pp. 823-825.

Kapteyn, Henry C. et al.; "A Comparison of Multipass Vs. Regenerative Ti:Sapphire Laser Amplifiers;" Kapteyn-Murnane Laboratories Inc., Boulder, CO, USA, www.kmlabs.com; (2003) 2 pages.

Kazunori Naganuma et al; "General Method for Ultrashort Light Pulse Chirp Measurement"; IEEE Journal of Quantum Electronics, vol. 25, No. 5; Jun. 1989; pp. 1225-1233.

Kazuya Takasago et al.; "Evaluation of Femtosecond Pulse Shaping with Low-Loss Phase-Only Masks"; IEEE Journal of Selected Topics in Quantum Electronics, vol. 4, No. 2; Mar./Apr. 1998; pp. 346-352.

Kenji Mishima et al.; "A theoretical study on laser control of a molecular nonadiabatic process by ultrashort chirped laser pulses"; Journal of Chemical Physics, vol. 109., No. 5; Aug. 1, 1998; pp. 1801-1809.

Kenji Mishima et al.; "Theoretical study on quantum control of photodissociation and photodesorption dynamics by femtosecond chirped laser pulses"; Journal of Chemical Physics, vol. 110, No. 16; Apr. 22, 1999; pp. 7756-7769.

Kim, D.S. et al; "Femtosecond pulse distortion in GaAs quantum wells and its effect on pump-probe or four-wave-mixing experiments"; Physical Review B; vol. 50, No. 24; Dec. 15, 1994; pp. 18240-18249.

Kohler, Bern et al.; "Phase and intensity characterization of femtosecond pulses from a chirped-pulse amplifier by frequency-resolved optical gating"; Optics Letters, vol. 20, No. 5; Mar. 1, 1995; pp. 483-485.

Kolenda, Jürgen, et al., "Pulse Shaping with the MIIPS-Process," Laser Technology, (Jan. 2008) Photonik International, p. 68.

Konorov, S.O., "Laser Breakdown with Millijoule Trains of Picosecond Pulses Transmitted through a Hollow-Core Photonic-Crystal Fiber", Laser Physics, vol. 13, No. 4, (2003) pp. 652-656.

Kosik, Ellen M., et al., "The effects of noise on ultrashort optical pulse measurement using SPIDER"; The Institute of Optics, University of Rochester, Rochester, NY; (2000) pp. 21-23.

Krausz, F., et al., "Generation of 33-fs optical pulses from a solid-state laser", Optics Letters, (Feb. 1, 1992), vol. 17, No. 3, Optical Society of America.

Kroner, D. et al., Asymmetric Laser Excitation in Chiral Molecules: Quantum Simulations for a Proposed Experiment, Chemical Physics Letters Elsevier Netherland, vol. 372, No. 1-2, Apr. 22, 2003, pp. 242-248.

Kubo, Atsushi, et al., "Femtosecond Imaging of Surface Plasmon Dynamics in a Nanostructured Silver Film," Nano Letters, vol. 5, No. 6 (2005) American Chemical Society, pp. 1123-1127.

L. Lepetit et al.; "Linear techniques of phase measurement by femtosecond spectral interferometry for applications in spectroscopy"; J. Opt. Soc. Am. B, vol. 12, No. 12; Dec. 1995; pp. 2467-2474.

L. Lepetit et al.; "Two-dimensional nonlinear optics using Fourier-transform spectral interferometry"; Optics Letters, vol. 21, No. 8; Apr. 15, 1996; pp. 564-566.

L. Marmet et al.; "Observation of Quasi-Landau Wave Packets"; Physical Review Letters, vol. 72, No. 24; Jun. 13, 1994; pp. 3779-3782.

L. Misoguti et al.; "Generation of Broadband VUV Light Using Third-Order Cascaded Processes"; Physical Review Letters, vol. 87, No. 1, Jul. 2, 2001; pp. 013601-1-013601-4.

L. Windhorn et al.; "Molecular dissociation by mid-IR femtosecond pulses"; Chemical Physics Letters 357, May 3, 2002; pp. 85-90.

L. Xu et al.; "Abstract-Programmable chirp compensation for 6-fs pulse generation with a prism-pair-formed pulse shaper"; IEEE Journal of Quantum Electronics; 36 (8): 893-899; Aug. 2000 (1 page).

L.D. Noordam et al.; "Redistribution of Rydberg States by Intense Picosecond Pulses"; Physical Review Letters, vol. 68, No. 10; Mar. 9, 1992; pp. 1496-1499.

L.D. Ziegler et al.; "Nonlinear polarization description of phase-locked pulse-pair spectroscopy"; J. Chem. Phys., vol. 97, No. 7; Oct. 1, 1992; pp. 4704-4713.

L.J. Butler et al.; "Bond selective photochemistry in CH2BrI through electronic excitation at 210 nm"; J. Chem. Phys., vol. 84, No. 7; Apr. 1, 1986; pp. 4104-4106.

L.J. Butler et al.; "The electronic state-selective photodissociation of CH2BrI at 248, 210 and 193 nm"; J. Chem. Phys. vol. 86, No. 4; Feb. 15, 1997; pp. 2051-2074.

Laarmann, T., et al., "Femtosecond pulse shaping as analytic tool in mass spectrometry of complex polyatomic systems," J Phys B-at Mol Opt 2008;41(7).

Langchi Zhu et al.; "Coherent Laser Control of the Product Distribution Obtained in the Photoexcitation of HI"; Science Magazine, vol. 270; Oct. 6, 1995; pp. 77-80.

Lange, H. Rudiger et al.; "Reconstruction of the Time Profile of Femtosecond Laser Pulses through Cross-Phase Modulation"; IEEE Journal of Selected Topics in Quantum Electronics, vol. 4, No. 2; Mar./Apr. 1998; pp. 295-300.

Larson, D.R. et al.; "Water soluble quantum dots for multiphoton imaging in vivo"; Science 300: May 30, 2003; pp. 1434-1436.

Leibfried, D. et al.; "Quantum information with trapped ions at NIST"; Journal of Modern Optics; vol. 50, No. 6/7; Apr.-May 2003; pp. 1115-1129.

Lemoff, B.E., et al., "Quintic-phase-limited, spatially uniform expansion and recompression of ultrashort optical pulses", Optics Letters, vol. 18, No. 19, (Oct. 1, 1993), pp. 1651-1653, Optical Society of America.

Lim, Sang-Hyun et al.; "Single-Pulse Phase-Control Interferometric Coherent Anti-Stokes Raman Scattering Spectroscopy;" Physical Review A, 72, (Oct. 2005); pp. 041803-1-041803-4.

Link, Stephan et al.; "Optical Properties and Ultrafast Dynamics of Metallic Nanocrystals;" Annu. Rev. Phys. Chem. 54, 2003; pp. 331-369.

Liu, Yongqian, et al., "Terahertz Waveform Synthesis via Optical Pulse Shaping", IEEE Journal of Selected Topics in Quantum Electronics, (Sep. 1996), vol. 2, No. 3, pp. 709-719.

Lorenzo Pesce et al.; "Quantum dynamics simulation of the ultrafast photoionization of Li2"; Journal of Chemical Physics, vol. 114, No. 3; Jan. 15, 2001; pp. 1259-1271.

Lozovoy, V. V. et al.: "Multiphoton Intrapulse Interference. IV. Ultrashort Laser Pulse Spectral Phase Characterization and Compensation;" Optics Letters, vol. 29, No. 7, Apr. 1, 2004; pp. 775-777.

Lozovoy, V. V. et al.; "Cascaded Free-Induction Decay Four-Wave Mixing;" Chemical Physics 266, 2001, pp. 205-212.

Lozovoy, V. V. et al.; "Femtosecond Spectrally Dispersed Three-Pulse Four-Wave Mixing: The Role of Sequence and Chirp in Controlling Intramolecular Dynamics;" J. Raman Spectroscopy 31, 2000; pp. 41-49.

Lozovoy, V. V. et al.; "Photon Echo Pulse Sequences With Femtosecond Shaped Laser Pulses As a Vehicle for Molecule-Based Quantum Computation;" J. Chemical Physics Letters 351, Jan. 10, 2002; pp. 213-221.

Lozovoy, V. V. et al.; "Spectral Phase Optimization of Femtosecond Laser Pulses for Narrow-Band, Low-Background Nonlinear Spectroscopy;" Optics Express, vol. 13, No. 26, Dec. 26, 2005; pp. 10882-10887.

Lozovoy, V. V. et al.; "Systematic Control of Nonlinear Optical Processes Using Optimally Shaped Femtosecond Pulses;" ChemPhysChem, Wiley-VCH Verlag GmbH & Co. KGaA, Weinheim, 6, 2005; pp. 1970-2000.

Lozovoy, V. V. et al.; "The Role of Microscopic and Macroscopic Coherence in Laser Control;" Chemical Physics 267, 2001; pp. 99-114.

Lozovoy, V. V. et al.; "The Role of Pulse Sequences in Controlling Ultrafast Intramolecular Dynamics With Four-Wave Mixing;" Int. Rev. In Physical Chemistry, vol. 19, No. 4, 2000; pp. 531-552.

Lozovoy, V. V., et al., "Laser Control of Physicochemical Processes; Experiments and Applications," The Royal Society of Chemistry 2006, Annu. Rep. Prog. Chem., Sect. C, 102. www.rsc.org/annrepc (2006) pp. 227-258.

Lozovoy, V.V. et al; "What Role Can Four-Wave Mixing Techniques Play in Coherent Control?;" Advances in Multiphoton Processes and Spectroscopy 14; and Quantum Control of Molecular Reaction Dynamics, edited by R.J. Gordon and Y. Fujimura, World Scientific, Singapore, 2000; pp. 62-79.

Lozovoy, V.V.; "Multiphoton intrapulse interference. II. Control of two- and three-photon laser induced flurorescence with shaped pulses"; J. Chem. Phys. 118 (7); Feb. 15, 2005; pp. 3187-3196.

Lozovoy, Vadim V., et al., "Direct measurement of spectral phase for ultrashort laser pulses," Optics Express, vol. 16, No. 2 (Jan. 21, 2008) pp. 592-597.

Lu, Y.M. et al.; "Highly sensitive two-photon chromophores applied to three dimensional lithographic microfabrication: design, synthesis and characterization towards two-photon absorbtion cross section"; J. Mater Chem. 14(1); 2004; pp. 75-80.

Lutfur R. Khundkar et al.; "Ultrafast Molecular Reaction Dynamics in Real-Time: Progress Over a Decade"; Annu. Rev. Phys. Chem., 1990; pp. 15-60.

M. Armstrong et al.; "Versatile seven-femtosecond pulse compressor of parametrically amplified pulses using adaptive optics: studies of the primary events in protein dynamics"; Applied Physics B 74 (Suppl), 2002; pp. S127-S132.

M. Bergt et al.; "Controlling the Femtochemistry of Fe(CO)5"; J. Phys. Chem. A, vol. 103, No. 49; 1999; pp. 10381-10387.

M. Bergt et al.; "Time-resolved organometallic photochemistry Femtosecond fragmentation and adaptive control of CpFe(CO)2X (X=Cl,Br,1)"; Journal of Organometallic Chemistry 661; 2002; pp. 199-209.

M. Dantus et al., "Experimental Coherent Laser Control of Physicochemical Processes", Chem. Rev. 2004, 104, pp. 1813-1859.

M. Gruebele; "Fully quantum coherent control"; Chemical Physics 267; 2001; pp. 33-46.

M. Hacker et al., "Iterative Fourier Transform Algorithm for Phase-Only Pulse Shaping", Optics Express, vol. 9, No. 4, Aug. 13, 2001, pp. 191-199.

M. Hentschel et al.; "Attosecond metrology"; Nature, vol. 414; Nov. 29, 2001; pp. 509-513.

M. Hentschel et al.; "Generation of 0.1-TW optical pulses with a single-stage Ti:sapphire amplifier at a 1-kHz repetition rate"; Appl. Phys. B 70 [Suppl.]; 2000; pp. S161-S164.

M. Ovchinnikov et al.; "Semiclassical molecular dynamics computation of spontaneous light emission in the condensed phase: Resonance Raman spectra"; Journal of Chemical Physics, vol. 114, No. 16; Apr. 22, 2001; pp. 7130-7143.

M. Renard et al.; "Controlling ground-state rotational dynamics of molecules by shaped femtosecond laser pulses"; Physical Review A 69; 2004; 043401-1-043401-6.

M. Schurenberg et al.; "Abstract-Laser desorption/ionization mass spectrometry of peptides and proteins with particle suspension matrixes"; Analytical Chemistry; 71 (1): 221-229; Jan. 1, 1999 (1 page).

M. Sterling et al.; "Interrogation and control of condensed phase chemical dynamics with linearly chirped pulses: 12 in solid Kr"; J. Chem. Phys. 104; May 1, 1996; pp. 6497-6506.

M. Wollenhaupt et al.; "Interferences of Ultrashort Free Electron Wave Packets"; Physical Review Letters, vol. 89, No. 17; Oct. 21, 2002; pp. 173001-1-173001-4.

M.A. Bouchene et al.; "Temporal coherent control induced by wave packet interferences in one and two photon atomic transitions"; The European Physical Journal D, vol. 2; 1998; pp. 131-141.

M.C. Chen et al.; "Coherent control multiphoton processes in semiconductor saturable Bragg reflector with freezing phase algorithm"; Appl. Phys. B 80; 2005; pp. 333-340.

M.C. Chen et al.; "Freezing phase scheme for fast adaptive control and its application to characterization of femtosecond coherent optical pulses reflected from semiconductor saturable absorber mirrors"; J. Opt. Soc. Am. B, vol. 22, No. 5; May 2005; pp. 1134-1142.

M.E. Fermann et al.; "Shaping of ultrashort optical pulses by using an integrated acousto-optic tunable filter"; Optics Letters, vol. 18, No. 18; Sep. 15, 1993; pp. 1505-1507.

M.F. DeCamp et al.; "Dynamics and coherent control of high-amplitude optical phonons in bismuth"; Physical Review B, vol. 64; 2001; pp. 092301-1-092301-3.

M.M. Salour et al.; "Observation of Ramsey's Interference Fringes in the Profile of Doppler-Free Two-Photon Resonances"; Physical Review Letters, vol. 38, No. 14; Apr. 4, 1977; pp. 757-760.

M.O. Scully, et al.; "FAST CARS: Engineering a laser spectroscopic technique for rapid identification of bacterial spores"; PNAS; vol. 99, No. 17; Aug. 20, 2002; pp. 10994-11001.

M.R. Fetterman et al.; "Propagation of Complex Laser Pulses in Optically Dense Media"; The American Physical Society, Physical Review Letters, vol. 82, No. 20, May 17, 1999; pp. 3984-3987.

Ma R., et al., Intense Femtosecond Laser Field-Induced Coulomb Fragmentation of C2H4, International Journal of Mass Spectrometry, Elsevier, Amsterdam, NL, vol. 242, No. 1, Mar. 15, 2005, pp. 43-48.

Marco A. Krumbugel et al.; "Direct ultrashort-pulse intensity and phase retrieval by frequency-resolved optical gating and a computational neural network"; Optics Letters, vol. 21, No. 2; Jan. 15, 1996; pp. 143-145.

Marcos Dantus; "Coherent Nonlinear Spectroscopy: From Femtosecond Dynamics to Control"; Annu. Rev. Phys. Chem. 2001; pp. 639-679, C1-C7.

Marcos Dantus; GeneticAlgorithm-v4.nb to simulate an adaptive genetic algorithm;Oct. 2001; pp. 1-7.

Marvet, Una et al.; "Femtosecond Concerted Elimination of Halogen Molecules From Halogenated Alkanes;" Phys. Chem. Chem. Phys., 2, 2000; pp. 885-891.

Marvet, Una et al.; "Femtosecond Dynamics of Photoinduced Molecular Detachment From Halogenated Alkanes. I. Transition State Dynamics and Product Channel Coherence;" J. Chem. Phys., vol. 109, No. 11, Sep. 15, 1998.

Marvet, Una et al.; "Femtosecond Dynamics of Unimolecular and Unrestricted Bimolecular Reactions;" J. Phys. Chem. A, vol. 102, No. 23, 1998; pp. 4111-4117.

Marvet, Una et al.; "Femtosecond Observation of a Concerted Chemical Reaction;" Chemical Physics Letters, 256, Jun. 21, 1996; pp. 57-62.

Marvet, Una et al.; "Femtosecond Photoassociation Spectroscopy: Coherent Bond Formation;" Chemical Physics Letters, 245, Nov. 3, 1995; pp. 393-399.

Matuschek. N.; "Back-side-coated chirped mirrors with ultra-smooth broadband dispersion characteristics"; Applied Physics B 71; Sep. 6, 2000; pp. 509-522.

May, Volkhard et al., "Theory of ultrafast nonresonant multiphoton transitions in polyatomic molecules: Basics and application to optimal control theory," J. Chem. Phys. 127 (2007) pp. 144102-1 through 144102-11.

McGraw-Hill Encyclopedia of Science & Technology, 6th Ed.; "Mass spectrometry"; 1987; pp. 492-502 (12 pages).

Meshulach D. et al.; "Adaptive ultrashort pulse compression and shaping"; Optics Communications 138; 1997; pp. 345-348.

Meshulach, D. et al.; "Adaptive real-time femtosecond pulse shaping"; J. Opt. Soc. Am. B; vol. 15, No. 5; May 1998; pp. 1615-1619.

Meshulach, D., et al., "Adaptive Compression of Femtosecond Pulses", presented at the Ultrafast Optics 1997 Conference, Aug. 1997, Monterey California (3 pages).

Meshulach, M. et al.; "Coherent quantum control of multiphoton transitions by shaped ultrashort optical pulses" Phys. Rev. A 60; 1999; pp. 1287-1292.

Michael J. Bronikowski et al.; "Bond-specific chemistry: OD:OH product ratios for the reactions H+HOD(100) and H+HOD(001)"; J. Chem. Phys., vol. 95, No. 11; Dec. 1, 1991; pp. 8647-8648.

Michael J. Stimson et al.; "Noisy-light correlation functions by frequency resolved optical gating"; J. Opt. Soc. Am. B, vol. 15, No. 2; Feb. 1998; pp. 505-514.

Michael Messina et al.; "Quantum control of multidimensional systems: Implementation within the time-dependent Hartree approximation"; J. Chem Phys. 104; Jan. 1996; pp. 173-182.

Michel F. Emde et al.; "Spectral interferometry as an alternative to time-domain heterodyning"; Optics Letters, vol. 22, No. 17; Sep. 1, 1997; pp. 1338-1340.

Michelmann, K. et al.; "Measurement of the Page function of an ultrashort laser pulse"; Optics Communications; Oct. 15, 2001, pp. 163-170.

Midorikawa, Katsumi, et al., "Phase-Matched High-Order Harmonic Generation by Guided Intense Femtosecond Pulses," IEEE Journal of Selected Topics in Quantum Electronics, vol. 5, No. 6 (Nov./Dec. 1999) pp. 1475-1485.

Mitra et al.; "Nonlinear Limits to the Information Capacity of Optical Fibre Communications"; Nature; vol. 411; Jun. 28, 2001; pp. 1027-1030.

Mohamed Aziz Bouchene et al.; "Interplay between wave packet interferences and second harmonic generation"; Optics Communications 181; 2000; pp. 327-336.

Mohamed Aziz Bouchene et al.; "Wavepacket interferometry with chirped pulses"; J. Phys. B At. Mol. Opt. Phys. 32; 1999; pp. 5167-5177.

Montgomery, Matthew A., "Elucidation of Control Mechanisms Discovered during Adaptive Manipulation of [Ru(dpb)3](PF6)2 emission in the Solution Phase," American Chemical Society, J. Phys. Chem. A, vol. 111, No. 8 (2007) pp. 1426-1433.

Moshe Shapiro et al.; "Coherently Controlled Asymmetric Synthesis with Achiral Light"; Physical Review Letters, vol. 84, No. 8; Feb. 21, 2000; pp. 1669-1672.

Moshe Shapiro et al.; "Nonadiabatic wave packet dynamics: Experiment and theory in IBr"; Journal of Chemical Physics, vol. 110, No. 5; Feb. 1, 1999; pp. 2465-2473.

Moshe Shapiro et al.; "On the Origin of Pulse Shaping Control of Molecular Dynamics"; J. Phys. Chem. A, vol. 105, No. 105; 2001; pp. 2897-2902.

Motzkus, M., Open and Closed Loop Control of Complex Molecules with Shaped fs Pulses, 2003 International Conference Physics and Control. Proceedings (Cat. No. 03EX708), IEEE Piscataway, NJ, USA, vol. 3, 2003, p. 746, vol. 3.

Mustafa Demirplak et al.; "Optical control of molecular dynamics in a liquid"; Journal of Chemical Physics, vol. 116, No. 18; May 8, 2002; pp. 8028-8035.

N. Dudovich et al.; "Quantum Control of the Angular Momentum Distribution in Multiphoton Absorption Processes"; Physical Review Letters, vol. 93, No. 10; Mar. 12, 2004; pp. 103003-1-103003-4.

N. Dudovich et al.; "Single-pulse coherent anti-Stokes Raman spectroscopy in the fingerprint spectral region"; J. of Chem. Phys., vol. 118, No. 20; May 22, 2003; pp. 9208-9215.

N. Karasawa et al.; "Optical pulse compression to 5.0 fs by by use only a spatial light modulator for phase compensation"; J. Opt. Soc. Am. B, vol. 18, No. 11; Nov. 2001; pp. 1742-1746.

N.F. Scherer et al.; "Fluorescence-detected wave packet interferometry. II. Role of rotations and determination of the susceptibility"; J. Chem. Phys., vol. 96, No. 6; Mar. 15, 1992; pp. 4180-4194.

N.F. Scherer et al.; "Time resolved dynamics of isolated molecular systems studied with phase-locked femtosecond pulse pairs"; J. Chem Phys. vol. 93, No. 1; Jul. 1, 1990; pp. 856-857.

N.H. Damrauer et al.; "Control of bond-selective photochemistry in CH2BrCl using adaptive femtosecond pulse shaping"; The European Physical Journal D, 20, 2002; pp. 71-76.

Neil Shafer et al.; "Isotope effect in the photodissociation of HDO at 157.5 nm"; J. Chem. Phys., vol. 90, No. 11; Jun. 1, 1989; pp. 6807-6808.

Newport Corporation, "RS Series Research Grade Optical Tables," www.newport.com/store/product.aspx?id=436017&lang=1033&print=1&Section=Detail Believed to have been offered for sale or publicly used before Applicants' filing date of Jul. 8, 2005.

Nicholson, J.W. et al; "Noise sensitivity and accuracy of femtosecond pulse retrieval by phase and intensity from correlation and spectrum only (PICASO)"; J. Opt. Soc. Am. B; vol. 19, No. 2; Feb. 2002; pp. 330-339.

Niels E. Henriksen; "Laser control of chemical reactions"; Chem. Soc. Rev. 3137 42; 2002; pp. 37-42.

Nirit Dudovich et al.; "Coherent Transient Enhancement of Optically Induced Resonant Transitions"; Physical Review Letters, vol. 88, No. 12; Mar. 25, 2002; pp. 123004-1-123004-4.

Nirit Dudovich et al.; "Single-pulse coherently controlled nonlinear Raman spectroscopy and microscopy"; Nature magazine, vol. 418; Aug. 1, 2002; pp. 512-514.

Nisoli, M., et al., "Compression of high-energy laser pulses below 5fs", Optics Letters, (Apr. 15, 1997) vol. 22, No. 8, pp. 522-524, Optical Society of America.

Nisoli, M., et al., "Generation of high energy 10 fs pulses by a new pulse compression technique," Appl. Phys. Lett., vol. 68, No. 20 (May 13, 1996) pp. 2793-2795.

Norbert F. Scherer et al.; "Fluorescence-detected wave packet interferometry: Time resolved molecular spectroscopy with sequences of femtosecond phase-locked pulses"; J. Chem. Phys., vol. 95, No. 3; Aug. 1, 1991; pp. 1487-1511.

Noriaki Tsurumachi et al.; "Interferometric observation of femtosecond free induction decay"; Optics Letters, vol. 19, No. 22, Nov. 15, 1994; pp. 1867-1869.

Nuernberger, Patrick, "Femtosecond quantum control of molecular dynamics in the condensed phase," Invited Article, Physical Chemistry Chemical Physics, The Owner Societies, vol. 9 (2007) pp. 2470-2497.

O'Shea, Patrick et al., "Highly simplified device for ultrashort-pulse measurement" Optics Letter/vol. 26, No. 12/Jun. 15, 2001.

O.M. Sarkisov et al.; "Control of elementary chemical reactions by femtosecond light pulses"; Quantum Electronics, vol. 31, No. 6; 2001; pp. 483-488.

Ocean Optics Inc.; "HR4000 High-resolution Spectrometer" http://oceanoptics.com/products/hr4000.asp; Jun. 25, 2005 (p. 1 of 4-p. 4 of 4).

Ocean Optics Inc.; "S2000 Miniature Fiber Optic Spectrometer" http://oceanoptics.com/products/s2000.asp; Jun. 25, 2005 (p. 1 of 4-p. 4 of 4).

Ocean Optics Inc.; "USB2000 Miniature Fiber Optic Spectrometer" http://oceanoptics.com/products/usb2000.asp; Jun. 25, 2005 (p. 1 of 7-p. 6 of 7).

Ogilvie, Jennifer P., et al., "Use of coherent control for selective two-photon fluorescence microscopy in live organisms," Optical Society of America (Jan. 2006) 8 pages.

Ohno, Kimihisa, et al., "Adaptive pulse shaping of phase and amplitude of an amplified femtosecond pulse laser by direct reference to frequency-resolved optical gating traces," J. Opt. Soc. Am. B vol. 19, No. 11 (Nov. 2002) pp. 2781-2790.

Oron, Dan, et al., "Scanningless depth-resolved microscopy," Optics Express, vol. 13, No. 5 (Mar. 7, 2005).

Osborn, D.L. et al.; "Spectral and intensity dependence of spatially resolved two-photon conductivity defects on a GaAsP photodiode"; J. Appl. Phys 89; 2001; pp. 626-633.

P. Balling et al.; "Interference in climbing a quantum ladder system with frequency-chirped laser pulses"; Physical Review A, vol. 50, No. 5; Nov. 1994; pp. 4276-4285.

Panasenko, Dmitriy et al.; "Single-shot sonogram generation for femtosecond laser pulse diagnostics by use of two-photon absorbtion in a silicon CCD camera"; Optics Letters; vol. 27, No. 16; Aug. 15, 2002; pp. 1475-1477.

Pastirk, I. et al.; "2D (time-frequency) Femtosecond Four-Wave Mixing At $10^{14}$ W/cm$^2$: Molecular and Electronic Response;" Symposium on Optical Pulse and Beam Propagation III, Photonics West, 2001; 3 pages.

Pastirk, I. et al.; "Control and Characterization of Intramolecular Dynamics with Chirped Femtosecond Three-Pulse Four-Wave Mixing;" J. Phys. Chem. A, vol. 103, No. 49, Sep. 23, 1999; pp. 10226-10236.

Pastirk, I. et al.; "Femtosecond Ground State Dynamics of Gas Phase N2O4 and NO2," Chemical Physics letters, vol. 349, Nov. 23, 2001; pp. 71-78.

Pastirk, I. et al.; "Femtosecond Photo Echo and Virtual Echo Measurements of the Vibronic and Vibrational Coherence Relaxation Times of Iodine Vapor;" Chemical Physics Letters, vol. 333, Jan. 5, 2001; pp. 76-82.

Pastirk, I. et al; "Selective two-photon microscopy with shaped femtosecond pulses"; Opt. Express 11; 2003; pp. 1695-1701.

Pastirk, I., et al., "Multidimensional Analytical Method Based on Binary Phase Shaping of Femtosecond Pulses," J. Phys. Chem. A, vol. 109, No. 11, Feb. 23, 2005; pp. 2413-2416.

Pastirk, I., et al., "No loss spectral phase correction and arbitrary phase shaping of regeneratively amplified femtosecond pulses using MIIPS," Optics Express, vol. 14, No. 20, (Oct. 2, 2006) pp. 9537-9543.

Pastrik, I. et al., "Sequences for Controlling Laser Excitation with Femtosecond Three-Pulse Four-Wave Mixing;" The Royal Society of Chemistry, vol. 113, 1999; pp. 401-424.

Pastrik, I. et al; "Quantum Control of the Yield of a Chemical Reaction;" J. Chem. Phys., vol. 108, No. 11, Mar. 15, 1998; pp. 4375-4378.

Paul R. Bolton et al.; "Propagation of intense, ultrashort laser pulses through metal vapor: refraction-limited behavior for single pulses"; J. Opt. Soc. Am. B, vol. 13, No. 2; Feb. 1996; pp. 336-346.

Paye, J.; "How to Measure the Amplitude and Phase of an Ultrashort Light Pulse with an Autocorrelator and a Spectrometer"; IEEE Journal of Quantum Electronics, vol. 30, No. 11; Nov. 1994; pp. 2693-2697.

Peifang Tian et al.; "Ultrafast measurement of two-photon absorption by loss modulation"; Optics Letters, vol. 27, No. 18; Sep. 15, 2002; pp. 1634-1636.

Pelfang Tian et al., Femtosecond Phase-Coherent Two-Dimensional Spectroscopy, Science American Assoc. Adv. Sci. USA, vol. 300, No. 5625, Jun. 6, 2003, pp. 1553-1555.

Peng, L. W. et al.; "Stepwise Solvation of the Intramolecular-Charge-Transfer Molecule p-(Dimethylamino)benzonitrile;" J. Phys. Chem., 91, 1987, p. 6162.

Perry, Michael D., et al., "Terawatt to Petawatt Subpicosecond Lasers", Articles, (May 13, 1994), vol. 264, Science.

Peter J. Delfyett et al.; "Joint Time-Frequency Meaurements of Mode-Locked Semiconductor Diode Lasers and Dynamics Using Frequency-Resolved Optical Gating"; IEEE Journal of Quantum Electronics, vol. 35, No. 4, Apr. 1999; pp. 487-500.

Pfeiffer, W., et al., "Ultrafast Spatio-Temporal Near-Field Control", IEEE 2005 European Quantum Electronics Conference, 0-7803-8973-5/05, (Jun. 2005) p. 169 (1 page).

Philip H. Bucksbaum; "Ultrafast control"; Nature magazine, vol. 421; Feb. 6, 2003; pp. 593-594. Kuhn & Weyn SR2 Sep. 4, 2001.

Photogen Technologies, Inc., "Photogen-Technology"; www.photogen.com/body/tech_body.html; Dec. 20, 2001 (19 pages).

PiStar Kinetic Circular Dichroism Spectrometer, http://www.phtophysics.com/pistar.php, Nov. 29, 2006; 3 pages.

Posthumus, J.H., "The dynamics of small molecules in intense laser fields," Reports on Progress in Physics, 67 (2004) Institute of Physics Publishing, pp. 623-665.

Postnikova, B.J. et al.; "Towards nanoscale three-dimensional fabrication using two-photon initiated polymerization and near-field excitation"; Microelectron. Eng. 69 (2-4); Sep. 2003; pp. 459-465.

Quiroga-Teixeiro, M.L., et al., "Compression of optical solitons by conversion of nonlinear modes", J. Opt. Soc. Am. B, vol. 12, No. 6, (Jun. 1995), pp. 1110-1116, Optical Society of America.

QWPO-AS, Zero Order Waveplates—Air Spaced, Optical Components and Assemblies, www.cvilaser.com, published Nov. 21, 2005; pp. 8-9.

R. Bartels et al., "Shaped-Pulse Optimization of Coherent Emission of High-Harmonic Soft X-Rays", 2000 Macmillan Magazines Ltd., Nature, vol. 406. Jul. 13, 2000, pp. 164-166.

R. deVivie-Riedle et al.; "Design and interpretation of laser pulses for the control of quantum systems"; Applied Physics B; 2000; pp. 285-292.

R. Netz et al.; "Coherent population dynamics of a three-level atom in spacetime"; Physical Review A, vol. 65; pp. 043406-1-043406-12.

R. Netz et al.; "Observation of Selectivity of Coherent Population Transfer Induced by Optical Interference"; Physical Review Letters, vol. 90, No. 6; Feb. 14, 2003; pp. 063001-1-063001-4.

R. Teets et al.; "Coherent Two-Photon Excitation by Multiple Light Pulses"; Physical Review Letters, vol. 38, No. 14; Apr. 4, 1977; lags. 760-764.

R. van Leeuwen et al.; "Coherent Control of the Energy and Angular Distribution of Autoionized Electrons"; Physical Review Letters, vol. 82, No. 14; Apr. 5, 1999; pp. 2852-2855.

R. van Leeuwen et al.; "Manipulation of differential electron yields via autoionizing wave-packet control"; Physical Review A, vol. 63; 2001; pp. 033403-1-033403-5.

R. Wolleschensky et al.; "Characterization and Optimization of a Laser-Scanning Microscope in the Femtosecond Regime;" Applied Physics B 67, Lasers and Optics, 1998; pp. 87-94.

R. Zadoyan et al.; "Wavepacket diagnosis with chirped probe pulses"; Chemical Physics, vol. 233; 1998; pp. 353-363.

R.A. Bartels et al.; "Nonresonant Control of Multimode Molecular Wave Packets at Room Temperature"; Physical Review Letters, vol. 88, No. 3; Jan. 21, 2002; pp. 033001-1 through 033001-4.

R.B. Vrijen et al.; "Limitations on quantum ladder climbing in complex systems"; Physical Review A, vol. 56, No. 3; Sep. 1997; pp. 2205-2212.

R.J. Levis et al.; "Closing the Loop on Bond Selective Chemistry Using Tailored Strong Field Laser Pulses"; The Journal of Physical Chemistry, vol. 106, No. 27; Jul. 11, 2002; pp. 6427-6444.

R.L. VanderWal et al.; "Selectively breaking the O-H bond in HOD"; J. Chem. Phys., vol. 92, No. 1; Jan. 1, 1990; pp. 803-805.

R.R. Jones et al.; "Bound-state interferometry using incoherent light"; J. Phys. B 28 At. Mol. Opt. Phys.; 1995; pp. L405-L411.

R.R. Jones et al.; "Ramsey Interference in Strongly Driven Rydberg Systems"; Physical Review Letters, vol. 71, No. 16; Oct. 18, 1993; pp. 2575-2578.

R.R. Jones; "Interference Effects in the Multiphoton Ionization of Sodium"; Physical Review Letters, vol. 74, No. 7; Feb. 13, 1995; pp. 1091-1094.

R.R. Jones; "Multiphoton Ionization Enhancement Using Two Phase-Coherent Laser Pulses"; Physical Review Letters, vol. 75, No. 8; Aug. 21, 1995; pp. 1491-1494.

Radoslaw Uberna et al.; "Phase and amplitude control in the formation and detection of rotational wave packets in the E1Eg state of Li2"; Journal of Chemical Physics, vol. 108, No. 22; pp. 9259-9274.

Radoslaw Uberna et al.; "Phase control of wavepacket dynamic using shape femtosecond pulses"; Faraday Discuss, vol. 113; 1999; pp. 385-400.

Radoslaw Uberna et al.; "Ultrafast spectroscopy of wavelength-dependent coherent photoionization cross sections of Li2 wave packets in the E1Eg state: The role of Rydberg states"; Journal of Chemical Physics, vol. 114, No. 23; Jun. 15, 2001; pp. 10311-10320.

Reid, D.T. et al.; "Amplitude and phase measurement of mid-infrared femtosecond pulses by using cross-correlation frequency-resolved optical gating"; Optics Letters, vol. 25, No. 19, Oct. 1, 2000; pp. 1478-1480.

Reitze, D.H., et al., "Shaping of wide bandwidth 20 femtosecond optical pulses", Appl. Phys. Lett. 61 (11), (Sep. 14, 1992), pp. 1260-1262, American Institute of Physics.

Richard M. Williams et al.; "Compositional control of rovibrational wave packets in the E(1 Eg) "shelf" state of Li2 via quantum-state-resolved intermediate state selection"; J. Chem. Phys. vol. 106, No. 20; May 22, 1997; pp. 8310-8323.

Richard N. Zare; "Laser Control of Chemical Reactions"; Science magazine, vol. 279; Mar. 20, 1998; pp. 1875-1879.

Richard S. Judson et al.; "Teaching Lasers to Control Molecules"; Physical Review Letters, vol. 68, No. 10; Mar. 9, 1992; pp. 1500-1503.

Robert J. Levis et al.; "Selective Bond Dissociation and Rearrangement with Optimally Tailored, Strong-Field Laser Pulses"; Science Magazine, vol. 292; Apr. 27, 2001; pp. 709-713.

Rodriguez, George, et al., "Coherent Ultrafast MI-FROG Spectroscopy of Optical Field Ionization in Molecular H2, N2, and O2," IEEE Journal on Selected Topics in Quantum Electronics, vol. 7, No. 4 (Jul./Aug. 2001) pp. 579-591.

Roger G.M.P. Koumans et al.; "Time-Resolved Optical Gating Based on Dispersive Propagation: A New Method to Characterize Optical Pulses"; IEEE Journal of Quantum Electronics, vol. 36, No. 2, Feb. 2000; pp. 137-144.

Rosker, M. J. et al.; "Femtosecond Clocking of the Chemical Bond;" Science, vol. 241, Sep. 2, 1988; pp. 1200-1202.

Rosker, M. J. et al.; "Femtosecond Real-Time Probing of Reactions. I. The Technique;" J. Chem. Phys., vol. 89, No. 10, Nov. 15, 1988; pp. 6113-6127.

Roth, M. et al., Acousto-Optic Femtosecond Pulse Shaping in the Ultraviolet, Lasers and Electro-Optics, 2005. (Cleo). Conference in Baltimore, MD., USA, May 22-27, 2005, Piscataway, NJ, USA. IEEE, May 22, 2005, pp. 2244-2246.

Roth, M. et al., Acousto-optical Shaping of Ultraviolet Femtosecond Pulses, Applied Physics B; Lasers and Optics, Springer-Verlag, BE, vol. 80, No. 4-5, Apr. 1, 2005, pp. 441-444.

Roy, I. et al; "Ceramic-based nanoparticles entrapping water-soluble photosensitizing drugs: A novel drug carrier system for photodynamic therapy"; J. Am. Chem. Soc. 125; 2003, pp. 7860-7865.

S. Backus et al.; "16-fs, 1-µ J ultraviolet pulses generated by third-harmonic conversion in air"; Optics Letters, vol. 21, No. 9; May 1, 1996; pp. 665-667.

S. Kovtoun et al.; "Mass-Correlated Pulsed Extraction : Theoretical Analysis and Implementation With a Linear Matrix-Assisted Laser Desorption/Ionization Time of Flight Mass Spectrometer;" Journal of the American Society for Mass Spectrometry, Elsevier Science Inc., vol. 11, 2000; pp. 841-853.

S. Meyer et al.; "Photoelectron distributions from femtosecond pump/probe excitation with chirped probe pulses"; Journal of Chemical Physics, vol. 108, No. 18; pp. 7631-7636.

S. Yeremenko et al.; "The criterion of pulse reconstruction quality based on Wigner representation"; Applied Physics B 70 (Supply; 2000; pp. S109-S117.

S. Zhang, X. Zhang, J. Huang, L. Deng, Z. Sun, W. Zhang, Z. Wang, Z. Xu, R.Li, Coherent Enhancement of Broadband Frequency Up-Conversion in BBO Crystal by Shaping Femtosecond Laser Pulses, Optics Communications, ScienceDirect, 2006/2007, pp. 559-563.

S.E. Harris; "Control of Feshbach resonances by quantum interference"; Physical Review A66; 2002; pp. 010701-1-010701-4.

S.N. Pisharody et al.; "Phase-controlled stair-step decay of autoionizing radial wave packets"; Physical Review A, vol. 65; 2002; pp. 033418-1-033418-10.

Sanders, A. W. et al.: "Observation of Plasmon Propagation, Redirection, and Fan-Out in Silver Nanowires" Nano Letters, American Chemical Society, Washington, DC, US, vol. 6, No. 8, Jun. 28, 2006, pp. 1822-1826, XP007901978, ISSN: 1530-6984.

Sanislav S. Bychkov et al.; "Laser coherent control of molecular chiral states via entanglement of the rotational and torsional degrees of freedom"; Journal of Raman Spectroscopy; 2002; pp. 962-973.

Sarah M. Gallagher et al.; "Heterodyne detection of the complete electric field of femtosecond four-wave mixing signals"; J. Opt. Soc. Am. B, vol. 15, No. 8; Aug. 1998; pp. 2338-2345.

Sato, Masamichi, et al., "Adaptive Pulse Shaping of Femtosecond Laser Pulses in Amplitude and Phase Through a Single-Mode Fiber by Referring to Frequency-Resolved Optical Gating Patterns", Jpn. J. Appl. Phys., vol. 41 (200); Part 1 No. 6A, Jun. 2002; XP002436366; pp. 3704-3709.

Scaffidi, J., et al., "Spatial and Temporal Dependence of Interspark Interactions in Femtosecond-Nanosecond Dual Pulse Laser-Induced Breakdown Spectroscopy", Applied Optics, vol. 43, No. 27, Sep. 20, 2004, XP-002462408, pp. 5243-5250.

ScanMail 10K—Scanna; Internet publication from Safer America; 2003.

Schreier, F. et al.; "Femtosecond pulse shaping with a stratified diffractive structure"; Optics Communications 185; 2000; pp. 227-231.

Scott A. Diddams et al.; "Characterizing the Nonlinear Propagation of Femtosecond Pulses in Bulk Media"; IEEE Journal of Selected Topics in Quantum Electronics, vol. 4, No. 2; Mar./Apr. 1998; pp. 306-316.

Sebastien Zamith et al.; "Observation of Coherent Transients in Ultrashort Chirped Excitation of an Undamped Two-Level System"; Physical Review Letters, vol. 87, No. 3; Jul. 16, 2001; pp. 033001-1-033001-4.

Serbin, J., et al., "Femtosecond lasers as novel tool in dental surgery," applied surface science, 197-198 (2002) pp. 737-740.

Sergey Yeremenko et al.; "Frequency-resolved pump-probe characterization of femtosecond infrared pulses"; Optics Letters, vol. 27, No. 13; Jul. 1, 2002; pp. 1171-1173.

Sharman, W.M. et al.: "Targeted photodynamic therapy via receptor mediated delivery systems"; Adv. Drug Delivery Rev. 56(1); Jan. 2004; pp. 53-76.

Shimizu, Satoru, et al., "Spectral phase transfer for indirect phase control of sub-20-fs deep UV pulses," Optics Express, vol. 13, No. 17 (Aug. 22, 2005) pp. 6345-6353.

Siders, C.W., et al., "Blue-shifted third-harmonic generation and correlated self-guiding during ultrafast barrier suppression ionization of subatmospheric density noble gases," J. Opt. Soc. Am. B/vol. 13, No. 2 (Feb. 1996) pp. 330-335.

Spielmann, C. et al.; "Ultrabroadband Femtosecond Lasers"; IEEE Journal of Quantum Electronics; vol. 30, No. 4; Apr. 1994; pp. 1100-1114.

Spielmann, C., et al., "Ti: Sapphire Laser Produces Intense Sub-5-FS Pulses", Laser Focus World, May 97, vol. 33, Issue 5, p. 127.

Stobrawa, G. et al.; "A new high-resolution femtosecond pulse shaper"; Appl. Phys. B 72; 2001; pp. 627-630.

Stockman, Mark I. et al.; "Coherent Control of Femtosecond Energy Localization in Nanosystems;" Physical Review Letters, vol. 88, No. 6, Feb. 11, 2002; pp. 067402-1-067402-4.

Stuart A. Rice et al.; "Active control of product selection in a chemical reaction: a view of the current scene"; Phys. Chem. Chem. Phys.; 2002; pp. 1683-1700.

Stuart A. Rice; "Active Control of Molecular Dynamics: Coherence versus Chaos"; Journal of Statistical Physics, vol. 101, Nos. 1/2; 2000; pp. 187-212.

Stuart A. Rice; "Interfering for the good of a chemical reaction"; Nature magazine; vol. 409; Jan. 18, 2001; pp. 422-426.

Stuart A. Rice; "Optical control of reactions"; Nature magazine, vol. 403; Feb. 3, 2000; pp. 496-497.

Sullivan, A. et al.; "Quantitative investigation of optical phase-measuring techniques for ultrashort pulse lasers"; J. Opt. Soc. Am. B, vol. 13, No. 9; Sep. 1996; pp. 1965-1978.

Sun, H.B. et al.; "Two-photon laser precision microfabrication and its applications to micronano devices and systems"; J. Lightwave Technol. 21(3); Mar. 2003; pp. 624-633.

Surharev, Maxim et al.; "Coherent Control Approaches to Light Guidance in the Nanoscale;" The Journal of Chemical Physics 124, 2006; XP008086379; pp. 144707-1-144707-8.

Suzuki, Takayuki et al.; "Nontrivial Polarization Shaping of Femtosecond Pulses by Reference to the Results of Dual-Channel Spectral Interferomtry;" Applied Optics, vol. 43, No. 32, Nov. 10, 2004; pp. 6047-6050.

Sweetser, John N. et al.; "Transient-grating frequency-resolved optical gating"; Optics Letters, vol. 22, No. 8; Apr. 15, 1997; pp. 519-521.

Szipöcs, Robert, et al., "Chirped multilayer coatings for broadband dispersion control in femtosecond lasers", Optics Letters, (Feb. 1, 1994), vol. 19, No. 3, Optical Society of America.

T. Brixner et al.; "Abstract-Femtosecond quantum control"; Advances in Atomic, Molecular, and Optical Physics, vol. 46; 46: 1-54; 2001 (1 page).

T. Brixner et al.; "Abstract-Photoselective adaptive femtosecond quantum control in the liquid phase"; Nature; 414 (6859): 57-60; Nov. 1, 2001 (1 page).

T. Brixner et al.; "Feedback-controlled optimization of amplified femtosecond laser pulses"; Applied Physics B 68; 1999; pp. 281-284.

T. Brixner et al.; "Generation and characterization of polarization-shaped femtosecond laser pulses"; Applied Physics B74 (Suppl), 2002; pp. S133-S144.

T. Brixner et al.; "Liquid-phase adaptive femtosecond quantum control: Removing intrinsic intensity dependencies"; Journal of Chemical Physics, vol. 118, No. 8; Feb. 22, 2003; pp. 3692-3701.

T. Brixner et al.; "Photoselective adaptive femtosecond quantum control in the liquid phase"; Nature magazine, vol. 414; Nov. 2001; pp. 57-60.

T. Brixner et al.; "Problem complexity in femtosecond quantum control"; Chemical Physics 267; 2001; pp. 241-246.

T. Feurer et al.; "Measuring the temporal intensity of ultrashort laser pulses by triple correlation"; Appl. Phys. B; 1998; pp. 163-168.

T. Frohnmeyer et al.; "Femtosecond pump-probe photoelectron spectroscopy on Na2: a tool to study basic coherent control schemes"; Applied Physics B 71; 2000; pp. 259-266.

T. Hornung et al.; "Optimal control of one- and two-photon transitions with shaped femtosecond pulses and feedback"; Applied Physics B 71; 2000; pp. 277-284.

T. Kobayashi et al.; "Tunable visible and near-infrared pulse generator in a 5 fs regime"; Appl. Phys. B 70 (Supply; 2000; pp. S239-S246.

T. Okada et al.; "Optical control of two-photon excitation efficiency of α-perylene crystal by pulse shaping"; Amer. Inst. of Phys., vol. 121, No. 13; Oct. 1, 2004; pp. 6386-6391.

T. Tanabe et al.; "Compensation for a Transfer Function of a Regenerative Amplifier to Generate Accurately Shaped Ultrashort Pulses in Both the Amplitude and Phase"; IEE J. of Selected Topics in QUantum Elecronics, vol. 10, No. 1; Jan./Feb. 2004; pp. 221-228.

T. Witte et al.; "Controlling molecular ground-state dissociation by optimizing vibrational ladder climbing"; Journal of Chemical Physics, vol. 118, No. 5; Feb. 1, 2003; pp. 2021-2024.

T.C. Weinacht et al.; "Coherent learning control of vibrational motion in room temperature molecular gases"; Chemical Physics Letters 344; 2001; pp. 333-338.

T.C. Weinacht et al.; "Measurement of the Amplitude and Phase of a Sculpted Rydberg Wave Packet"; Physical Review Letters; vol. 80, No. 25; Jun. 22, 1998; pp. 5508-5511.

T.C. Weinacht et al.; "Toward Strong Field Mode-Selective Chemistry"; J. Phys. Chem. A, vol. 103, No. 49; 1999; pp. 10166-10168.

T.C. Weinacht et al.; "Using feedback for coherent control of quantum systems"; Journal of Optics B: Quantum and Semiclassical Optics; 2002; pp. R35-R52.

Tada, Junji, "Adaptively controlled supercontinuum pulse from a microstructure fiber for two-photon excited fluorescence microscopy," Applied Optics, vol. 46, No. 15, (May 20, 2007) pp. 3023-3030.

Tamaki, Y., "Phase-matched third-harmonic generation by nonlinear phase shift in a hollow fiber," Lasers and Optics Applied Physics B, vol. 67, (1998) pp. 59-63.

Thanopulos I. et al: Laser-Driven Coherent Manipulation of Molecular Chirality, Chemical Physics Letters Elsevier Netherlands, vol. 390, No. 1-3, May 21, 2004, pp. 228-235.

Thomas Hornung et al.; "Teaching optimal control theory to distill robust pulses even under experimental constraints"; Physical Review A, vol. 65; 2002; pp. 021403-1-021403-4.

Thomas J. Dunn et al.; "Experimental Determination of the Dynamics of a Molecular Nuclear Wave Packet via the Spectra of Spontaneous Emission"; Physical Review Letters, vol. 70, No. 22; May 31, 1993; pp. 3388-3391.

Ting, A., et al.; "Remote Atmospheric Breakdown for Standoff Detection by Using an Intense Short Laser Pulse," Applied Optics. Opt. Soc. America, USA, vol. 44, No. 25, XP002476098, Sep. 1, 2005; pp. 5315-5320.

Tomizawa H. et al., Development of Automatically Optimizing System of Both Spatial and Temporal Beam Shaping for UV-Laser Pulse, Proceedings of the SPIE—The International Society for Optical Engineering SPIE—Int. Soc. Opt. Eng USA, vol. 5481, No. 1, 2004, pp. 47-55.

Trebino, R. et al; "Measuring Ultrashort Laser Pulses Just Got a Lot Easier!"; Optics & Photonics News; Jun. 2001; pp. 22-25.

Trebino, Rick et al.; "Measuring ultrashort laser pulses in the time-frequency domain using frequency-resolved optical gating"; Rev. Sci. Instrum. 68 (9); Sep. 1997; pp. 3277-3295.

Trebino, Rick et al.; "The Dilemma of Ultrashort-Laser-Pulse Intensity and Phase Measurement and Applications"; IEEE Journal of Quantum Electronics, vol. 35, No. 4; Apr. 1999; pp. 418-420.

Trebino, Rick, et al., "Using phase retrieval to measure the intensity and phase of ultrashort pulses: frequency-resolved optical gating", J. Opt. Soc. Am. A, vol. 10, No. 5, (May 1993), pp. 1101-1111, Optical Society of America.

Tull, J.X. et al.; "High-Resolution, Ultrafast Laser Pulse Shaping and Its Applications"; Advances in Magnetic and Optical Resonance; vol. 20; 1997; pp. 1-65.

Tzu-Ming Liu et al.; "Triple-optical autocorrelation for direct optical pulse-shape measurement"; Applied Physics Letters, vol. 81, No. 8; Aug. 19, 2002; pp. 1402-1404.

Umstadter, D., et al., "Nonlinear Plasma Waves Resonantly Driven by Optimized Laser Pulse Trains", Physical Review Letters, vol. 72, No. 8, (Feb. 21, 1994), pp. 1224-1227, The American Physical Society.

Urbasch, Gunter, et al., "Distinctino of ortho- and para-Xylene by Femtosecond-Laser Mass Spectrometry," Communications, ChemPhysChem vol. 8 (2007) Wiley-VCH Verlag GmbH&Co. KGaA, Weinheim, pp. 2185-2188.

V. Engel et al; "Two-photon wave-packet interferometry"; J. Chem Phys. 100 (8); Apr. 15, 1994; pp. 5448-5458.

V. Kabelka et al.; "Time-frequency imaging of a single ultrashort light pulse from anularly resolved autocorrelation"; Optics Letters, vol. 20, No. 1; Jun. 1, 1995; pp. 1301-1303.

V. Prokhorenko et al.; "Coherent control of the population transfer in complex sovated molecules at weak excitation. An experimental study"; The J. of Chem. Phys., 122; 2005; 184502-1-184502-11.

V.A. Apkarian; 'Comment on "Time-resolved laser induced harpoon reactions"'; J. Chem. Phys. vol. 106, No. 12; Mar. 22, 1997; pp. 5298-5299.

V.L. da Silva et al.; "Nonlinear pulse shaping and causality"; Optics Letters, vol. 18, No. 8; Apr. 15, 1993; pp. 580-582.

V.M. Akulin et al.; "Laser Control of Atomic Motion inside Diatomic Molecules"; J. Phys. Chem. A, vol. 102, No. 23; 1998; pp. 4310-4320.

V.S. Malinovsky et al.; "General theory of population transfer by adiabatic rapid passage with intense, chirped laser pulses"; The European Physical Journal D 14; 2001; pp. 147-155.

Valerie Blanchet et al.; "One-color coherent control in Cs2 Observation of 2.7 fs beats in the ionization signal"; Chemical Physics Letters, vol. 233; Feb. 25, 1995; pp. 491-499.

Valerie Blanchet et al.; "Temporal coherent control in the photoionization of Cs2: Theory and experiment"; Journal of Chemical Physics, vol. 108, No. 12; Mar. 22, 1998; pp. 4862-4876.

Valerie Blanchet et al.; "Temporal Coherent Control in Two-Photon Transitions: From Optical Interferences to Quantum Interferences"; Physical Review Letters, vol. 78, No. 14; Apr. 7, 1997; pp. 2716-2719.

VandenBout, D.A. et al.; "Discrete intensity jumps and intramolecular electronic energy transfer in the spectroscopy of single conjugated polymer molecules"; Science 277; 1997; pp. 1074-1077.

Verluise, Frédéric, et al., "Arbitrary dispersion control of ultrashort optical pulses with acoustic waves," J. Opt. Soc. Am. B vol. 17, No. 1 (Jan. 2000) pp. 138-145.

Victor Wong et al.; "Analysis of ultrashort pulse-shape measurement using linear interferometers"; Optics Letters, vol. 19, No. 4; Feb. 15, 1994; pp. 287-289.

Victor Wong et al.; "Linear filter analysis of methods for ultrashort-pulse-shape measurements"; J. Opt.Soc. Am. B, vol. 12, No. 8; Aug. 1995; pp. 1491-1499.

Victor Wong et al.; "Ultrashort-pulse characterization from dynamic spectrograms by iterative phase retrieval"; J. Opt. Soc. Am. B, vol. 14, No. 4; Apr. 1997; pp. 944-949.

Vladimir Kalosha et al.; "Generation of Single Dispersion Precompensated 1-fs Pulses by Shaped-Pulse Optimized High-Order Stimulated Raman Scattering"; Physical Review Letters, vol. 88, No. 10; Mar. 11, 2002; pp. 103901-1-13901-4.

Vladislav V. Yakovlev et al.; "Chirped pulse enhancement of multiphoton absorption in molecular iodine"; Journal of Chemical Physics, vol. 108, No. 6, Feb. 8, 1998; pp. 2309-2313.

von Vacano, Bernhard, et al., "Shaper-assisted collinear SPIDER: fast and simple broadband pulse compression in nonlinear microscopy," vol. 24, No. 5, (May 2007) J. Opt. Soc. Am. B, pp. 1091-1100.

W. Wohlleben et al.; "Coherent Control for Spectroscopy and Manipulation of Biological Dynamics"; Chem. Phys. Chem., 6; 2005; pp. 850-857.

W.J. Walecki et al.; "Characterization of the polarization state of weak ultrashort coherent signals by dual-channel spectral interferometry"; Optics Letters, vol. 22, No. 2; Jan. 15, 1997; pp. 81-83.

W.M. Sharman et al.; "Photodynamic therapeutics: basic principles and clinical applications"; DDT, vol. 4, No. 11; Nov. 1991; pp. 507-517.

Walmsley, Ian A. et al.; "Characterization of the electric field of ultrashort optical pulses"; J. Opt. Soc. Am. B., vol. 13, No. 11; Nov. 1996; pp. 2453-2463.

Walowicz, K.A. et al.; "Multiphoton Intrapulse Interference 1: Control of Multiphoton Processes in Condensed Phases"; J. Phys. Chem A 106 (41); Oct. 17, 2002; pp. 9369-9373.

Waner, M. J. et al.; "Imaging the Molecular Dimensions and Oligomerization of Proteins At Liquid/Solid Interfaces;" J. Phys. Chem. B, vol. 102, No. 9, 1998; pp. 1649-1657.

Wang, He, et al., "Generation of 0.5 mJ, few-cycle laser pulses by an adaptive phase modulator," Optics Express, vol. 16, No. 19 (Sep. 15, 2008) pp. 14448-14455.

Warren, W.S., et al., "Coherent Control of Quantum Dynamics: The Dream is Alive", Articles, Science, (Mar. 12, 1993), vol. 259.

Warren, W.S.; "Chemistry with photons"; Science, vol. 262; Nov. 12, 1993; pp. 1008-1009.

Wefers, Marc M., "Programmable phase and amplitude femtosecond pulse shaping", Optics Letters (Dec. 1, 1993), vol. 18, No. 23, pp. 2032-2034.

Wefers, Marc, et al., "Generation of high-fidelity programmable ultrafast optical waveforms", Optics Letters, (May 1, 1995), vol. 20, No. 9, Optical Society of America.

Weinacht, T.C. et al.; "Controlling the shape of a quantum wavefunction"; Nature, vol. 397; Jan. 1999; pp. 233-235.

Weiner et al.; "Shaping of femtosecond pulses using phase-only filters designed by simulated annealing"; Journal of the Optical Society of America A (Optics and Image Science) USA, vol. 10, No. 5, May 1993; pp. 1112-1120.

Weiner, "Encoding and decoding of femtosecond pulses", Optics Letters, (Apr. 1988), vol. 13, No. 4, Optical Society of America.

Weiner, A.M. et al. "Generation of terahertz-rate trains of femtosecond pulses by phase-only filtering," Optics Letters, vol. 15, No. 1, Jan. 1, 1990, pp. 51-53.

Weiner, A.M. et al.; "Programmable Shaping of Femtosecond Optical Pulses by Use of 128-Element Liquid Crystal Phase Modulator"; IEEE Journal of Quantum Electronics; vol. 28, No. 4; Apr. 1992; pp. 908-920.

Weiner, A.M., "Enhancement of coherent charge oscillations in coupled quantum wells by femtosecond pulse shaping", J. Opt. Soc. Am. B, vol. 11, No. 12, (Dec. 1994), pp. 2480-2491, Optical Society of America.

Weiner, A.M., "Femtosecond Optical Pulse Shaping and Processing", Prog. Quant. Electr. (1995) vol. 19, pp. 161; 230-233.

Weiner, A.M., "Femtosecond pulse shaping using spatial light modulators," Review Article, Review of Scientific Instruments, vol. 71, No. 5 (May 2000) pp. 1929-1960.

Weiner, A.M., "High-resolution femtosecond pulse shaping", J. Opt. Soc. Am. B., vol. 5, No. 8, (Aug. 1988), pp. 1563-1572, Optical Society of America.

Weiner, A.M., "Programmable femtosecond pulse shaping by use of a multielement liquid-crystal phase modulator", Optics Letters, (Mar. 15, 1990), vol. 15, No. 6, pp. 326-328, Optical Society of America.

Weiner, A.M., "Spectral holography of shaped femtosecond pulses", Optics Letters, vol. 17, No. 3 (Feb. 1, 1992), pp. 224-226, Optical Society of America.

Weiner, A.M., et al., "Femtosecond multiple-pulse impulsive stimulated Raman scattering spectroscopy", J. Opt. Soc. Am. B., vol. 8, No. 6, (Jun. 1991), pp. 1264-1275.

Weiner, A.M.; "Femtosecond pulse shaping using spatial light modulators"; Rev. Sci. Instrum. vol. 71(5); 2000; pp. 1929-1960.

Weiner, Andrew M. et al.; "Femtosecond Pulse Shaping for Synthesis, Processing and Time-to-Space Conversion of Ultrafast Optical Waveforms"; IEEE Journal of Selected Topics in Quantum Electronics; vol. 4, No. 2; Mar./Apr. 1998; pp. 317-331.

Weiner, Andrew M., Programmable Shaping of Femtosecond Optical Pulses by Use of 128-Element Liquid Crystal Phase Modulator, (1992) vol. 28, No. 4, pp. 908-919, IEEE Journal of Quantum Electronics.

Wnuk, Pawel, et al., "Coherent control and dark pulses in second harmonic generation," Optics Communications 272, ScienceDirect (2007) pp. 496-502.

Wolfgang Kiefer et al.; "Femtosecond time-resolved spectroscopy of elementary molecular dynamics"; Naturwissenschaften; 2002; pp. 250-258.

Wollenhaupt, M. et al.; "Femtosecond Laser Photoelectron Spectroscopy on Atoms and Small Molecules: Prototype Studies in Quantum Control;" Annu. Rev. Phys. Chem., 56, 2005; pp. 25-56.

Wu, C. et al., Mass and Photoelectron Spectrometer for Studying Field-Induced Ionization of Molecules, International Journal of Mass Spectrometry, Elsevier Science Publishers, Amsterdam, NL, vol. 216, No. 3, May 15, 2002, pp. 249-255.

Wu, Chengyin et al., Laser-Induced Dissociation and Explosion of Methane and Methanol, J. Phys. B. At. Mol. Opt. Phys; Journal of Physics B: Atomic, Molecular and Optical Physics, Jun. 14, 2002, vol. 35, No. 11, pp. 2575-2582.

X. Chen et al.; "Temporally and spectrally resolved amplitude and phase of coherent fourwave-mixing emission from GaAs quantum wells"; Physical Review B, vol. 56, No. 15; Oct. 15, 1997; pp. 9738-9743.

Xu, B et al.; "Quantitative Investigation of the Multiphoton Intrapuse Interference Phase Scan Method for Simultaneous Phase Measurement and Compensation of Femtosecond Laser Pulses;" J. Opt. Soc. Am. B, vol. 23, No. 4, Apr. 2006; pp. 750-759.

Xu, C. et al.;"Two photon optical beam induced current imaging through the backside of integrated circuits"; Appl. Phys. Lett. 71; 1997; pp. 2578-2580.

Xu, J.H., et al., "Study of Pulse Compression from 1.5 μm Distributed Feedback Lasers by a Gires-Tournois Interferometer", Fiber and Integrated Optics, vol. 13, (1994), pp. 365-372.

Y. Ding et al.; "Time-Domain Image Processing Using Dynamic Holography"; IEEE Journal of Selected Topics in Quantum Electronics, vol. 4, No. 2; Mar./Apr. 1998; pp. 332-341.

Y. Oishi, A. Suda, F. Kannari, K. Midorikawa, Intense Femtosecond Pulse Shaping Using a Fused-Silica Spatial Light Modulator, Optics Communications, ScienceDirect, 2006/2007, pp. 305-309.

Y.J. Yan et al.; "Pulse shaping and coherent Raman spectroscopy in condensed phases"; J. Chem. Phys 94 (2); Jan. 15, 1991; pp. 997-1001.

Yan, Y.J. et al.; "Electronic dephasing, vibrational relaxation, and solvent friction in molecular nonlinear optical line shapes"; J. Chems. Phys.; Oct. 15, 1988; pp. 5160-5176.

Yang, W. et al.; "High-ratio Electro-optical Data Compression for Massive Accessing Networks Using AOM-based Ultrafast Pulse Shaping"; Journal of Optical Communications; vol. 22, No. 1; 2001; pp. 694-697.

Yaron Silberberg; "Physics at the attosecond frontier"; Nature, vol. 414, Nov. 29, 2001; pp. 494-495.

Yelin, D. et al.; "Laser scanning third-harmonic-generation microscopy in biology"; Optics Express; vol. 5, No. 8; Oct. 11, 1999; pp. 169-175.

Yoshihiro Takagi et al.; "Multiple- and single-shot autocorrelator based on two-photon conductivity in semiconductors"; Optics Letters, vol. 17, No. 9; May 1, 1992; pp. 658-660.

Yu, Huang, et al., Application of Adaptive Feedback Loop for Ultra-Violet Femtosecond Pulse Shaper Control, Optics Express Opt. Soc. America USA, vol. 14, No. 21, Oct. 2006.

Yu-Chen Shen et al.; "What can short-pulse pump-probe spectroscopy tell us about Franck-Condon dynamics?"; Journal of Chemical Physics, vol. 110. No. 20; May 22, 1999; pp. 9793-9806.

Yu-hui Chiu et al.; "Vibrational mode effects, scattering dynamics and energy disposal in reaction of C2H2 with methane"; J. Chem. Phys., vol. 102, No. 3; Jan. 15, 1995; pp. 1199-1216.

Yuri T. Mazurenko; "Spectral Holography and Spectral Nonlinear Optics of Ultrashort Pulses"; Journal of the Chinese Chemical Society, vol. 47, No. 4A; 2000; pp. 679-683.

Z.W. Shen et al.; "Selective preparation of ground state wave-packets: a theoretical analysis of femtosecond pump-dump-probe experiments on the potassium dimmer"; The European Physical Journal D 14; 2001; pp. 167-172.

Zang, Hegui, et al., "Study on Frequency-doubling Effect of the Dually Doped KTP Crystals," Journal of Synthetic Crystals vol. 29, No. 2 (May 2000).

Zeek, Erik; "Pulse Shaping for High-Harmonic Generation;" Dissertation Submitted in Partial Fulfillment of the Requirements for the Degree of Doctor of Philosophy (Applied Physics) in the University of Michigan, 2000; 126 pages.

Zeidler, D. et al.; "Adaptive compression of tunable pulses from a non-colinear-type OPA to below 16 fs by feedback-controlled pulse shaping"; Appl. Phys. B 70 (Supply; 2000; pp. S125-S131.

Zhang, Q. et al.; "Concerted Elimination Dynamics From Highly Excited States;" Faraday Discussions, 108, 1997; pp. 63-80.

Zhang, Q. et al.; "Femtosecond Dynamics of Photoinduced Molecular Detachment From Halogenated Alkanes. II. Asynchronous Concerted Elimination of $I_2$ From $CH_2I_2$;" J. Chem. Phys., vol. 109, No. 11, Sep. 15, 1998; pp. 4428-4442.

Zheng, Z. et al. "Spectral phase correlation of coded femtosecond pulses by second-harmonic generation in thick nonlinear crystals"; Opt. Lett. 25; 2000; pp. 984-986.

Zheng, Z. et al.; "Coherent control of second harmonic generation using spectrally phase coded femtosecond waveforms"; Chem. Phys. 267; 2001; pp. 161-171.

Zhenwen Shen et al.; "Pump-dump control and the related transient absorption spectroscopies"; Journal of Chemical Physics, vol. 110, No. 15; Apr. 15, 1999; pp. 7192-7201.

Zhou, Jianping, et al., "Generation of 21-fs millijoule-energy pulses by use of Ti:sapphire", Optics Letters, vol. 19, No. 2, (Jan. 15, 1994), pp. 126-128, Optical Society of America.

Zhu, Xin, et al., "In-situ femtosecond laser pulse characterization and compression during micromachining," Optical Society of America (2007) 8 pages.

Zipfel, W.R. et al; "Nonlinear magic: multiphoton microscopy in the biosciences"; Natire Biotechnology, 121 (11); Nov. 2003; pp. 1369-1377.

Zohar Amitay et al.; "Phase-tailoring molecular wave packets to time shift their dynamics"; Chemical Physics 267; 2001; pp. 141-149.

"Coherent® Silhouette, Ultrafast Pulse Shaper," Key Features brochure. Web. Jan. 29, 2008 http://www.coherent.com/Lasers/index.cfm?Fuseaction=show.print&ID=1485.

"Coherent® Silhouette, Ultrafast Pulse Shaping and Measurement," brochure, (2007) 2 pages. Coherent, Inc.

Takasago, Kazuya, et al., "Design of Frequency-Domain Filters for Femtosecond Pulse Shaping," Part 1, No. 2A (Feb. 1996) pp. 624-629. Jpn. J. Appl. Phys.

Fowles, "Introduction to Modern Optics," 1989, Dover 2e, pp. 2-19.

Ogawa et al, Dependence of the Laser Two-Photon Ionization Process in Solution on the Laser Pulse Width, Analytical Chemistry, vol. 73, Mar. 20, 2001, pp. 2066-2069.

Albrecht, T.F. et al. "Chirp Measurement of Large-Bandwidth Femtosecond Optical Pulses Using 2-Photon Absorption," Opt. Commun. 84, 223 (1991).

Dantus, Marcos et al. "Two-photon microscopy with Sub-8fs laswer pulse" PDPA Frontiers in Optics/Laser Science XXVI; Oct. 24-28, 2010, pp. 1-18.

Foing, J.P. et al. "Femtosecond Pulse Phase Measurement by Spectrally Resolved Up-Conversion—Application to Continuum Compression," IEEE J. Quantum Electron. 28, 2285 (1992).

Ranka et al., "Autocorrelation Measurement of 6-fs Pulses Based on the Two-Photon-induced Photocurrent in a GaAsP Photodiode," Opt. Lett. 22 (17), 1344-1346 (1977).

Rhee, T.K. et al. "Chirped-Pulse Amplification of 85-Fs Pulses at 250 Khz with 3rd-Order Dispersion Compensation by Use of Holographic Transmission Gratings," Opt. Lett. 19, 1550 (1994).

Rivet, S. et al., "Complete pulse characterization: measurements of linear and nonlinear properties" Opt. Commun. 181, 425-435 (2000).

Weiner, A.M. "Ultrafast Optics" Chapter 3 entitled "Ultrafast-Pulse Measurement Methods" (pp. 85-146), (2009).

* cited by examiner

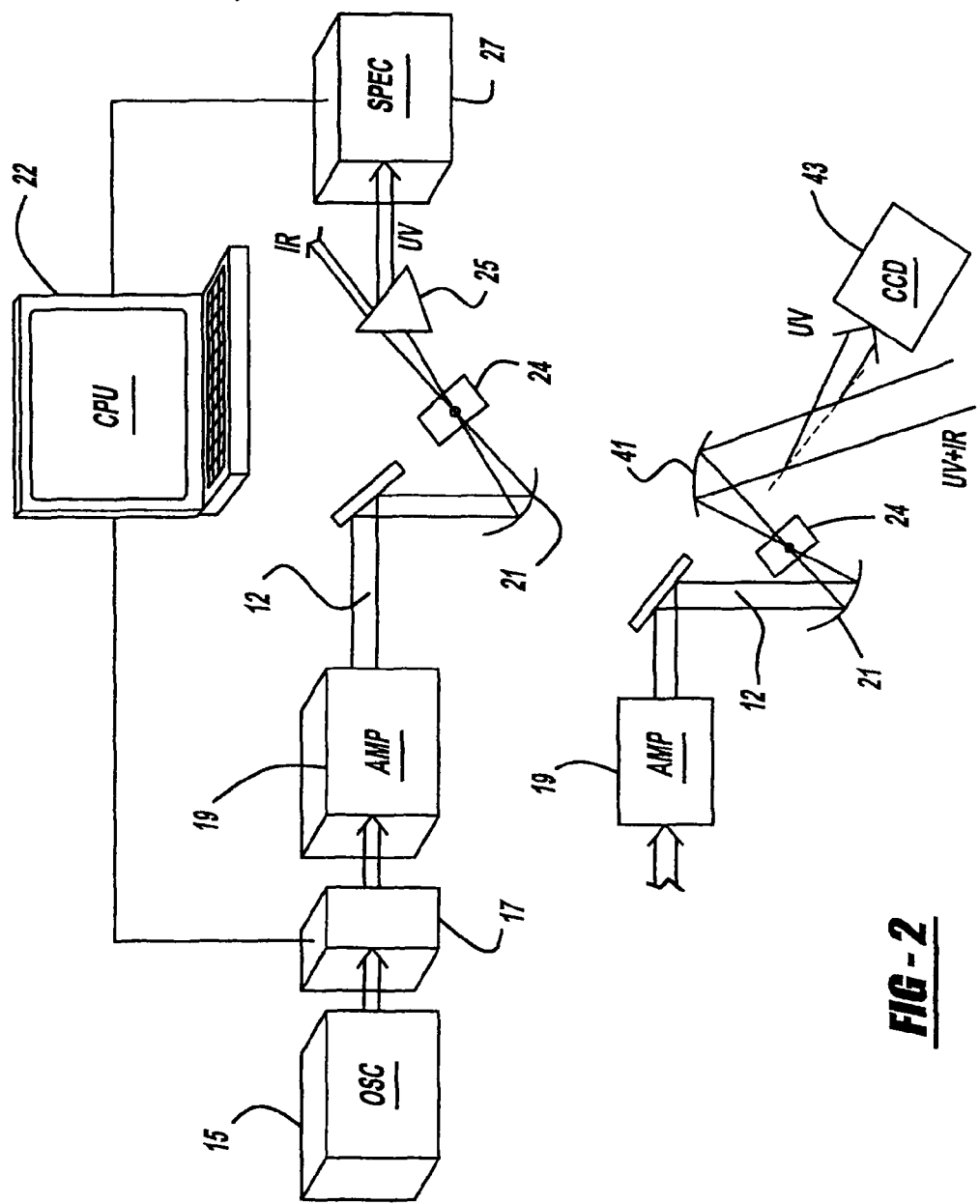

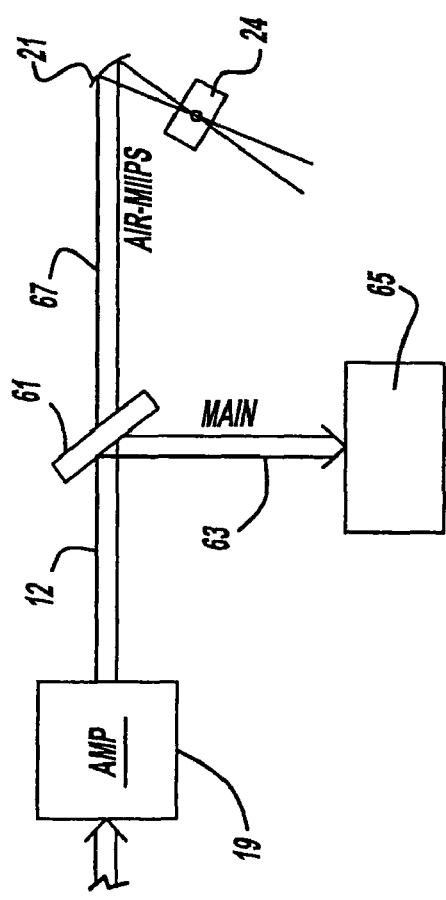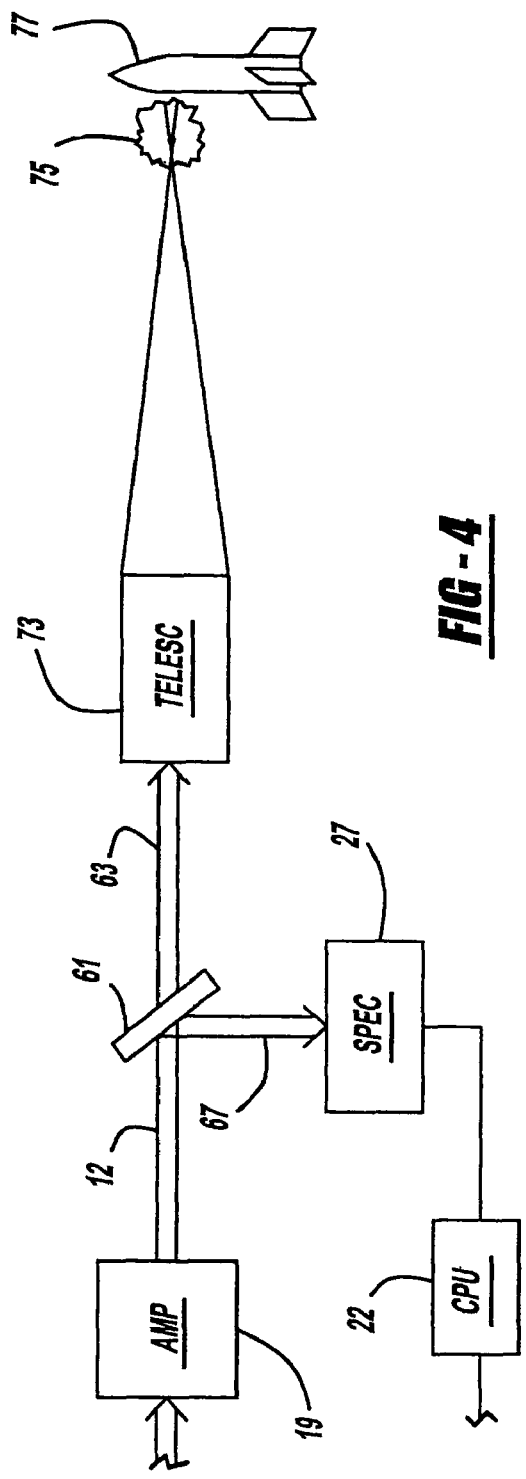

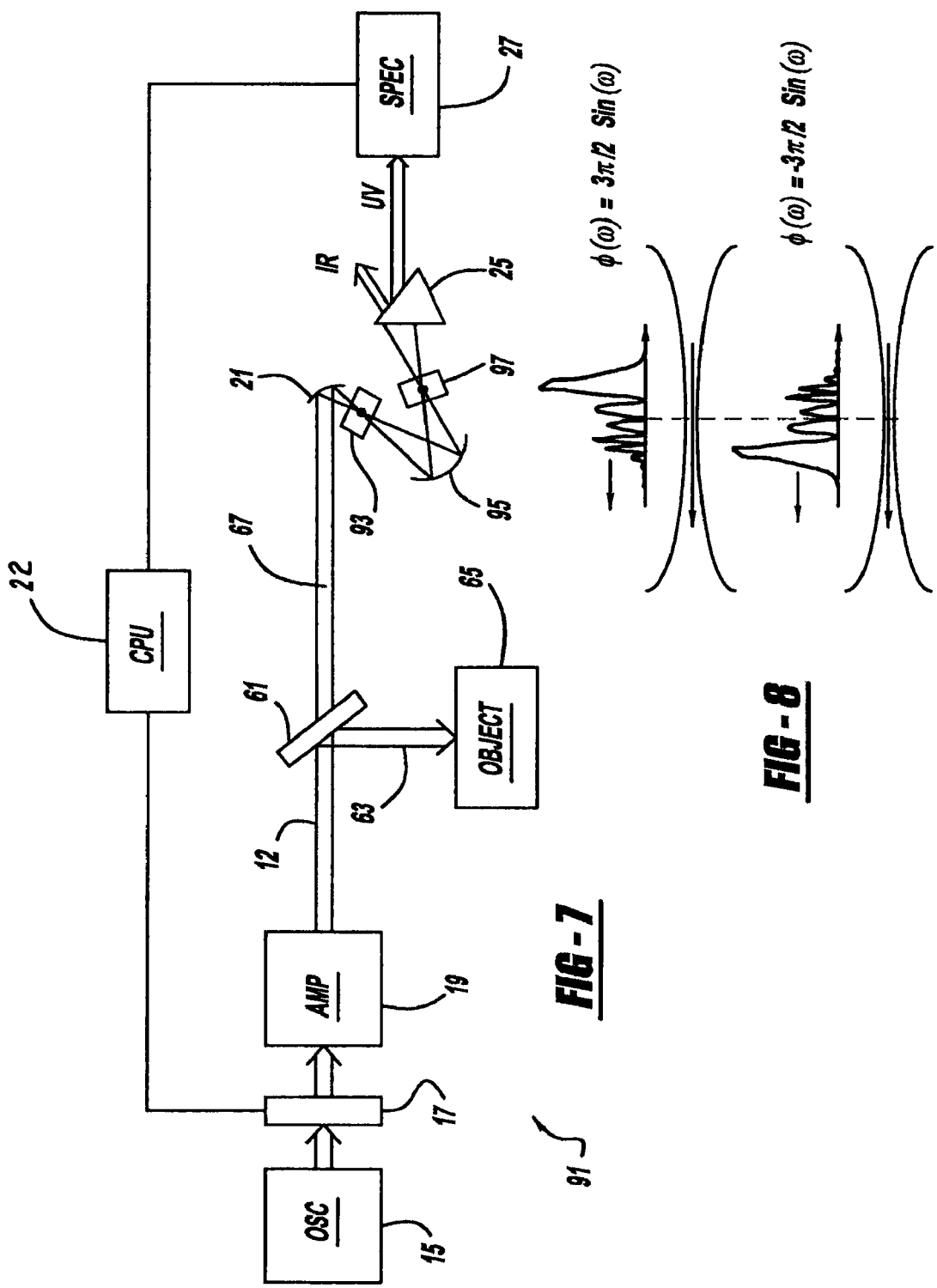

LASER SYSTEM EMPLOYING HARMONIC GENERATION

CROSS REFERENCE TO RELATED APPLICATION

This application is a Continuation of PCT/US2007/024171, filed Nov. 16, 2007, which claims priority to U.S. Provisional Patent Application Ser. No. 60/859,421, filed Nov. 16, 2006, which are both incorporated by reference herein.

This application is also a Continuation-In-Part of U.S. patent application Ser. No. 10/791,377, filed Mar. 2, 2004, which is a Continuation-In-Part of U.S. patent application Ser. No. 10/265,211, filed Oct. 4, 2002, which is a Continuation-In-Part of International Application No. PCT/US2002/02548, filed Jan. 28, 2002, which claims priority to U.S. Provisional Patent Application Ser. No. 60/265,133, filed Jan. 30, 2001. All of these applications are incorporated by reference herein.

STATEMENT OF GOVERNMENT INTEREST

A portion of this invention was made with U.S. Government support under Contract No. CHE-0421047 awarded by the National Science Foundation. The U.S. Government may have certain rights in this invention.

BACKGROUND OF THE INVENTION

The present invention generally pertains to laser systems and more particularly to harmonic generation of a laser beam pulse.

It is known to use crystals to cause second harmonic generation (hereinafter "SHG") in laser beam pulses. Such SHG crystals, however, are expensive and often require frequent replacement due to their hydroscopic nature leading to a reduction of their transparency and due to damage of the crystals over time, especially when used with high intensity lasers. Furthermore, U.S. Pat. No. 6,504,612 entitled "Electromagnetic Wave Analyzer" which issued to Trebino on Jan. 7, 2003, discusses many shortcomings of using thin SHG crystals, however, this patent teaches away from the present invention by instead employing thick SHG crystals. U.S. Pat. No. 6,504,612 is nevertheless incorporated by reference herein.

A few studies have considered third harmonic generation in hollow-core fibers, in air or in noble gases. Exemplary studies are: (a) Y. Tamaki, et al., "Phase-Matched Third-Harmonic Generation by Nonlinear Phase Shift in a Hollow Fiber," App. Phys. B 67, 59-63 (1998); (b) S. Backus, et al., "16-fs, 1-µJ Ultraviolet Pulses Generated by Third-Harmonic Conversion in Air," Optics Letters, Vol. 21, No. 9, 665 (May 1, 1996); and (c) C. Siders, et al., "Blue-Shifted Third-Harmonic Generation and Correlated Self-Guiding during Ultra-Fast Barrier Suppression Ionization of Subatmospheric Density Noble Gases," J. Opt. Soc. Am. B, Vol. 13, No. 2, 330 (February 1996). The systems of these studies, however, suffer from uncorrected pulse distortions and other undesired conditions. For example, the Y. Tamaki article found that prior high-order harmonic generation in gases, such as air, led to undesirable phase mismatching conditions, due in part to self-focusing of the pulse. But, the Y. Tamaki article employed an additional hollow fiber, and the cost and complexity disadvantages associated therewith, in an attempt to overcome the prior issues. Furthermore, R. Bartels, et al., "Shaped-Pulse Optimization of Coherent Emission of High-Harmonic Soft X-Rays," Nature, Vol. 406, 164 (2000), discloses pulse shapes characterized using the frequency-resolved optical gating ("FROG") technique which provided only an approximation of the amplitude and phase, but not a direct measurement.

SUMMARY OF THE INVENTION

In accordance with the present invention, a laser system provides harmonic generation in a laser beam pulse. In another aspect of the present invention, a laser operably emits a laser pulse, a gaseous optical medium operably creates third or greater harmonic generation in the pulse, and a controller characterizes and compensates for distortions in the pulse. A further aspect of the present invention employs multiple optical media arranged to cause cascading harmonic generations in a laser pulse, where at least one is: zero order harmonic generation, third harmonic generation or greater than third harmonic generation. A method of shaping, focusing in a gas, and minimizing distortion in a laser pulse is also provided. A method of using plasma, created by the pulse itself, to generate harmonics of the pulse, is additionally provided.

The laser system of the present invention is advantageous over prior devices since the present invention allows for the elimination of second harmonic generation crystals in some embodiments. This reduces cost, complexity and maintenance of the laser system of the present invention. This can also eliminate the use of autocorrelation or interferometry for measuring phase distortions and compensating for them. The present invention is further advantageous by automatically characterizing and compensating for undesirable distortions in ultra-fast laser pulses, especially those incorporating third harmonic generation. Another advantage of the present invention is that air-Multiphoton Intrapulse Interference Phase Scan (hereinafter "MIIPS") is ideally suited for pulse durations less than five femtoseconds, for octave-spanning femtosecond lasers, and femtosecond pulses of less than two optical cycles in duration. By way of contrast, it is very difficult to use crystals with pulse durations less than five femtoseconds due to the very broad pulse bandwidth. The present invention has a clear advantage when there are no crystals suitable for generating the second harmonic of the wavelength of the laser. Cascading of harmonic generation optical media additionally achieves useful harmonic generation at wavelengths that are otherwise difficult to obtain. Additional advantages and features of the present invention will become apparent from the following description and appended claims, taken in conjunction with the accompanying drawings.

BRIEF DESCRIPTION OF THE DRAWINGS

FIG. 1 is a diagrammatic view showing a first preferred embodiment of a laser system of the present invention, employed in a laboratory;

FIG. 2 is a diagrammatic view showing a second preferred embodiment of the laser system, also employed in a laboratory;

FIG. 3 is a diagrammatic view showing a third preferred embodiment of the laser system, used on a specimen;

FIG. 4 is a diagrammatic view showing an alternate embodiment of the laser system, employed for remote uses;

FIG. 7 is a diagrammatic view showing a fourth preferred embodiment of the laser system, employing cascading optical media for multiplied harmonic generation;

FIG. 8 is a diagrammatic view showing a temporal symmetry feature of the first preferred embodiment laser system;

DETAILED DESCRIPTION OF THE PREFERRED EMBODIMENTS

Figure 5:
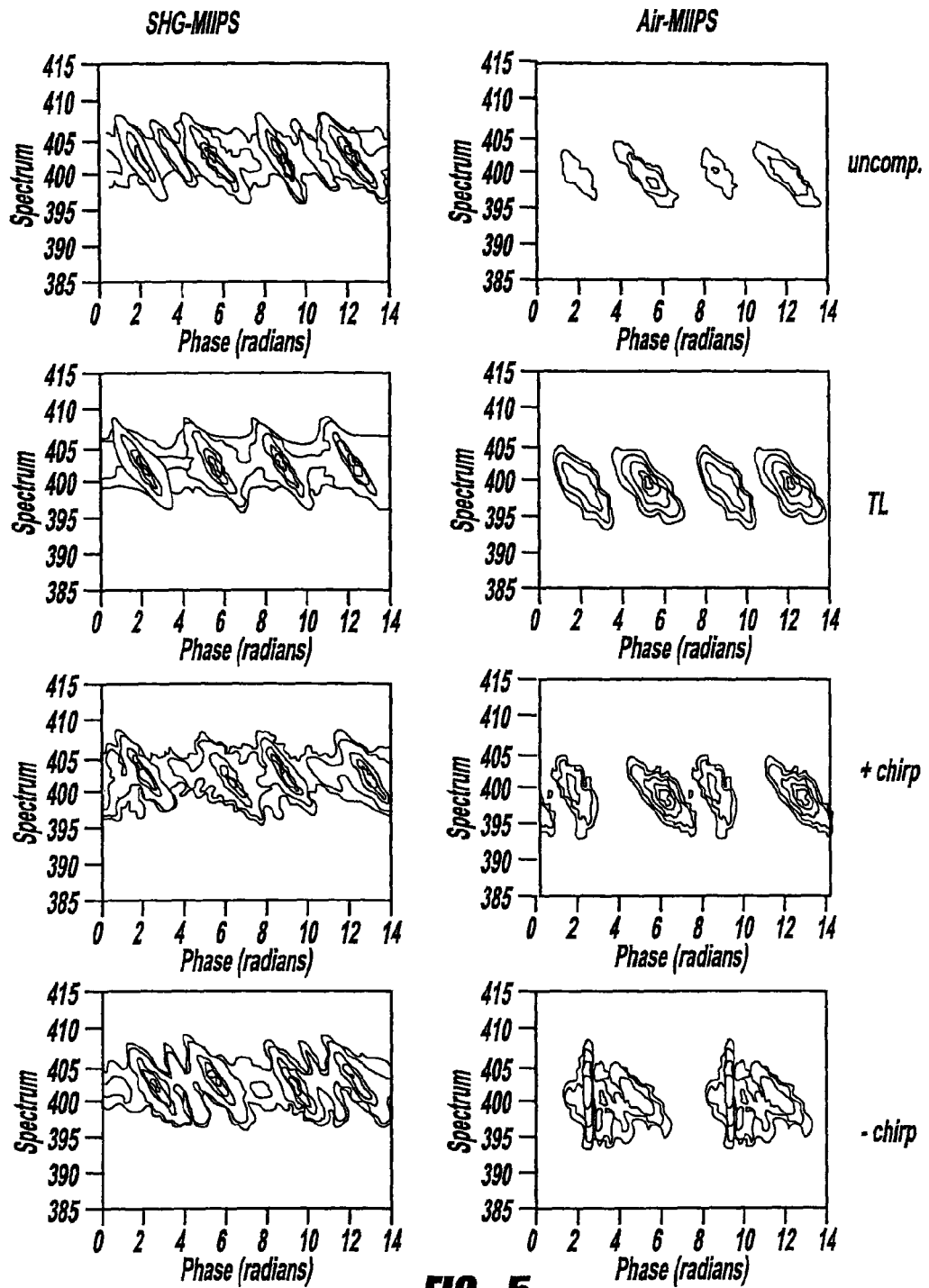
FIG. 5 is a series of traces comparing expected results for SHG crystal-MIIPS (in the left column) to THG air-MIIPS (in the right column) employing the first preferred embodiment laser system.

The present invention laser system preferably employs a noninterferometric single beam method for automated characterization and compression of amplified ultrashort femtosecond pulses that takes advantage of third order nonlinear processes in a gas, such as air. The method compensates high-order phase distortions based on Multiphoton Intrapulse Interference Phase Scan (hereinafter "MIIPS"). The accurate measurement of the spectral phase in femtosecond laser pulses is paramount to the use of phase-modulated laser pulses for femtochemistry, control of chemical reactions, and optical communications. Multiphoton Intrapulse Interference Phase Scan takes advantage of the influence that phase modulation has on the intensity of nonlinear optical processes. The MIIPS equipment and method are disclosed in U.S. Patent Publication No. 2006/0056468 entitled "Control System and Apparatus for Use with Ultra-Fast Laser," which was invented by M. Dantus, et al., and published on Mar. 16, 2006; this patent publication is incorporated by reference herein. Utilizing the method of MIIPS on third harmonic generation in air allows for spectral phase characterization and compensation without need for a crystal typically required for second order nonlinear optical processes. In addition, no phase-matching criterion is required for the third harmonic generation in air employed with the present invention, thereby eliminating pulse bandwidth limitations typically introduced by second harmonic generation in nonlinear crystals.

Referring to FIG. 1, a first preferred embodiment of a laser system of the present invention is ideally suited for use in a laboratory. An amplified titanium:sapphire, Legend model laser, which can be obtained from Coherent Inc., is used to produce 1 mJ, 40 fs laser beam pulses 12 at a 1 kHz repetition rate. The laser amplifier is seeded with a Micra model titanium:sapphire oscillator 15 which can also be obtained from Coherent Inc. The seed pulses are shaped by an all-reflective folded 4f pre-amplification pulse shaper 17 with a phase only spatial light modulator (hereinafter "SLM") which can be obtained from CRi as SLM 128, before amplification by an amplifier 19. A computer controller 22 is connected to and automatically controls the pulse shaper.

The output laser pulse intensity is reduced to 20 μJ and focused in air with a 50 mm focal length concave mirror 21. The air focal point is also designated as a gaseous, nonlinear optical medium 24, and may alternately include argon, nitrogen or helium gas in a housing. Low incident power is required to diminish the effects of self phase modulation on the measured phase. It is possible to increase the incident power to 250 μJ with a 250 mm focal length concave mirror. The third harmonic is collimated and separated from the fundamental beam by a fused-silica prism pair 25. The light is then coupled into an Ocean Optics USB 2000 spectrometer 27, which is also connected to controller 22. The third harmonic spectrum is then detected by the spectrometer and recorded as a function of δ to produce the air-MIIPS traces illustrated in FIG. 5.

Figure 6:
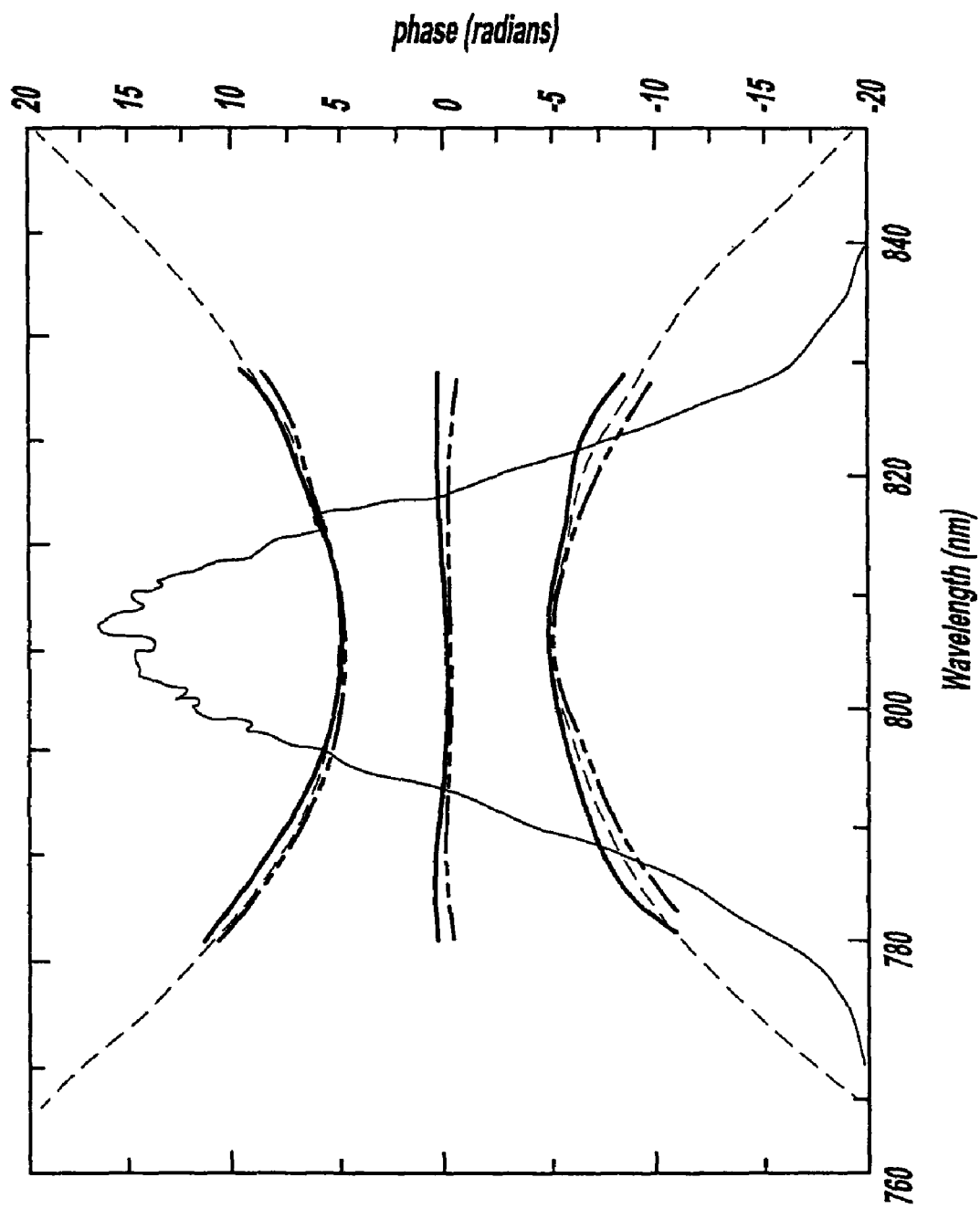
FIG. 6 is a graph comparing expected extracted phases for SHG crystal-MIIPS and THG air-MIIPS employing the first preferred embodiment laser system.

FIG. 5 illustrates expected air-MIIPS measurements taken alongside SHG MIIPS measurements using a BBO crystal for the purpose of comparing the extracted phase. The MIIPS traces are first shown for the initially uncompensated phase of the laser pulse, then for the compensated phase producing transform limited pulses. The figure also shows the effect of +2000 fs$^2$ positive and −2000 fs$^2$ negative chirp on both types of MIIPS traces. Further, FIG. 6 shows the flat phase of the compressed/compensated pulse by SHG crystal-MIIPS (shown with solid lines) and THG air-MIIPS (shown with phantom lines). FIG. 6 also shows the retrieved phase for +/−2000 fs$^2$ chirp imparted on the phase by the SLM in the pulse shaper.

For three-photon excitation, in the absence of intermediate resonances as long as self-phase modulation is small, the electric field can be written as $$E^{(3)}(\Delta) \propto \int_{-\infty}^{\infty}\int_{-\infty}^{\infty} d\Omega_1 d\Omega_2 |E(\Omega_1)||E(\Omega_2)|$$
$$|E(\Delta - \Omega_1 - \Omega_2)| \times \exp\{i[\varphi(\Omega_1) + \varphi(\Omega_2) + \varphi(\Delta - \Omega_1 - \Omega_2)]\}$$

where |E| and φ are the field amplitude and phase of the intermediate frequencies that combine to generate the third harmonic. Each photon in the three photon transition is spectrally detuned by $\Omega_1$, $\Omega_2$, or $(-\Omega_1-\Omega_2)$, and A is the detuning from the third order multiple of the carrier frequency of the pulse $(\omega - 3\omega_o)$. This Four Wave Mixing process applies to all third order processes.

As in SHG MIIPS, air-MIIPS works by scanning a reference phase function, f(δ,ω), across the pulse's spectral width by the spectrometer. When the reference phase is f(δ,ω)=α sin(γω−δ), the parameters, α and γ, are fixed parameters representing the binary values of π and the pulse duration respectively. As the phase shift δ is scanned from 0 to 4π by the spectrometer, the third harmonic spectrum is recorded by the computer controller. The δ value that produces the maximum third harmonic intensity for each frequency, $\delta_m(\omega)$, is found for each order n, and the second derivative of the unknown phase is calculated using:

$$\phi''(\omega) = \alpha\gamma^2 \sin[\gamma\omega - \delta_m{}''(\omega)]$$

The second derivative is used by the controller to determine the spectral phase φ(ω), which is added to f(δ,ω) at the shaper for another iteration of the above process, resulting in a refined result for φ(ω). In this way, the phase is calculated directly from the data via an iterative analytical approach. Another preferred variation uses a quadratic phase function in place of the sinusoidal phase function.

A second preferred embodiment of the laser system of the present invention is illustrated in FIG. 2. The equipment and method are essentially the same as with the first preferred embodiment except a collimating concave mirror 41 directs the pulse 12. A small portion of the THG is thereafter scattered by dust, water droplets, a prism, etc. toward a spectrometer with a CCD detector 43. The remainder of the ultraviolet and infrared spectrum continues to propagate for use with measurements. A photomultiplier tube or simplified spectrometer could be used in place of the CCD/spectrometer disclosed in this embodiment. This set-up is ideally suited for a laboratory environment.

FIG. 3 shows a third preferred embodiment of the present invention laser system well suited for a field or industrial environment. This embodiment is similar to the first preferred system except a 99% reflective splitter 61 reflects a majority of the pulse 63 to a specimen or object 65 being identified or worked upon (such as through micromachining, protein sequencing, communications, or OCT) and a small amount of the pulse 67 to concave mirror 21 for the air-MIIPS. An antireflective coating is on the backside of splitter 61.

A remote sensing or remote working laser system of the present invention is shown in FIG. 4. This alternate embodiment laser system 71 is similar to the third preferred embodiment except that the main laser pulse 63 is focused by a telescope 73 to a gaseous nonlinear optical medium 75, such as atmospheric air, to create third harmonic generation in the pulse 63. The THG, MIIPS compensated pulse is remotely transmitted 5 or more meters (most likely greater than 10 meters) from the laser system to a targeted object or specimen. Ideally, the THG focal point should be at or near the targeted object. Such a system is used for remote identification of an undesired biological or chemical specimen, or to ablate the surface of an aerospace object 77 such as a missile, airplane, satellite or the like for identification or other purposes. It is also envisioned that this exemplary embodiment can be employed as a visible light-emitting filament, elongated along a portion of the pulse's path.

A fourth preferred embodiment of the present invention includes a cascading laser system 91 and is illustrated in FIG. 7. This system is similar to that disclosed hereinabove for the third preferred embodiment. The differences, however, include a first gaseous, nonlinear optical medium 93, a second concave mirror 95, and a second gaseous, nonlinear optical medium 97. This arrangement of two or more in-line harmonic generation units creates a cascading and harmonic generation multiplying effect on the pulse. Here a gas is employed in each optical medium 93 and 97 to cause third harmonic generation at each location. For example, an argon gas is used for the optical media and a pulse duration of about 30-40 fs is employed centered about 800 nm. Argon is desirable due to its atomic and highly polarizable nature. The first optical medium creates THG at about 266 nm and the second optical medium creates THG at about 89 nm. The cascading allows for "nonlinear wave mixing" of the pulse.

Alternately, combinations of crystals and a gaseous optical medium can be used in a cascading and harmonic generation multiplying process. For example, a 0.1 mm thick crystal of Potassium Dihydrogen Phosphite (KDP) or a BBO crystal having a thickness of 0.05 mm is used at either the first or second optical medium location to create second harmonic generation, and a gas is used at the other optical medium location to create third harmonic generation. It should also be appreciated that three or more optical media can be cascaded in-line and a second amplifier may be optionally provided between any pairs of optical media.

Referring to FIG. 8 and the air-MIIPS TL graph in FIG. 5, the features in the MIIPS trace show an alternating intensity pattern. The changes in the intensity are due to the fact that sinusoidal phase modulation can be used to prepare pulses with a temporal asymmetry. Time-asymmetric pulses are those that change if time is reversed. For example, when the phase function is one period of the sine function in the frequency domain, the pulse, in the time domain can be described as a progression of increasingly stronger pulses ending with one that is greatest in intensity. The phase between the sub-pulses alternates. By changing the phase to minus-sine the temporal symmetry is reversed, in this case the most intense feature precedes the sub-pulses. This feature is well suited for use with micromachining or for medical surgery.

When lasers interact with matter, in most cases the temporal symmetry of the shaped pulse matters. For example, with a sine function one can use the preceding sub-pulses to cause molecular alignment, or to promote the motion of atoms away from their equilibrium position thus enhancing the probability of ionization and dissociation. This effect is manifested in MIIPS as an enhanced signal, and in micromachining as an enhanced laser-induced breakdown spectroscopy ("LIBS") signal.

There are a number of strategies that can be used to control the temporal symmetry of shaped laser pulses. A nonlimiting example of temporal asymmetry is as follows:

Linear chirp (a quadratic phase modulation in frequency): Introduces only a frequency asymmetry but not an intensity profile asymmetry.

Sine functions: introduce clear temporal asymmetry in the intensity envelope. A multiplier changes the intensity of the sub-pulses. The extent of the sub-pulses can be controlled by introducing the factor such that for a phase $\phi(\omega)=3/2\pi \sin(\tau\omega)$ increasing $\tau$ decreases the extent in time of the sub-pulses, and vice versa.

Binary phase functions $(0-\pi)$: always produce pulses that are temporally symmetric.

Binary phase functions $(0-\pi/2)$: can be used to prepare temporally asymmetric pulses.

Cubic phase modulation: produces temporal asymmetry similar to sine functions, a multiplier can be used to control the spacing between the sub-pulses and for how long they extend. A positive pre-factor causes the appearance of trailing sub-pulses, and a negative pre-factor causes sub-pulses to appear before the strongest pulse.

In other words, temporally asymmetric pulses increase or decrease in intensity as a function to time. They can be created using a cubic or a sinusoidal phase function. Pulses that start with high intensity and then decrease are ideal when there is a threshold; for example, in micromachining, ablation, plasma generation, and filamentation. Pulses that start with a lower intensity are ideal when the process requires molecular alignment. Then the slow increase of the laser intensity gives the molecules a chance to align before the more intense part of the laser arrives and ionizes them.

Plasma Harmonic Generation

An alternate embodiment of the present invention laser system uses plasma to cause harmonic generation rather than a crystal. The plasma is created through ionization of the workpiece or targeted specimen, and otherwise acts like the air focal point and air-MIIPS described with the previous embodiments herein. Odd or even numbered harmonic generation can be created depending upon the type of transmission and specimen interface. For example, an air transmission and an airborn, gaseous chemical specimen can create third harmonic generation from the associated plasma. As a further example, a liquid transmission and silicon wafer specimen can create SHG from the associated plasma. The plasma is created by the pulse itself ablating the specimen through ionization. The plasma generates harmonics in the pulse that can subsequently be used for MIIPS characterization and compensation of the phase distortions. An exemplary micromachining system and method are disclosed in International PCT Patent Application No. PCT/US2007/008878 entitled "Laser Material Processing System" invented by Marcos Dantus and filed on Apr. 9, 2007; this application is incorporated by reference herein. When the laser beam is focused on the medium to create a plasma, the intensity or spectrum of the harmonics of the pulse produced by the plasma is used to characterize the pulses and compensate for phase distortions in the pulses either in a repetitive and automatically controlled manner, or with a fixed shaper set to predetermined values (based on prior tests or calculations).

MIIPS Variation

A MIIPS variation is as follows. Conceptually, MIIPS is based on the observation that for a given frequency $\omega$, the SHG is maximized when the second derivative of the phase is zero. The reason for this is that when the second derivative of the phase is zero there is only constructive multiphoton intrapulse interference (hereinafter "MII"). When the second derivative of the phase is not zero there is destructive MII and this suppresses nonlinear optical ("NLO") processes. This can be summarized in one equation of MIIPS: $f''(\omega,\delta_{max})-\Phi''(\omega)=0$, where $\delta_{max}$ is the parameter in the reference phase function for which the NLO signal at frequency $\omega$ is maximized. This condition provides a direct measurement of the second derivative of the unknown phase in terms of the reference phase, because when the NLO is maximized $\Phi''(\omega)=f''(\omega,\delta_{max})$ is known. Therefore, for every frequency $\omega$, the reference phase $f(\omega,\delta_{max})$ that maximizes the NLO process is found in the measured scan.

Figure 9:
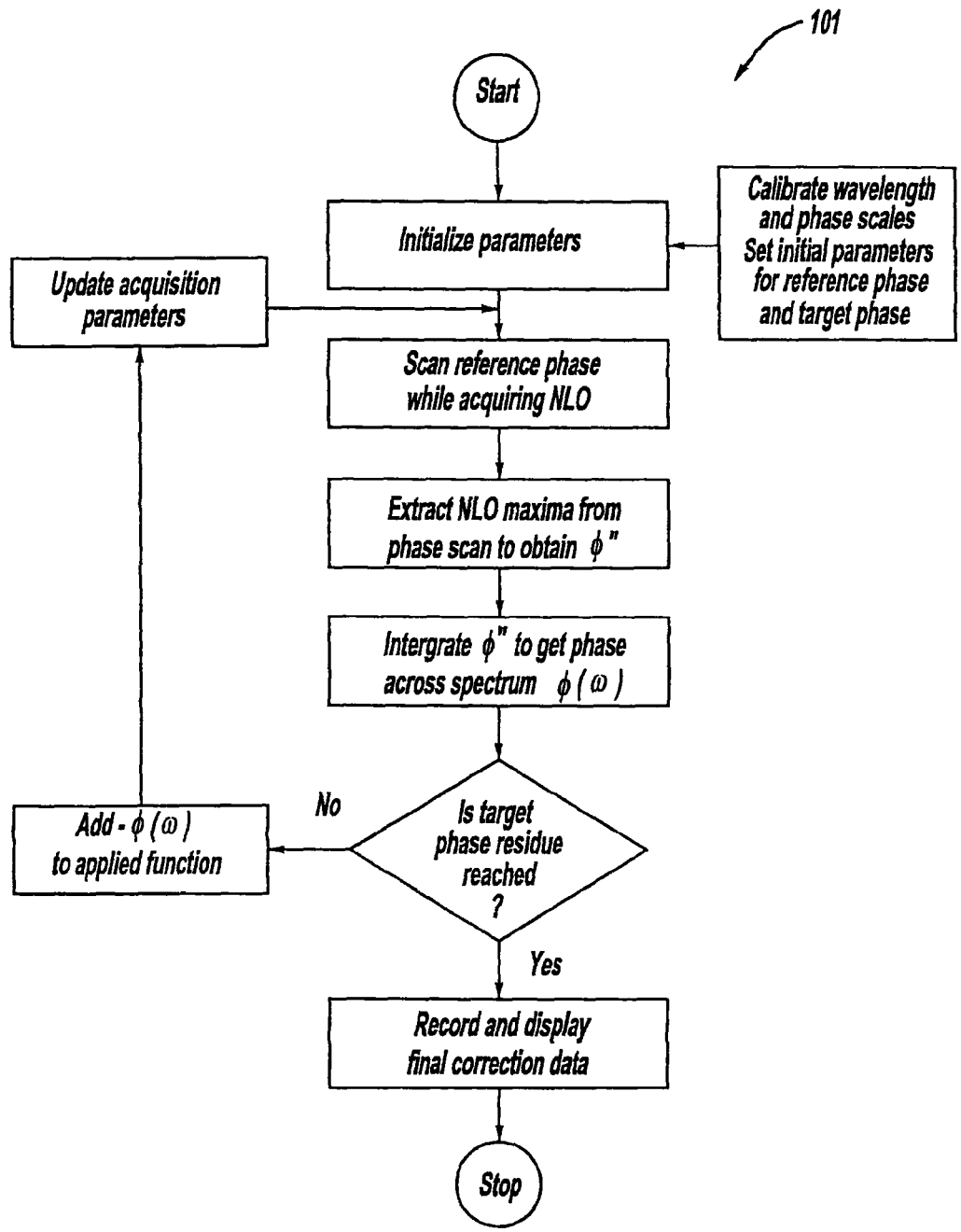
FIG. 9 is a flow chart showing a computer program for a variation of MIIPS employed in the present invention laser system.
Figure 10:
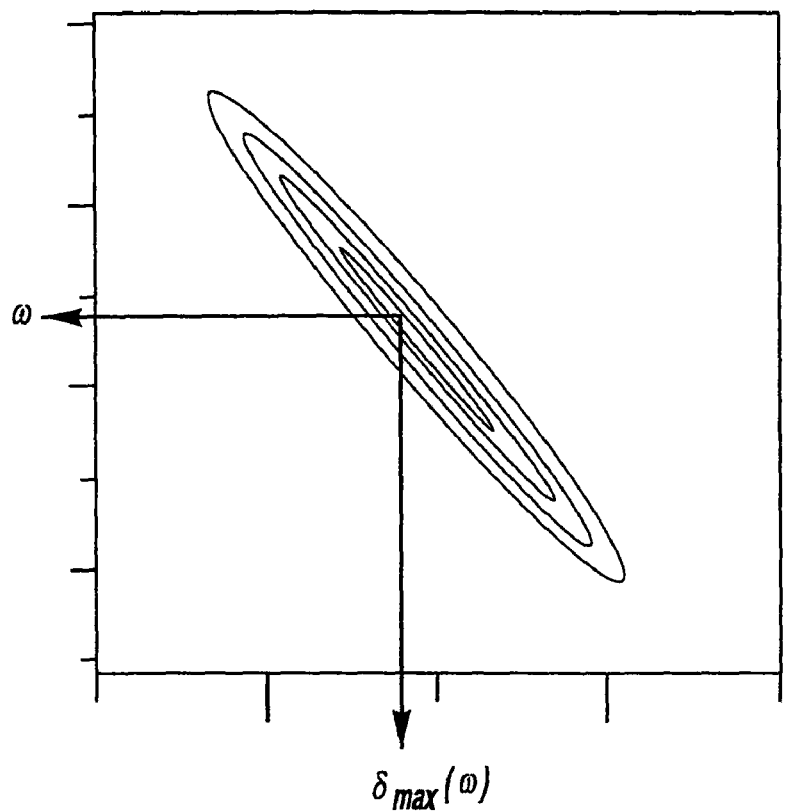
FIG. 10 is a theoretical graph corresponding to the computer program of FIG. 9.

Referring to FIGS. 9 and 10, programmed computer software instructions 101 for MIIPS use a pulse shaper to successively introduce a set of calibrated reference spectral phases $f(\omega,\delta)$ to the pulses, with unknown phase distortion $\Phi(\delta)$, and measures the resulting NLO spectra. Alternatively, the reference phase can be introduced by scanning a prism or a grating. The NLO process can be second harmonic generation, third harmonic generation, terahertz generation, or any higher harmonic generation. In some cases, where the spectrum is not available, it is possible to run MIIPS by more simply recording the intensity of the NLO process without the full spectrum. In this case, recording the total two-photon excitation or three-photon excitation should work properly. The material is, for example, zinc oxide or gallium nitride powder.

Once $\Phi''(\omega)$ is determined, double integration results in $\Phi(\omega)$, which can be used for accurate phase compensation by subtraction to achieve TL pulses. A MIIPS scan can be visualized in a two dimensional contour plot showing the NLO intensity as a function of $\omega$ and $\delta$, as is illustrated in FIG. 10. When the reference function is $f(\omega,\delta)=\delta(\omega-\omega_0)^2$, the quadratic reference phase, a $\delta$ scan results directly in $\Phi''(\omega)$. When the reference function is $f(\omega,\delta)=\delta(\omega-\omega_0)^2\cdot\gamma(\omega-\omega_0)^3$, the cubic reference phase, a $\delta$ scan results in diagonal lines with a slope proportional to $\gamma$, when correcting for that slope on obtains two measurements for $\Phi''(\omega)$, each corresponding to the plus or minus sign of $\gamma$. When the reference function $f(\omega,\delta)=\alpha \sin[\gamma(\omega-\omega_0)-\delta]$ is used, the sinusoidal reference phase, where $\delta$ is a parameter scanned across a $4\pi$ range, the features corresponding to $\delta_{max}(\omega)$ for TL pulses are diagonal parallel lines separated by $\pi$. The choice of reference phase is determined by the user, however, sinusoidal phases are preferred for very accurate results. Nevertheless, a quadratic phase is very simple to implement and gives an excellent first scan. The accuracy of the cubic phase should be as good as that of the sinusoidal phase. It is preferred to run one iteration with the quadratic phase and then run subsequent iterations with the cubic phase.

The target phase residue is set as the minimum deviations tolerable by the user. Typically, distortions are reduced to 0.1 rad across the spectrum. One can also define the parameter $\tau/\tau_{TL}$, where $\tau$ and $\tau_{TL}$ are the calculated pulse duration by Fourier transform of the spectrum of the laser with and without the residual phase distortion. MIIPS values with this embodiment should routinely reach the 1.01 level and in some cases are even lower than 1.001.

When the spectrum of the NLO process cannot be measured or is unknown, and one can only measure the integrated NLO intensity, then the cubic or sinusoidal reference phases are preferred. The phase retrieval then requires measuring the position and width of the maximum NLO. The spacing between the maxima gives the quadratic dispersion and the difference in width gives the cubic dispersion when using a sinusoidal function. The goal is to obtain equally spaced features of equal width. In this situation one cannot correct higher order distortions as with the MIIPS that uses the spectroscopic information.

Programmable computer software instructions 101, shown in FIG. 9, are stored in the controller. This software automatically calculates, determines and controls the laser and pulse shaper or gratings/prisms based upon the sensed signals from the spectrometer. It is noteworthy that this simpler approach to MIIPS does not always require a dedicated pulse shaper, but instead can use a pair of less expensive gratings or prisms. For example, the MIIPS unit can use the amplifier and compressor gratings. Alternately, a fixed shaper can be employed for correcting the pulse distortion based on the new MIIPS software calculations. Especially for pulse durations of 5 fs or less, when MIIPS is used with a quadratic phase function instead of a sinusoidal function, a single scan is needed to measure the phase distortions with an accuracy similar to 0.5%.

Dentistry

The present invention laser system and method are ideally suited for use in performing dentistry. For example, a Ti:Sa femtosecond laser using a pulse energy of about 300-400 µJ and a pulse repetition rate of about 3 kHz is expected to achieve an ablation rate of about 1 mm$^3$/min on the dentine surface of a human tooth. The laser pulse is shaped and MIIPS is preferably employed to reduce undesired pulse distortions. The pulse creates plasma which can optionally be employed instead of a crystal. A pulse duration equal to or less than 120 fs is preferred for dental surgery which includes drilling.

Self-Diffraction MIIPS

Figure 11:
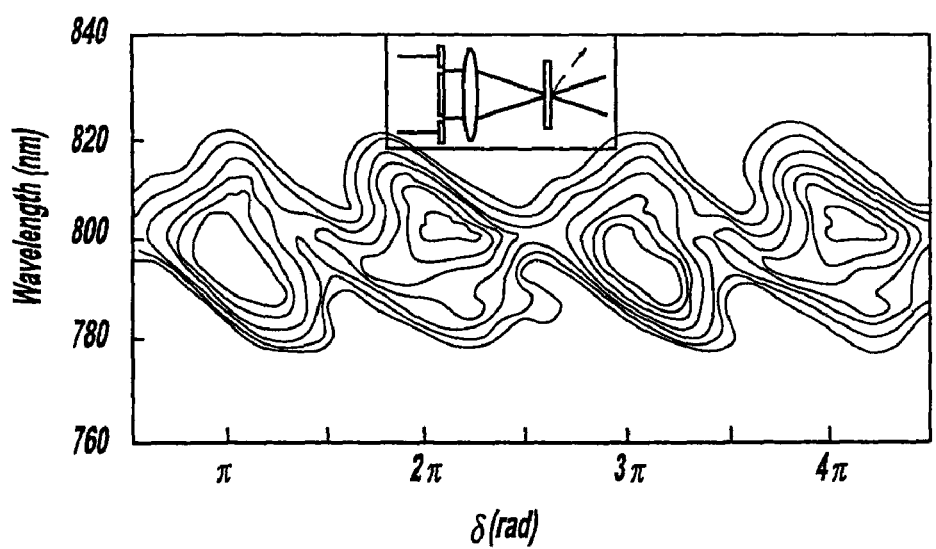
FIG. 11 is a graph showing a self-diffraction MIIPS variation employed in the present invention laser system.
Figure 12:
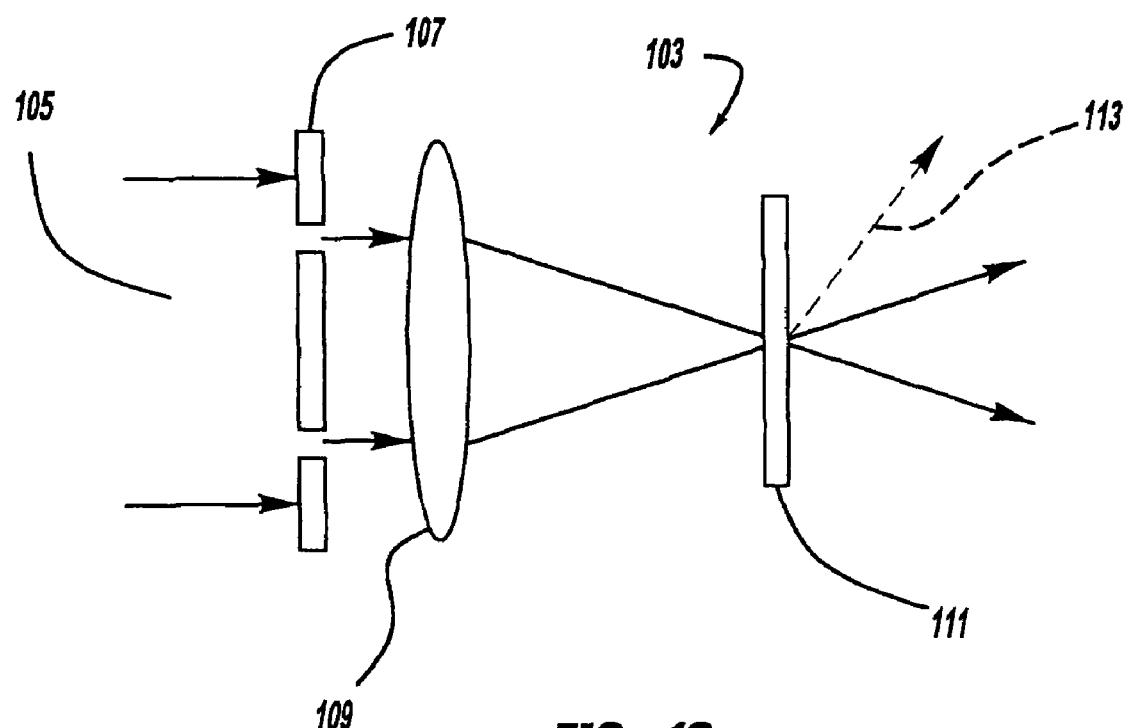
FIG. 12 is a diagrammatic view, corresponding to FIG. 11, showing a self-diffraction MIIPS variation employed in the present invention laser system.

Another variation of the laser system of the present invention employs self-diffraction Multiphoton Intrapulse Interference Phase Scan methods and systems. Reference should be made to FIGS. 11 and 12. Self-diffraction is essentially the same as four wave mixing and transient grating. Self-diffraction MIIPS is particularly useful in characterizing ultraviolet pulses for which SHG crystals are unavailable. Self diffraction removes the wavelength restrictions of SHG crystals, making it work for any wavelength from the hard-UV to the far-infrared. FIG. 11 shows infrared, transform limited pulses expected with self-diffraction MIIPS.

A laser system 103 includes an emitted fs laser pulse 105 which is self-diffracted by a mask 107 having a pair of apertures. Mask 107 blocks all but two small regions of the amplified pulse (although additional apertures can alternately be used). The resulting beams are then focused on a nonlinear medium 111 by a lens 109 and the self-diffracting signal 113 is detected by a compact fiber-coupled spectrometer. A 100 µm quartz plate and a 250 µm sapphire plate are used for the IR and UV pulses, respectively. While transform limited pulses are used, a small quadratic and cubic dispersion are apparent in the feature spacing and angle; these distortions can be measured and compensated for using the MIIPS systems and methods discussed hereinabove. The traces in FIG. 11 are parallel and equidistant features indicating TL pulses using infrared pulses. Unlike in the prior FROG method, the self-diffraction of the present invention does not force a delay in the pulses, does not require a vacuum and can be used with a crystal (or without, using air or plasma instead) even for UV pulses.

While various embodiments of the present invention have been disclosed, it should be realized that other variations may alternately be employed. For example, the gaseous nonlinear optical medium can be used to generate zero order harmonic generation (known as optical rectification), fifth order harmonic generation or seventh or greater harmonic generation, in a compensated pulse. Further for example, it may be desirable to provide a 1 μm Yttrium or 1.5 μm Erbium laser to create fifth harmonic generation in a gas. Moreover, the dual beam FROG procedure can be used in combination with cascading optical media although various advantages of the preferred embodiment may not be realized. It is alternately envisioned to employ a pulse duration of less than 5 fs with air-MIIPS or other nonlinear gaseous optical media, and without a crystal. It is intended by the following claims to cover these and any other departures from the disclosed embodiments which fall within the true spirit of this invention.

The invention claimed is:

1. A laser system comprising a laser operably emitting a laser pulse, a gaseous optical medium operably creating third or greater order harmonic generation in the pulse, and a controller assisting in compensating for spectral phase distortions in the pulse, the controller using Multiphoton Intrapulse Interference Phase Scan to measure and compensate for distortions in the pulse.

2. The system of claim 1 wherein the gaseous optical medium is only air.

3. The system of claim 1 further comprising a telescope operably focusing the pulse at least 5 meters away in the gaseous optical medium.

4. The system of claim 1 further comprising a pulse shaper automatically changed by the controller, the pulse being shaped prior to creation of the harmonic generation.

5. The system of claim 1 further comprising a second optical medium that receives the harmonic generation and luminescence_proportional to intensity of the harmonic generation.

6. The system of claim 1 wherein the gaseous optical medium is an atomic gas.

7. The system of claim 1 wherein the intensity of the third or greater order harmonic generation is used to measure spectral phase distortions and determine the extent of phase distortions in the pulse by the controller.

8. The system of claim 1 wherein the pulse has a duration of less than 5 fs.

9. The system of claim 1 wherein the gaseous optical medium is a plasma.

10. A method of operating a laser system comprising:
(a) shaping at least one laser beam pulse of less than 50 fs;
(b) focusing the at least one shaped pulse in a gas without a crystal to generate third or greater harmonic generation, or zero order harmonic generation in the at least one pulse;
(c) automatically varying the shape of the at least one pulse to minimize distortions therein; and
(d) using multiphoton intrapulse interference software to automatically characterize and compensate for undesired characteristics in the at least one pulse.

11. The method of claim 10 further comprising cascading the at least one pulse, after the shaping and focusing, through a subsequent gaseous nonlinear optical medium to change the harmonic generation of the at least one pulse.

12. The method of claim 10 further comprising aiming the at least one pulse at a remote object more than 5 meters away from the laser system.

13. The method of claim 10 further comprising destroying a remotely located object with the at least one pulse.

14. The method of claim 10 further comprising micromachining an object with the at least one pulse.

15. The method of claim 10 further comprising creating third harmonic generation in the at least one pulse with the gas which is air.

16. The method of claim 10 further comprising using the dependence of the spectrum of the third harmonic on a phase parameter to calculate an optimum pulse compression function.

17. The method of claim 10 further comprising emitting the at least one pulse with a duration of less than 5 fs, and directly measuring and compensating for undesired spectral phase distortions in the at least one pulse.

18. The method of claim 10 further comprising performing surgery with the at least one shaped pulse.

19. The system of claim 10 wherein the gas is plasma.

20. A laser system comprising:
a laser operably emitting at least one laser pulse;
a pulse shaper operably varying a characteristic of the at least one laser pulse;
a spectrometer operably measuring a feature of the at least one laser pulse; and
a controller connected with the spectrometer and pulse shaper to characterize spectral phase distortions in the at least one laser pulse, the controller directly determining a second derivative of an unknown phase in terms of a reference phase.

21. The laser system of claim 20, wherein the controller uses double integration of a phase to compensate for the phase distortions in the at least one laser pulse.

22. A laser system comprising:
a laser operably emitting at least one laser pulse;
a pulse shaper operably varying a characteristic of the at least one laser pulse;
a detector operably measuring a feature of the at least one laser pulse; and
a controller connected with the detector and pulse shaper to characterize spectral phase distortions in the at least one laser pulse, the controller directly determining a second derivative of an unknown phase in terms of a reference phase;
wherein the controller uses Multiphoton Intrapulse Interference Phase Scan software to determine an intensity of a nonlinear optical process without a full spectrum.

23. The laser system of claim 20, wherein the pulse shaper is automatically changed by the controller and the controller characterizes the distortions in a calculated manner.

24. The laser system of claim 20, wherein the at least one pulse has a duration of less than 5 fs and the at least one pulse is used for surgery.

25. The laser system of claim 20, wherein the at least one pulse has a duration of less than 5 fs and the at least one pulse is used for micromachining.

26. The laser system of claim 20, wherein the at least one laser pulse has a duration of 120 fs or less, and is used for dentistry.

27. The laser system of claim 20, wherein the controller automatically measures the phase distortions with an accuracy of better than 0.1 radian across a spectrum after a single scan.

28. The laser system of claim 20, wherein the pulse shaper is a spatial light modulator automatically varied by the controller, and the controller corrects the distortions in a calculated manner.

29. A laser system comprising:
- a laser operably emitting at least one laser beam pulse having a duration of 50 fs or less;
- a gaseous medium operably creating third or greater order harmonic generation in the at least one pulse, the gaseous medium being remotely located at least five meters away from the laser;
- a pulse shaper operably shaping the at least one pulse;
- a controller, using multiphoton intrapulse interference software, controlling shaping characteristics of the pulse shaper and assisting in at least one of characterizing of or compensating for spectral phase distortions in the at least one pulse; and
- a focusing optic operably focusing the at least one pulse at the gaseous medium.

30. The system of claim 26 wherein the pulse shaper operably changes the spectral phase of the at least one pulse to maximize the third or greater harmonic generation through a series of automated measurement and compensation steps until the minimum deviation limit is achieved.

31. The system of claim 29 wherein the duration of the pulse is shorter than two optical cycles.

32. The system of claim 29 wherein the pulse propagates as a self-generating filament.

33. The system of claim 29 wherein a location of the gaseous medium focused on is at least 5 meters away from the laser, and the controller automatically varies a shaping characteristic of the pulse shaper based on calculations without a learning algorithm.

34. The laser system of claim 22, wherein the at least one laser pulse has a duration of 50 fs or less, the pulse shaper is automatically changed by the controller, and the controller characterizes the distortions in a calculated manner without a learning algorithm.

35. The laser system of claim 22, wherein the at least one pulse has a duration of less than 5 fs and the at least one pulse is used for surgery.

36. The laser system of claim 22, wherein the controller automatically measures the phase distortions with an accuracy of better than 0.1 radian across a spectrum after a single scan.

* * * * *

UNITED STATES PATENT AND TRADEMARK OFFICE
CERTIFICATE OF CORRECTION

PATENT NO. : 8,208,505 B2
APPLICATION NO. : 12/465849
DATED : June 26, 2012
INVENTOR(S) : Marcos Dantus et al.

It is certified that error appears in the above-identified patent and that said Letters Patent is hereby corrected as shown below:

In the Specification

Column 4
Line 37          "and A" should be --and $\Delta$--.

Column 7
Line 52          "$f(\omega,\delta)= \delta(\omega-\omega_o)^2 \cdot \gamma(\omega-\omega_o)^3$" should be --$f(\omega,\delta)= \delta(\omega-\omega_o)^2 \pm \gamma(\omega-\omega_o)^3$--.

Signed and Sealed this
Seventeenth Day of June, 2014

Michelle K. Lee
*Deputy Director of the United States Patent and Trademark Office*